Nov. 6, 1945.   R. F. PALMER   2,388,433
APPARATUS FOR FOLDING, BANDING, AND MOUNTING PAPER TICKETS
Filed July 20, 1942   24 Sheets-Sheet 3

INVENTOR
Robert F. Palmer
BY Martin J. Manion
ATTORNEY

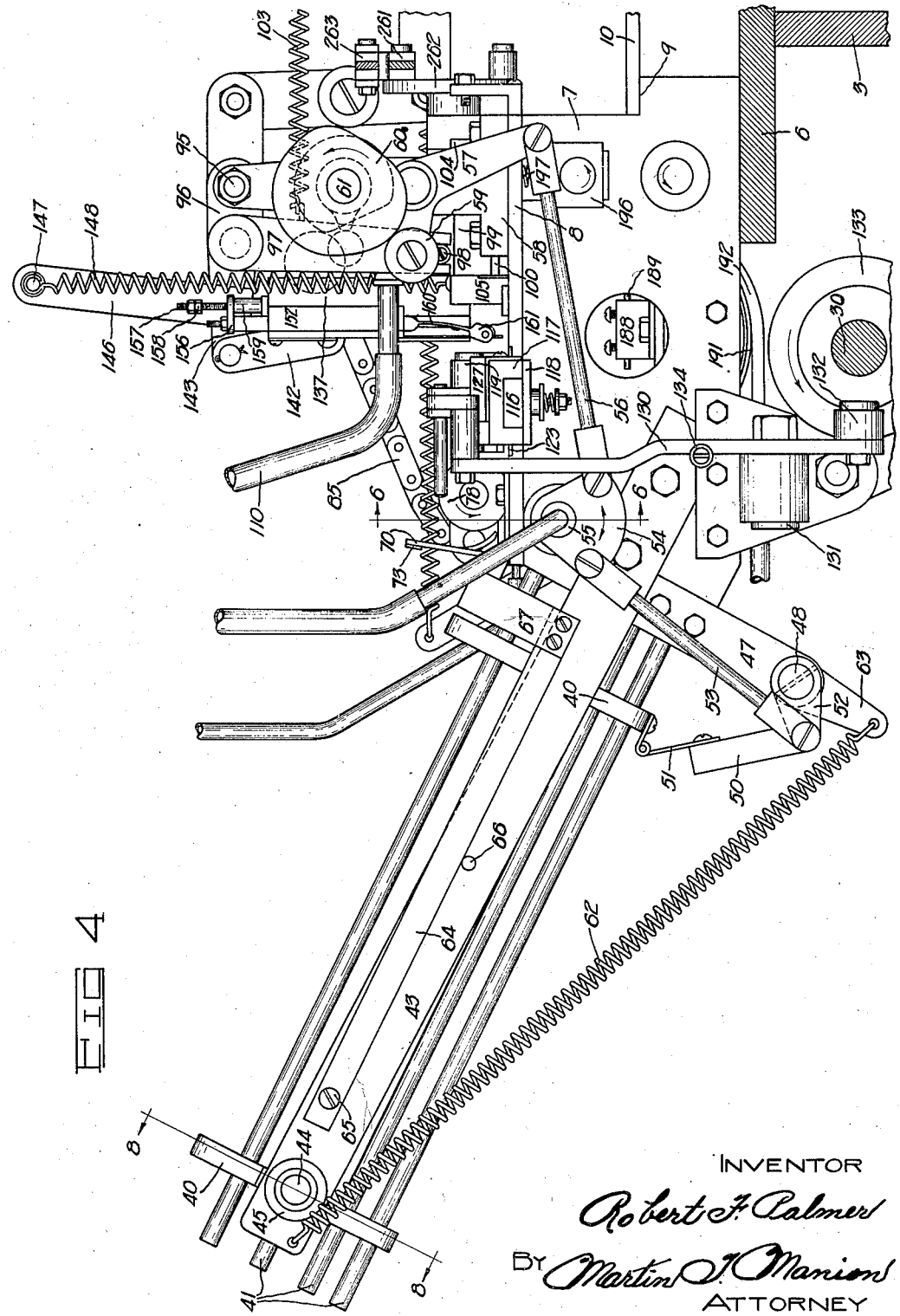

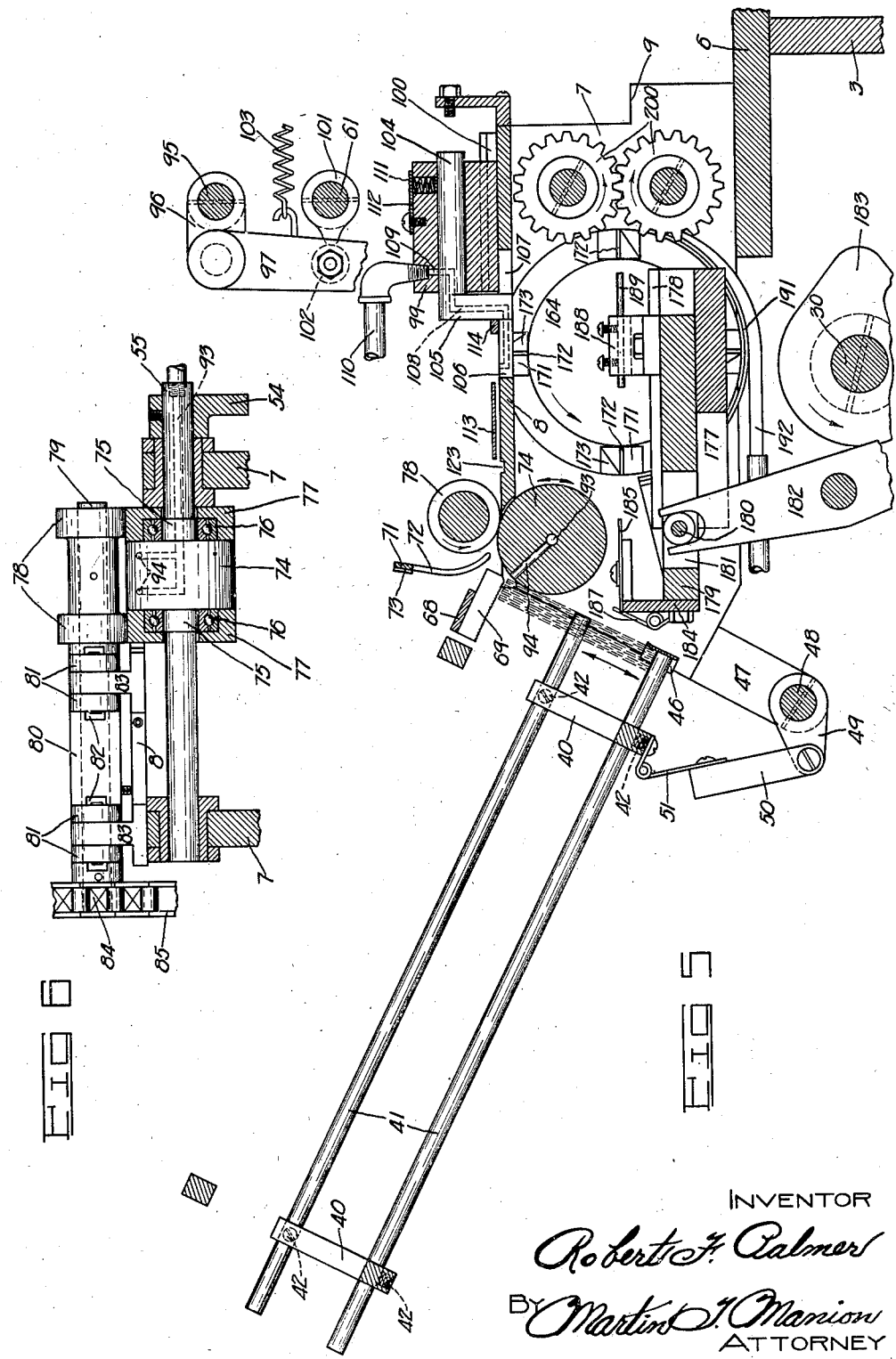

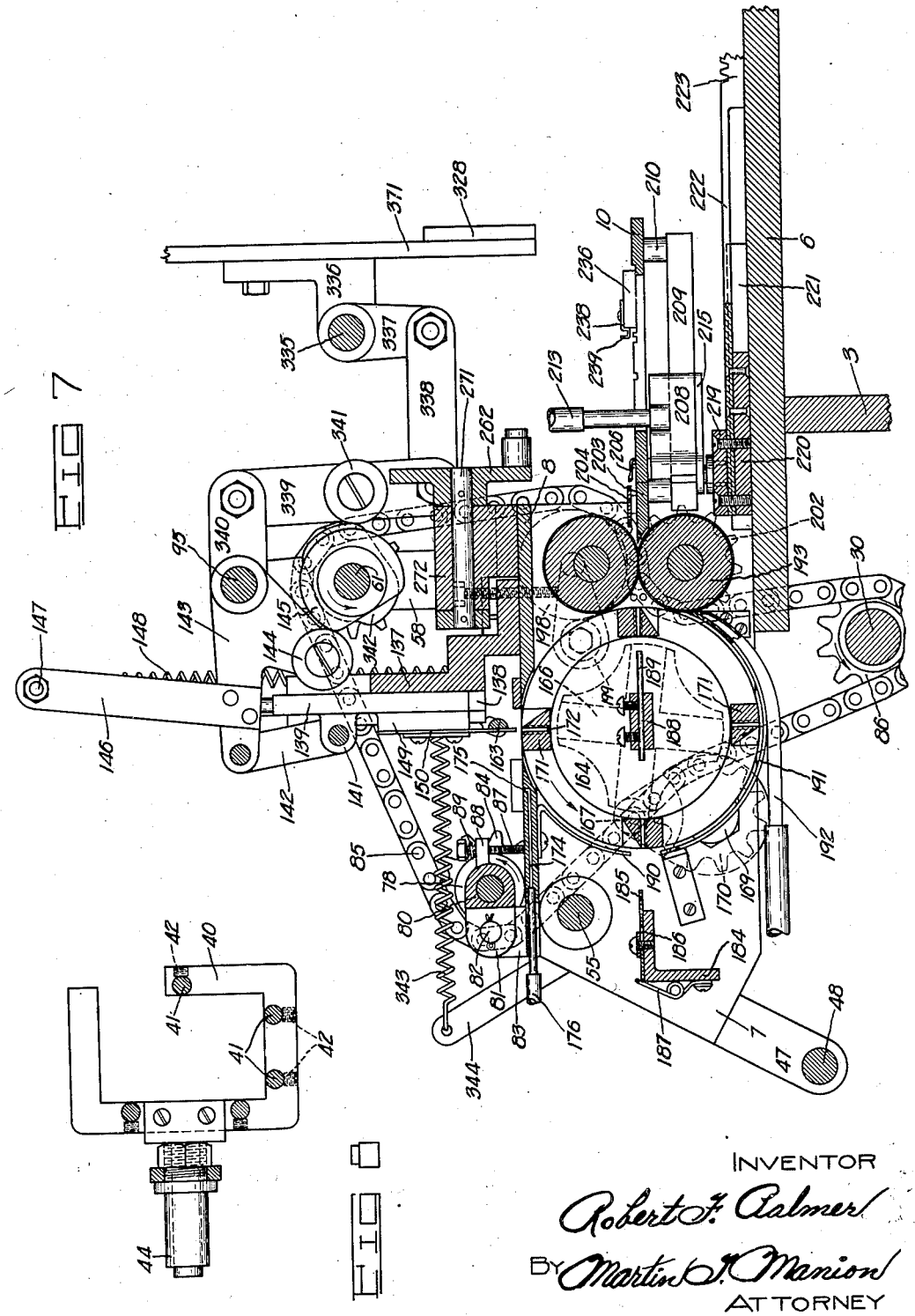

Nov. 6, 1945.  R. F. PALMER  2,388,433
APPARATUS FOR FOLDING, BANDING, AND MOUNTING PAPER TICKETS
Filed July 20, 1942   24 Sheets-Sheet 7
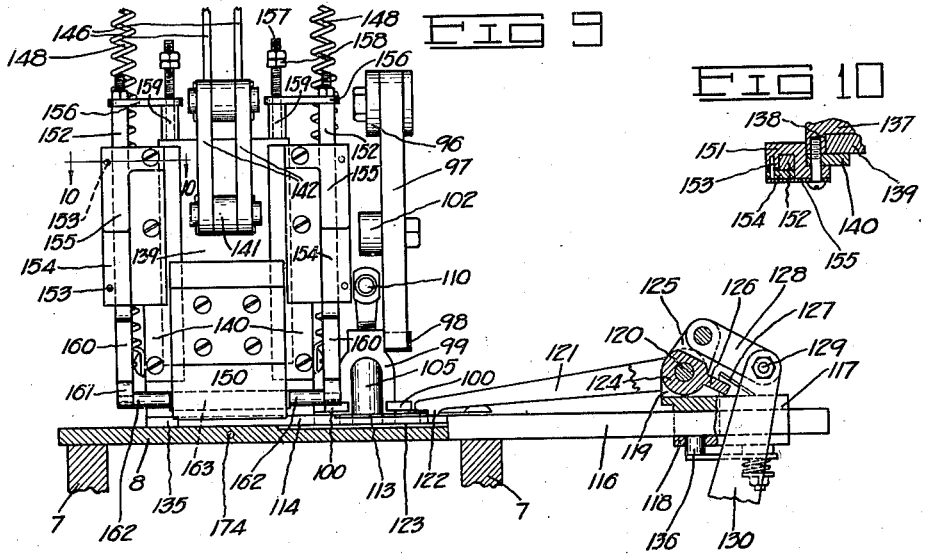
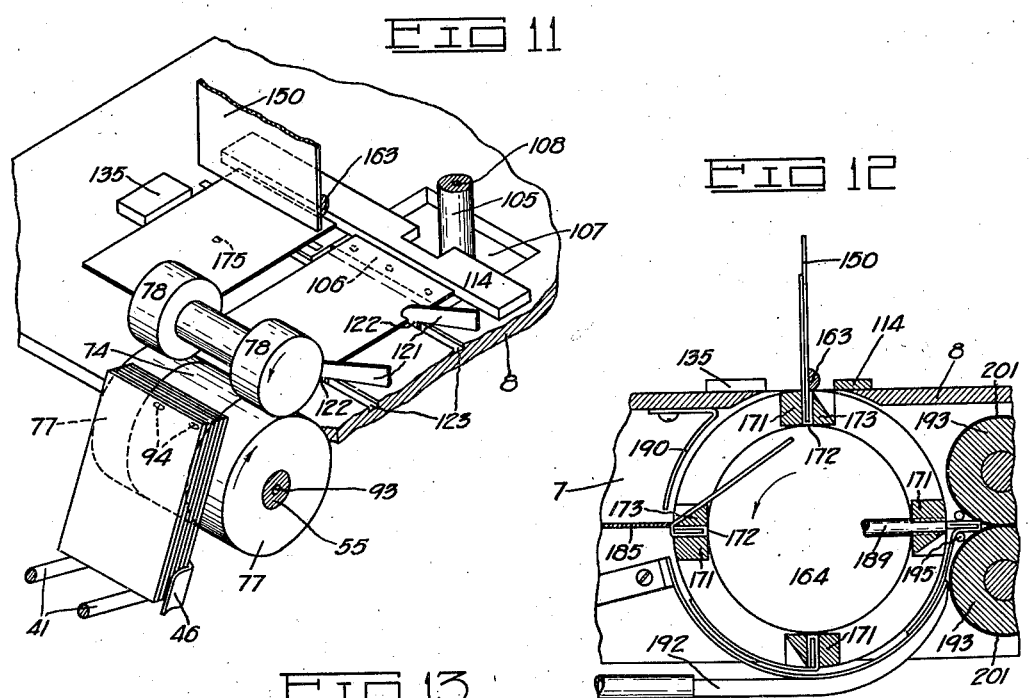
INVENTOR
Robert F. Palmer
By Martin J. Manion
ATTORNEY

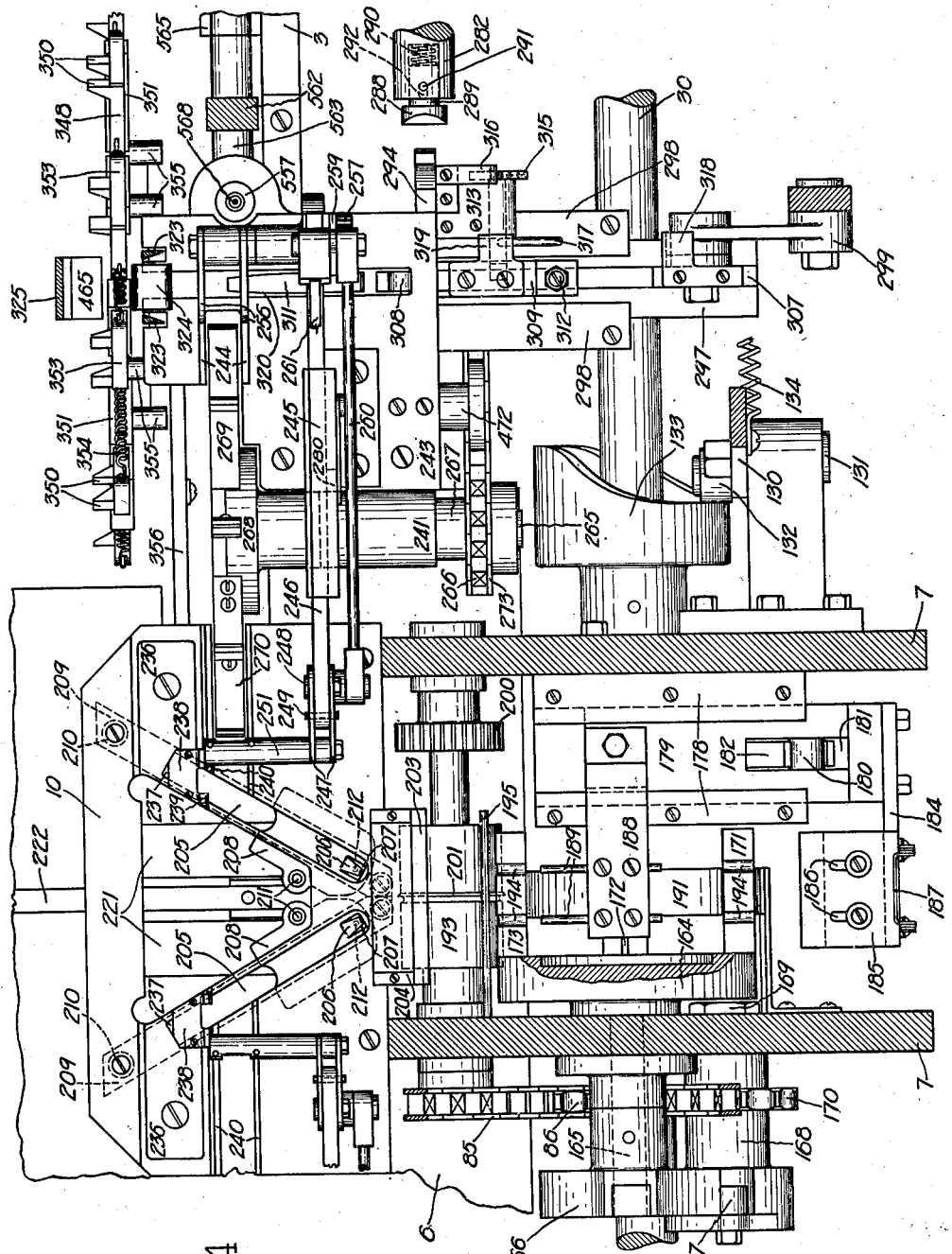

Nov. 6, 1945.  R. F. PALMER  2,388,433
APPARATUS FOR FOLDING, BANDING, AND MOUNTING PAPER TICKETS
Filed July 20, 1942  24 Sheets-Sheet 9
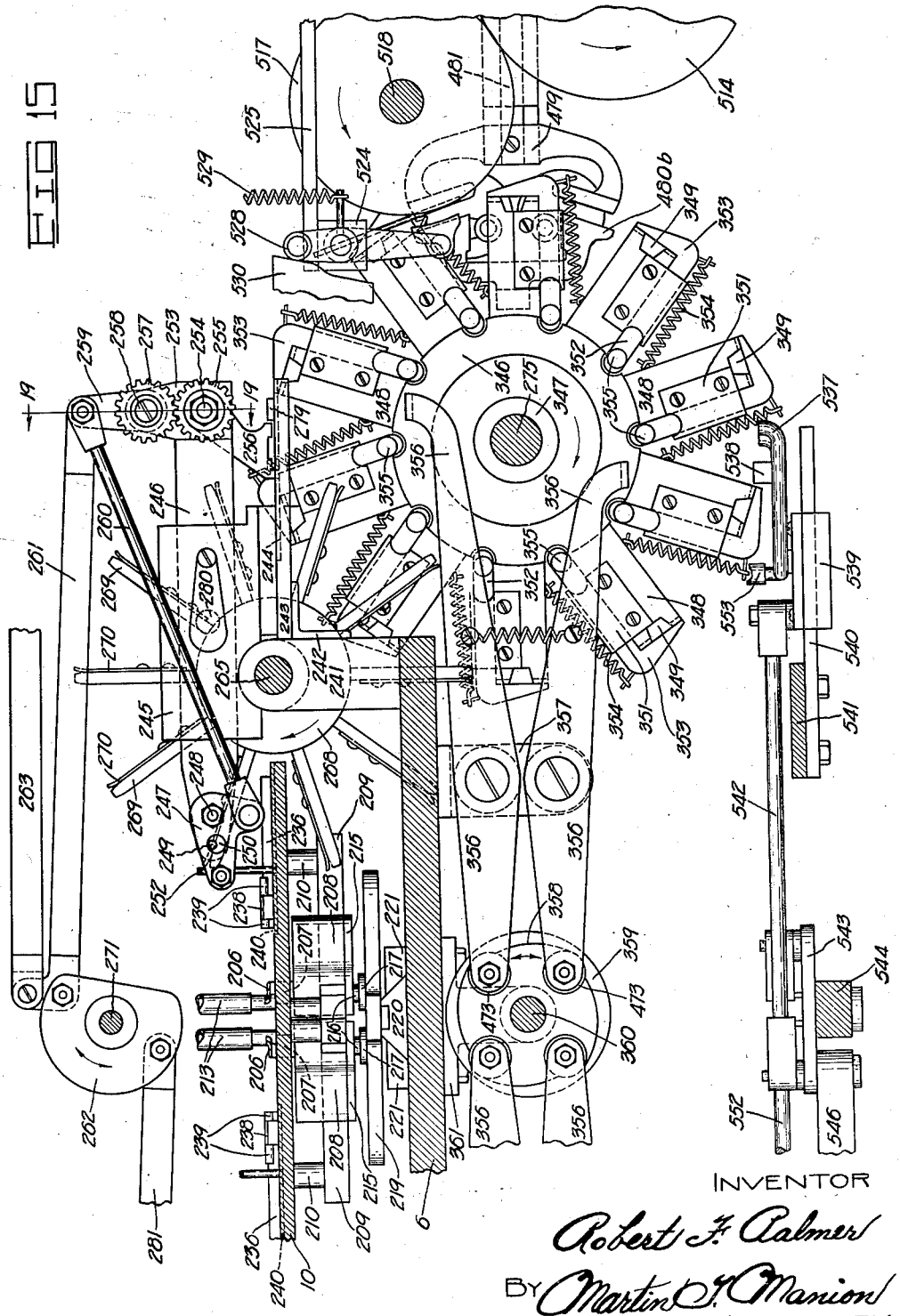
INVENTOR
Robert F. Palmer
BY Martin J. Manion
ATTORNEY

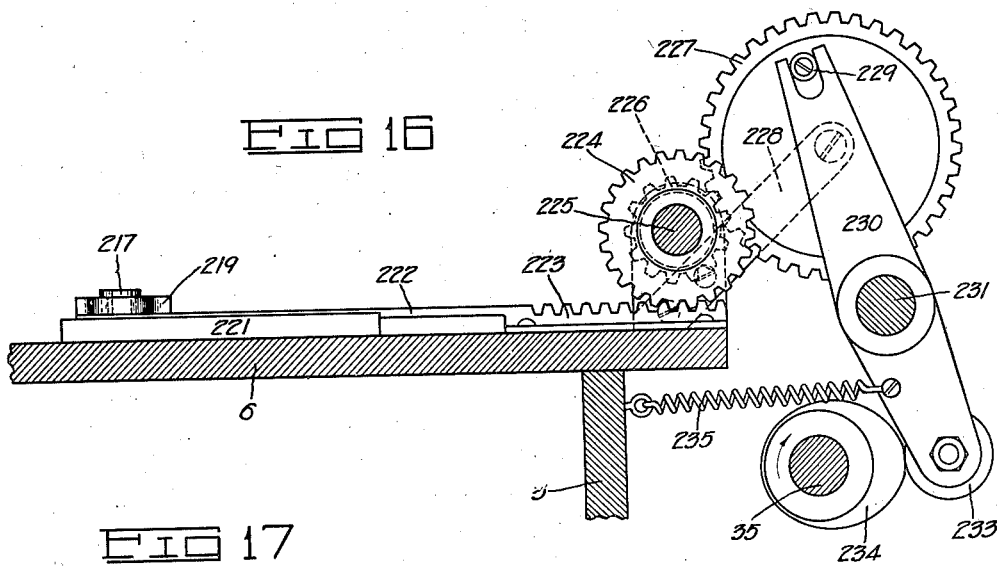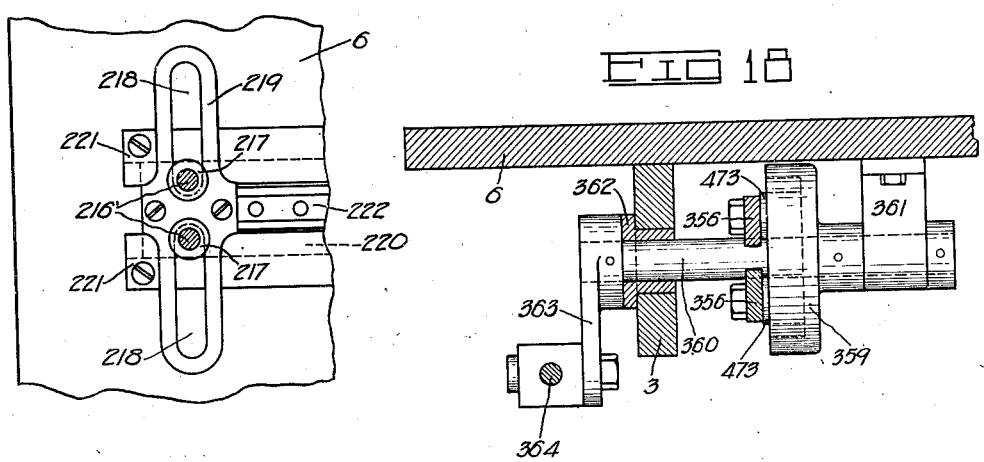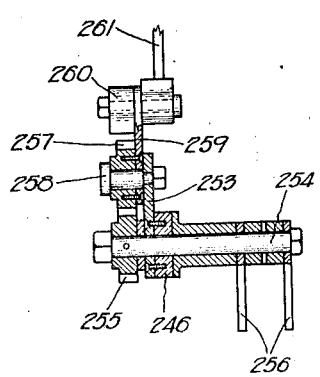

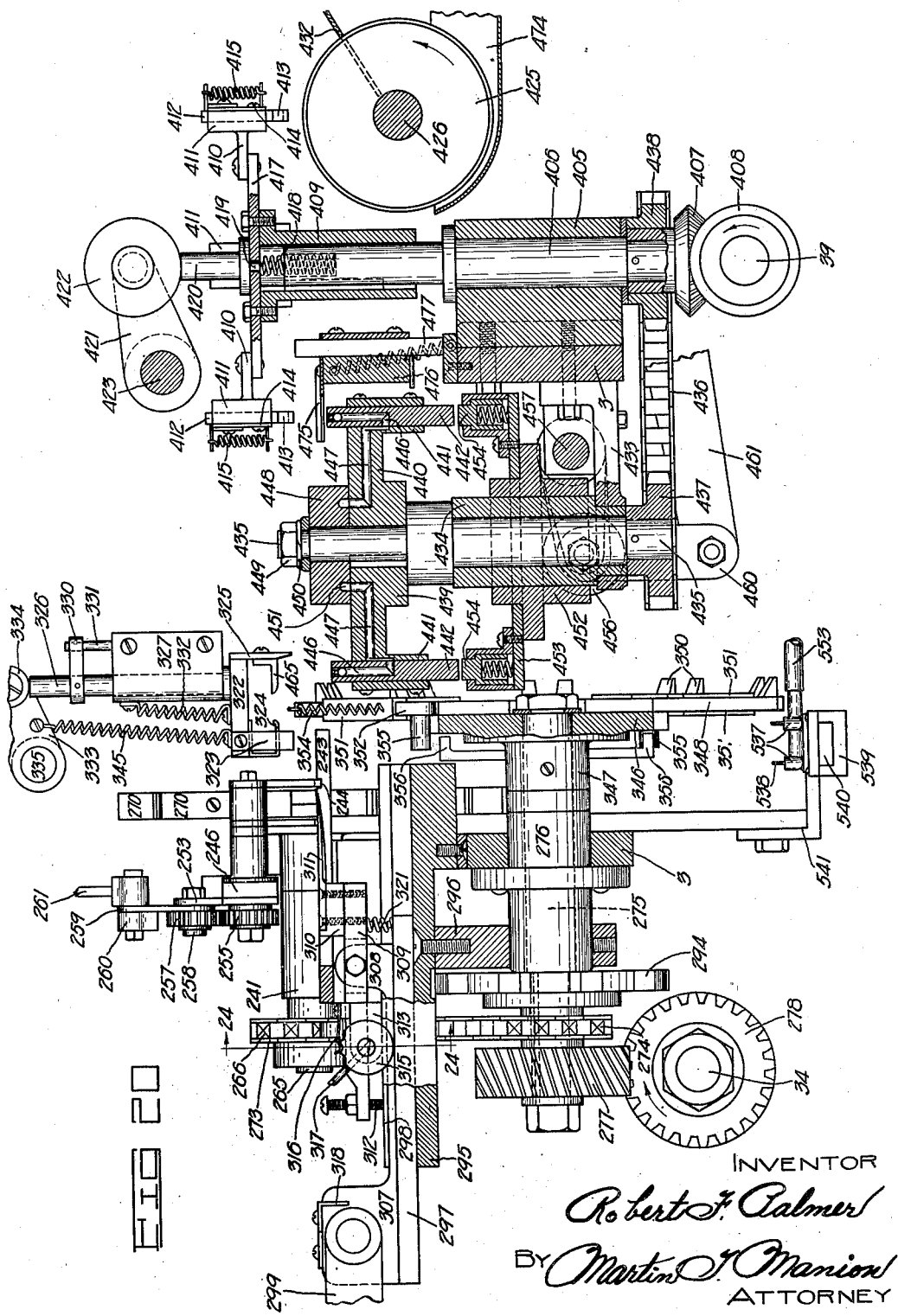

Nov. 6, 1945.   R. F. PALMER   2,388,433
APPARATUS FOR FOLDING, BANDING, AND MOUNTING PAPER TICKETS
Filed July 20, 1942   24 Sheets-Sheet 12
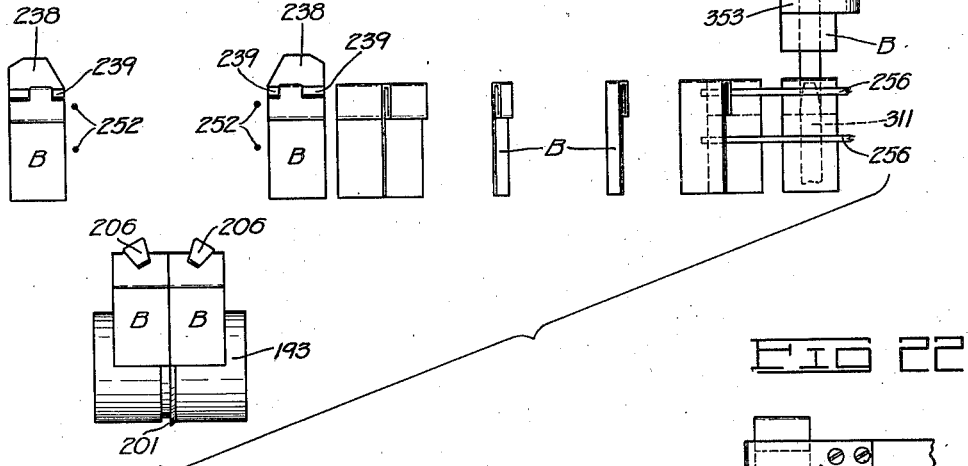
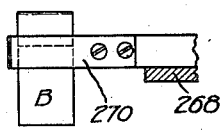
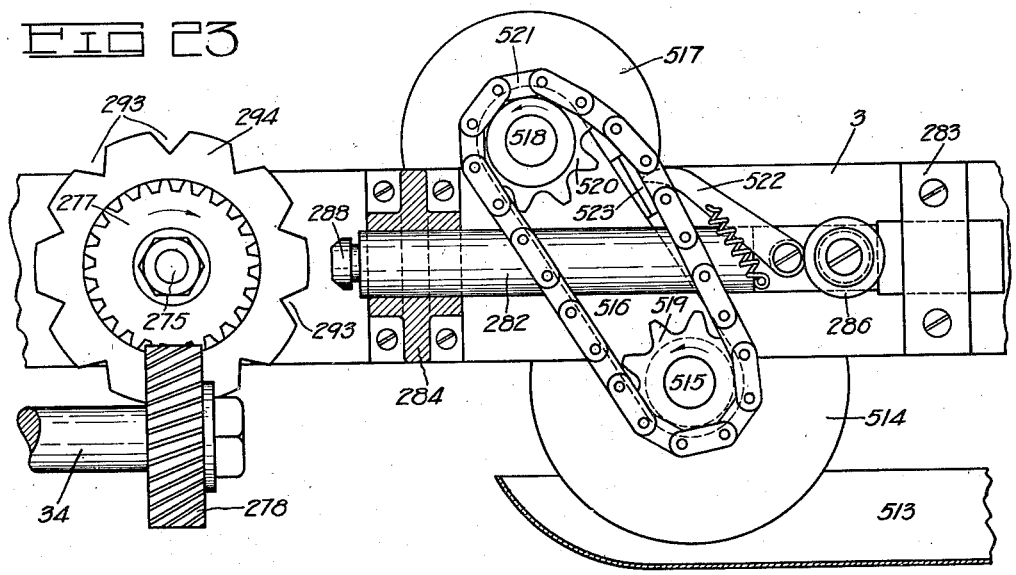
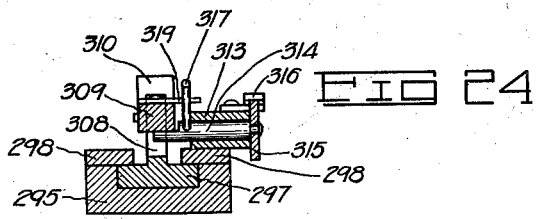
INVENTOR
Robert F. Palmer
BY Martin J. Manion
ATTORNEY Nov. 6, 1945.     R. F. PALMER     2,388,433
APPARATUS FOR FOLDING, BANDING, AND MOUNTING PAPER TICKETS
Filed July 20, 1942     24 Sheets-Sheet 13
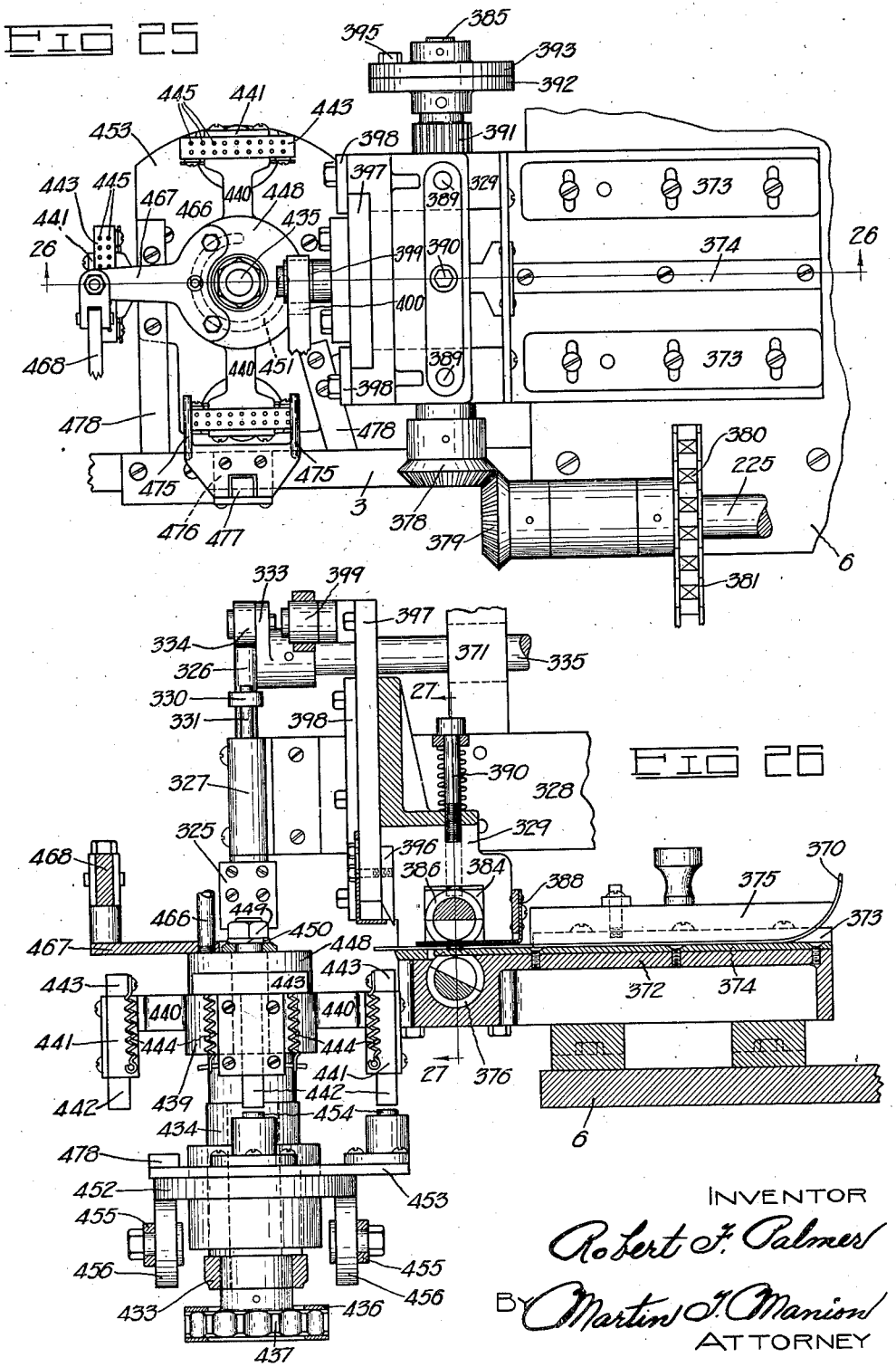
INVENTOR
Robert F. Palmer
BY Martin J. Manion
ATTORNEY

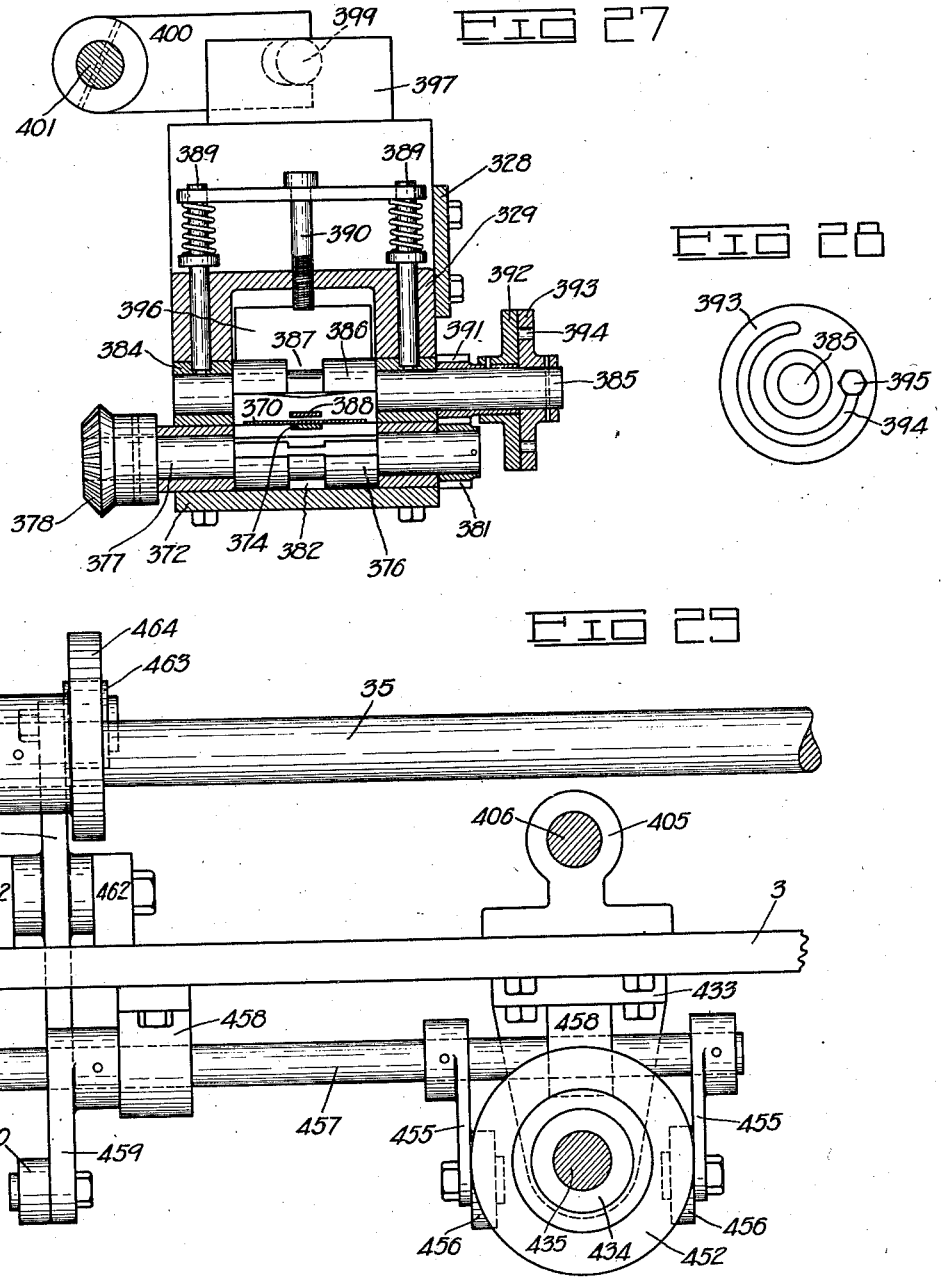

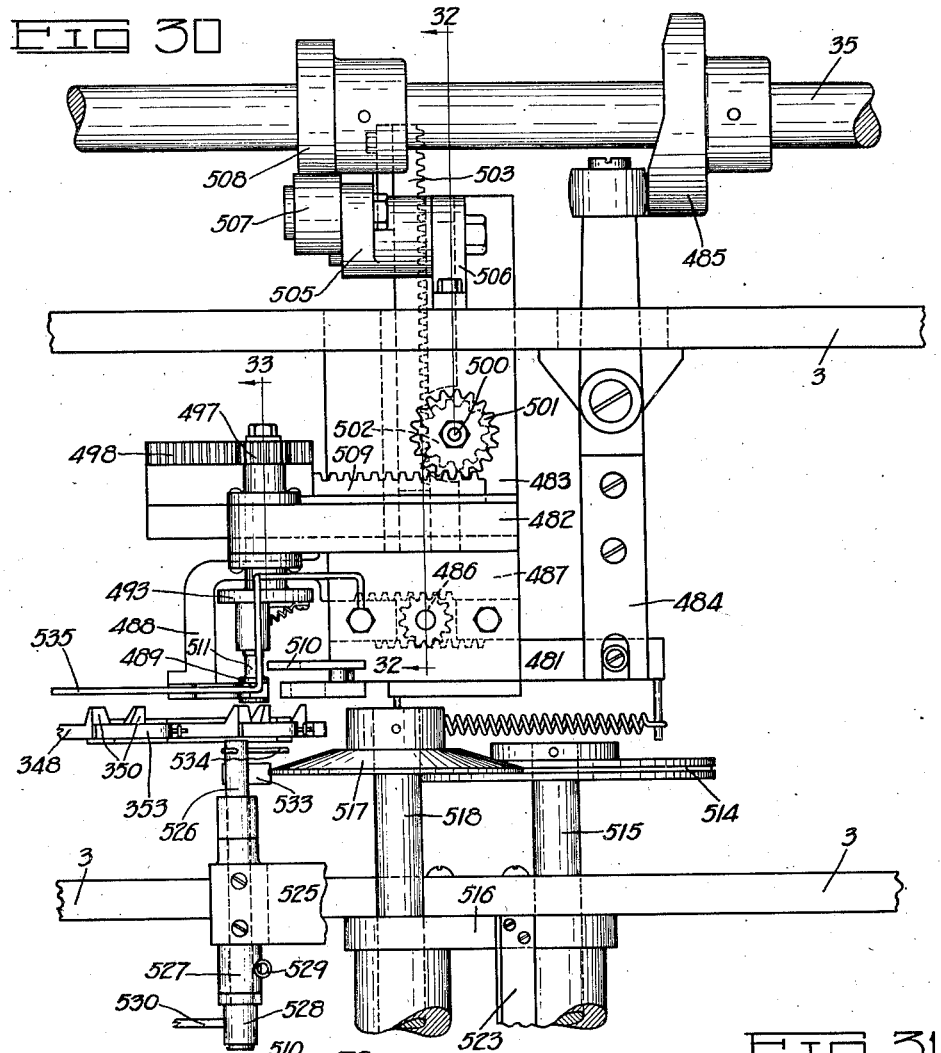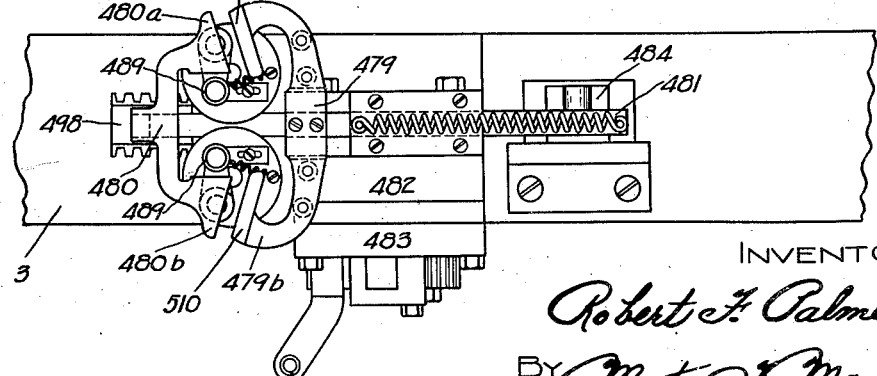

Nov. 6, 1945.  R. F. PALMER  2,388,433
APPARATUS FOR FOLDING, BANDING, AND MOUNTING PAPER TICKETS
Filed July 20, 1942  24 Sheets-Sheet 16
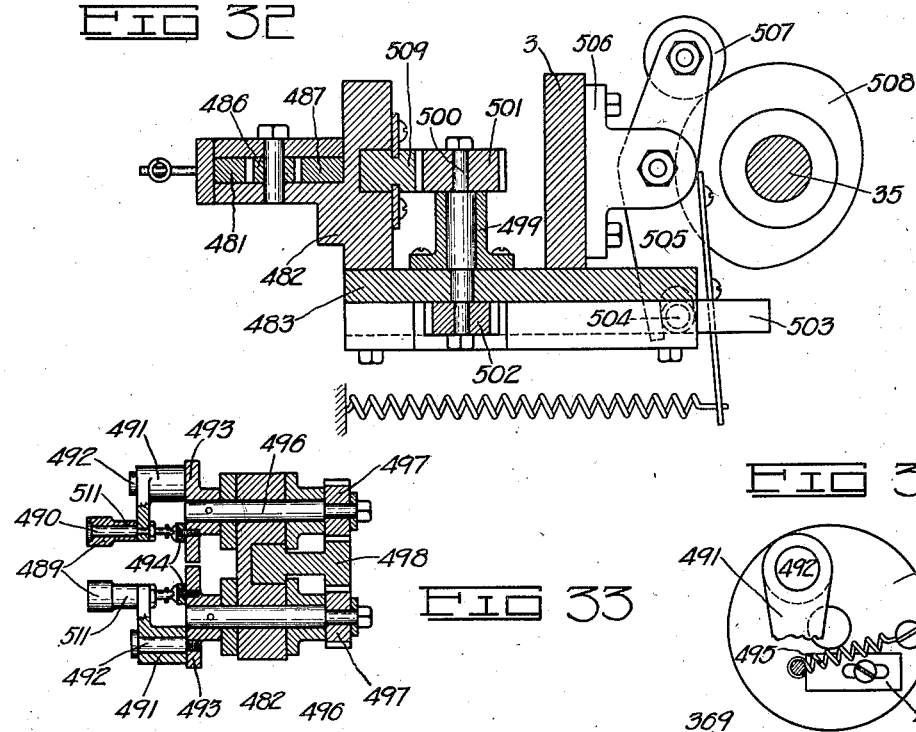
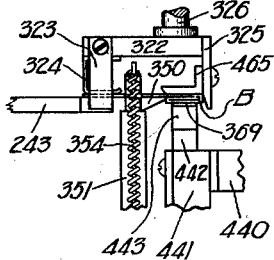
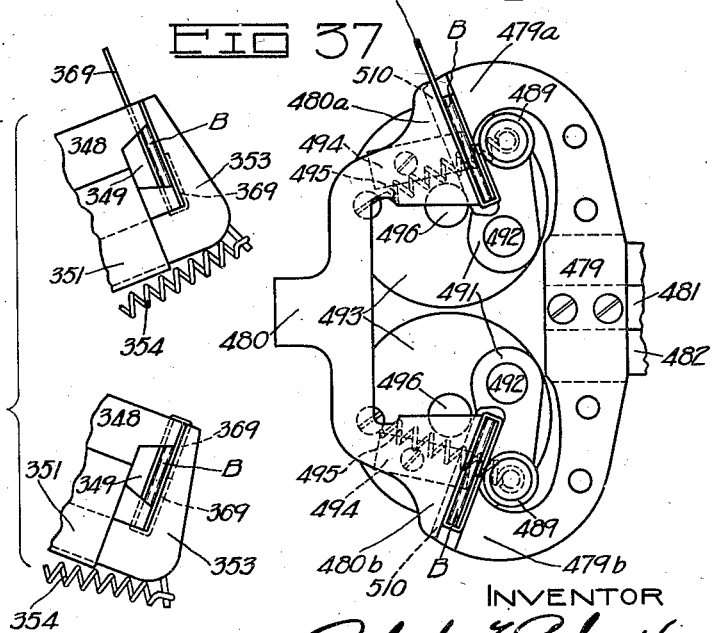
INVENTOR
Robert F. Palmer
BY Martin J. Marrion
ATTORNEY Nov. 6, 1945.　　　R. F. PALMER　　　2,388,433
APPARATUS FOR FOLDING, BANDING, AND MOUNTING PAPER TICKETS
Filed July 20, 1942　　　24 Sheets-Sheet 17

INVENTOR
Robert F. Palmer
BY Martin J. Marion
ATTORNEY

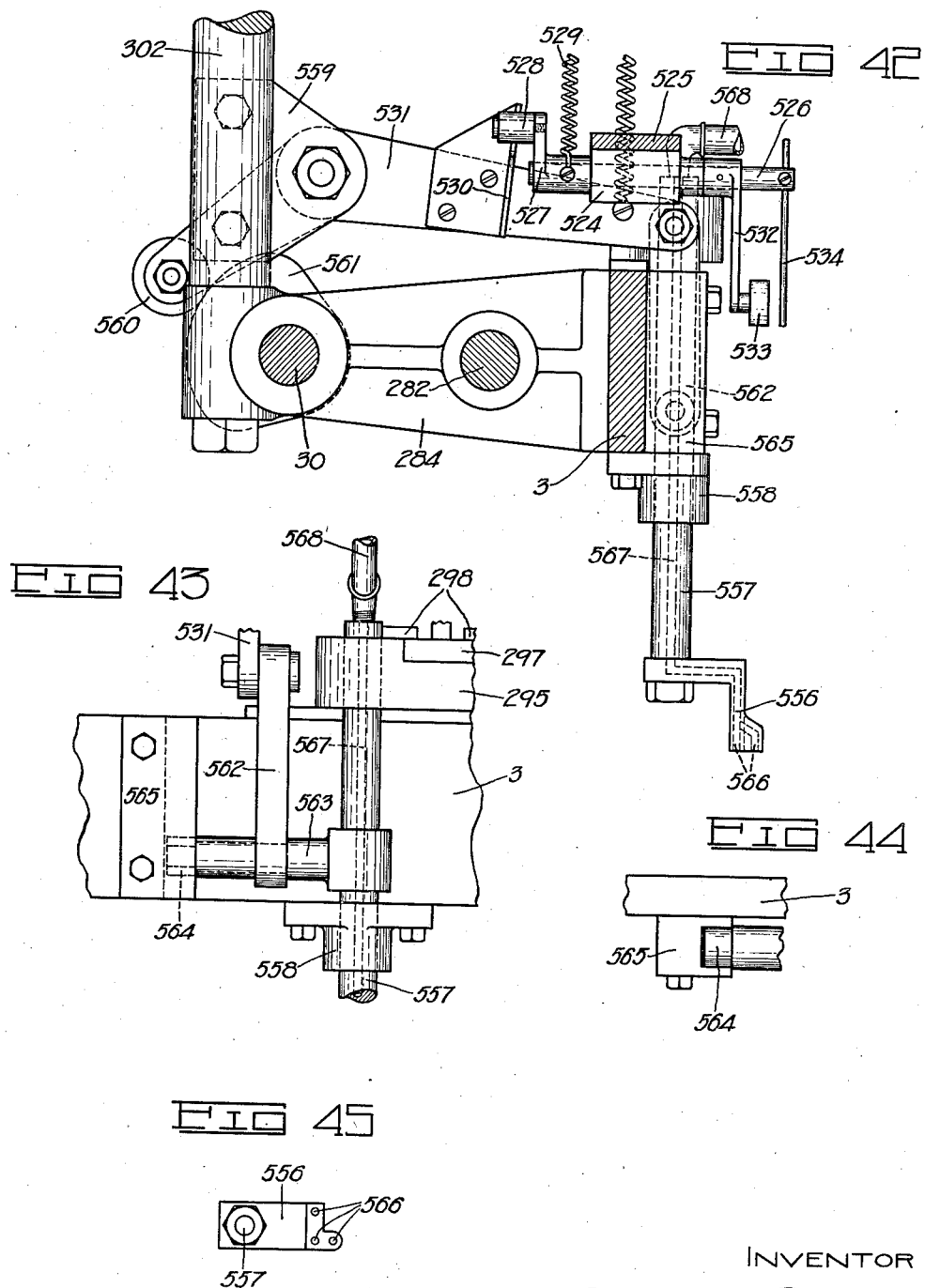

Nov. 6, 1945.  R. F. PALMER  2,388,433
APPARATUS FOR FOLDING, BANDING, AND MOUNTING PAPER TICKETS
Filed July 20, 1942  24 Sheets-Sheet 19
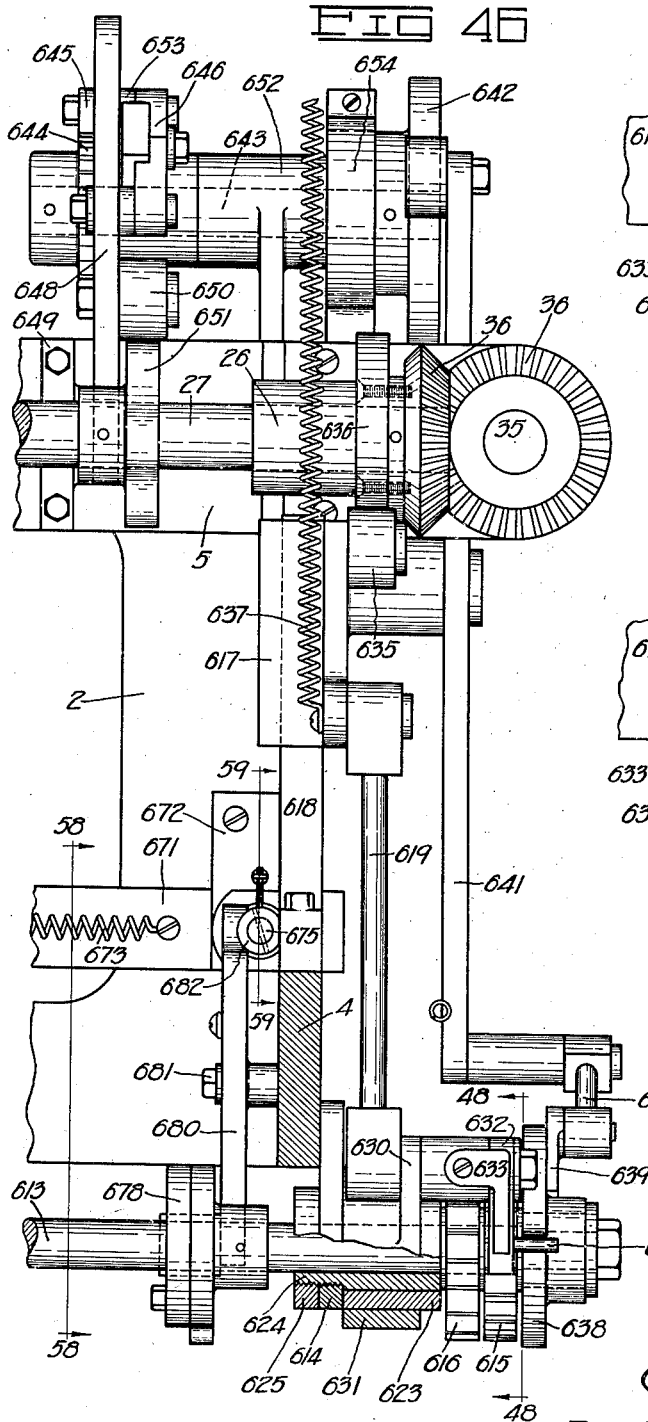
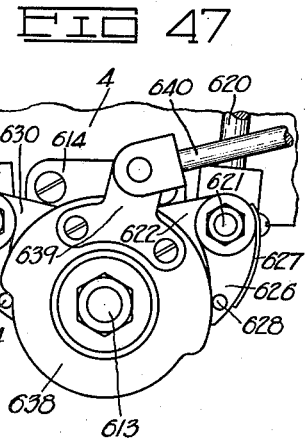
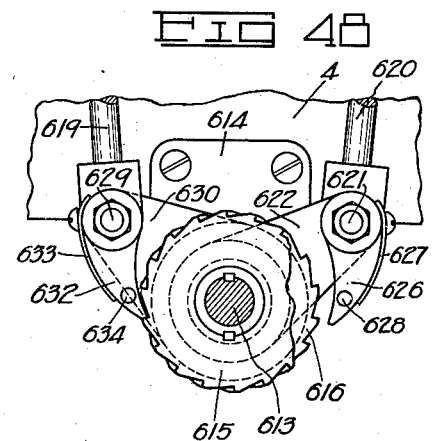
INVENTOR
Robert F. Palmer
BY Martin J. Marion
ATTORNEY Nov. 6, 1945.  R. F. PALMER  2,388,433
APPARATUS FOR FOLDING, BANDING, AND MOUNTING PAPER TICKETS
Filed July 20, 1942  24 Sheets-Sheet 20

INVENTOR
Robert F. Palmer
BY Martin F. Manion
ATTORNEY

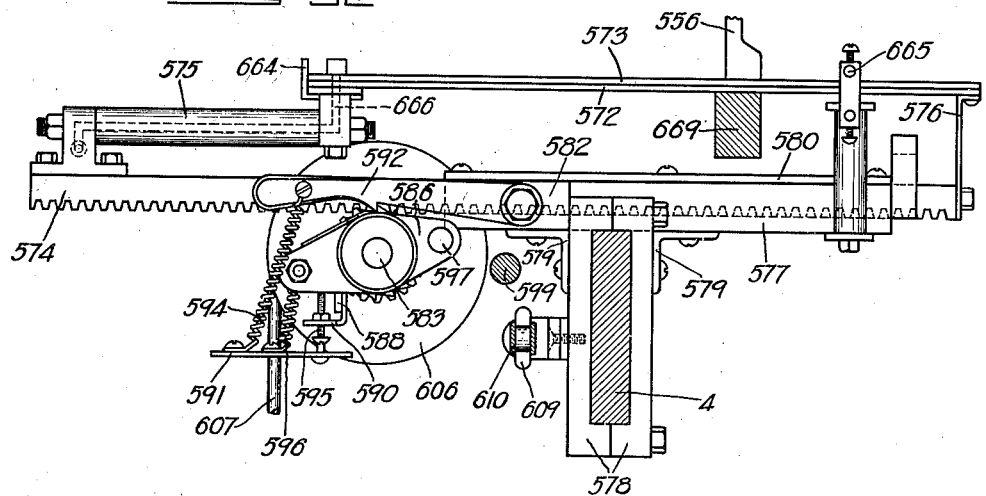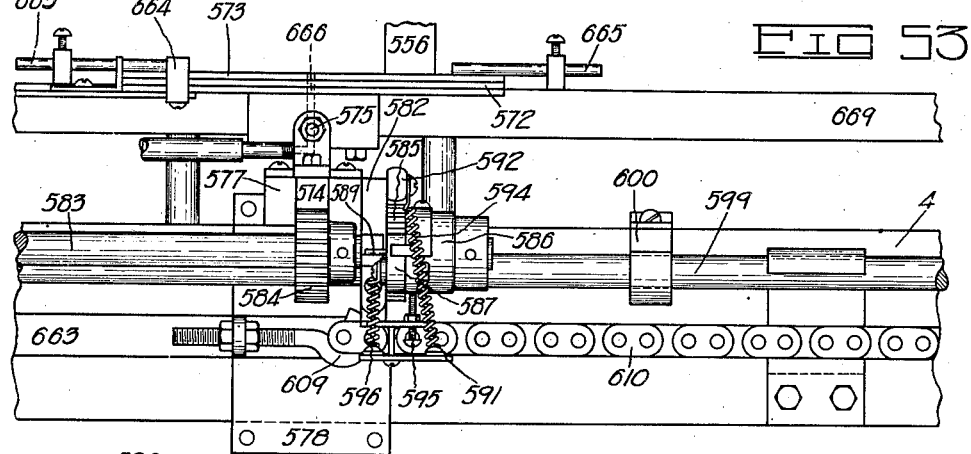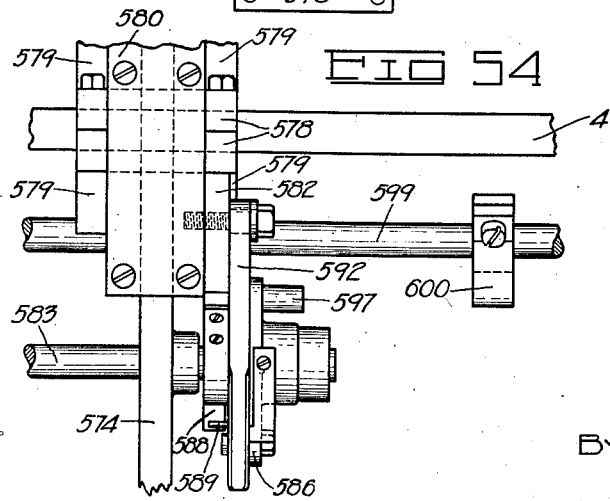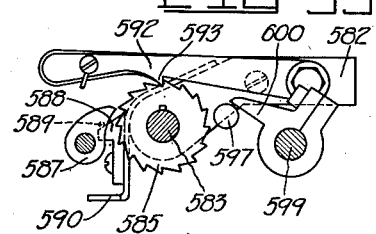

Nov. 6, 1945.  R. F. PALMER  2,388,433
APPARATUS FOR FOLDING, BANDING, AND MOUNTING PAPER TICKETS
Filed July 20, 1942  24 Sheets-Sheet 22
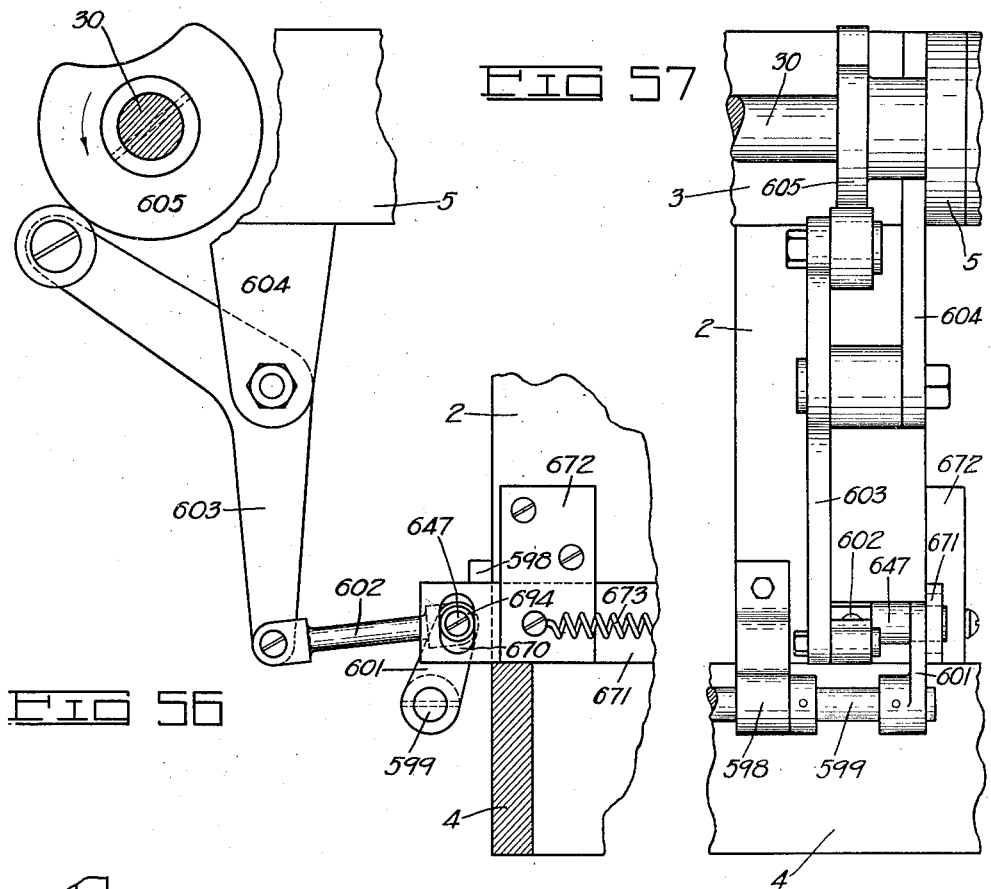
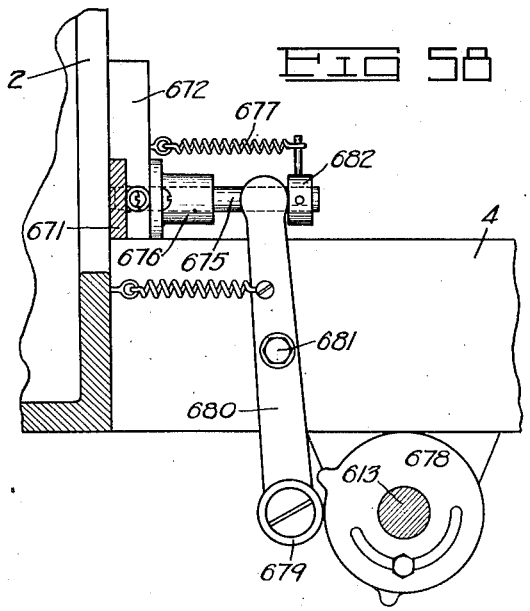
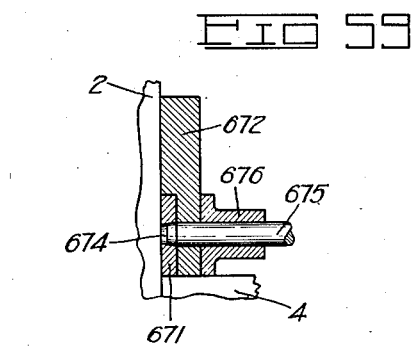
INVENTOR
Robert F. Palmer
By Martin J. Manion
ATTORNEY Nov. 6, 1945. R. F. PALMER 2,388,433
APPARATUS FOR FOLDING, BANDING, AND MOUNTING PAPER TICKETS
Filed July 20, 1942 24 Sheets-Sheet 23
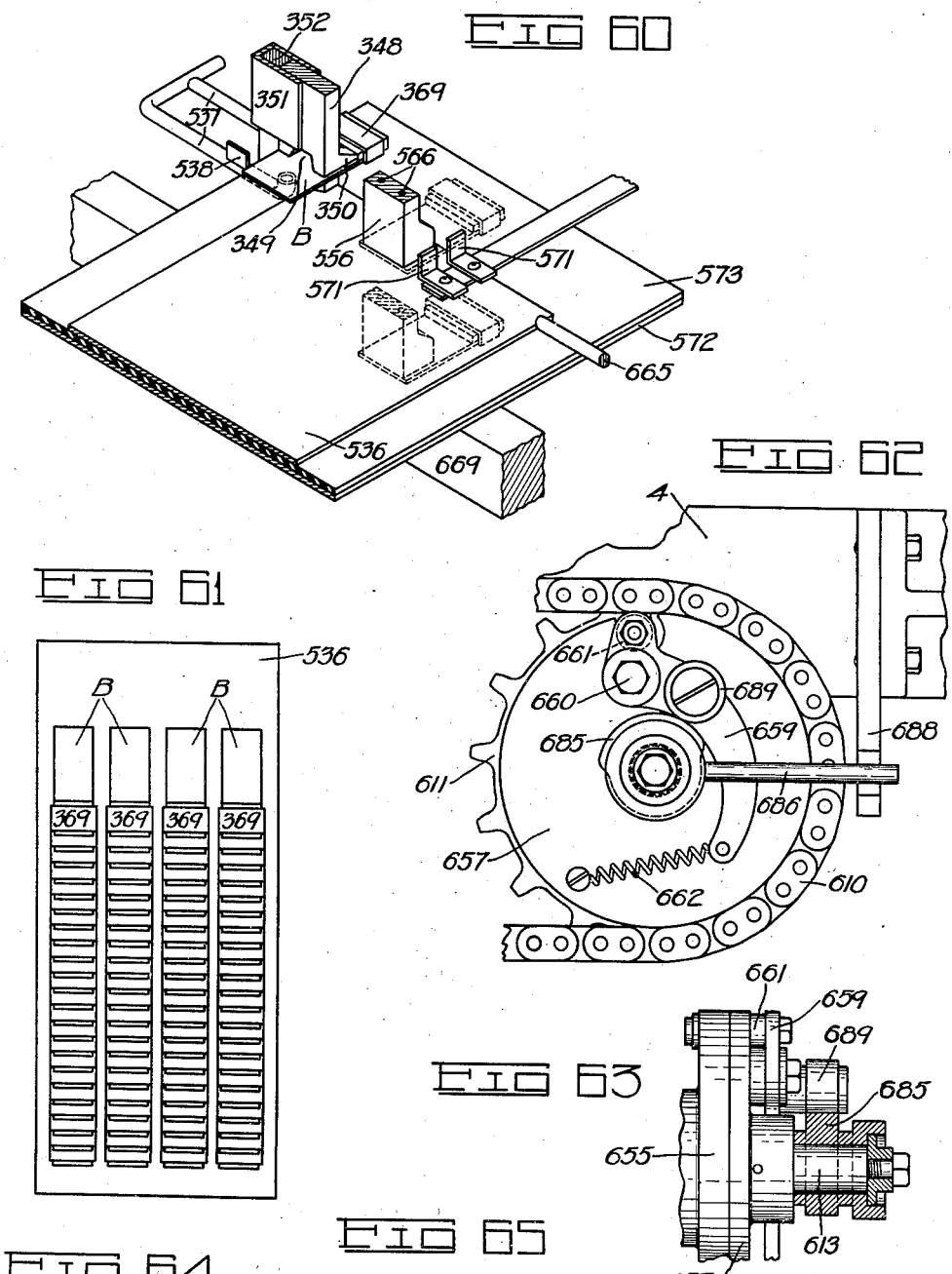
INVENTOR
Robert F. Palmer
BY Martin J. Manion
ATTORNEY Nov. 6, 1945.   R. F. PALMER   2,388,433
APPARATUS FOR FOLDING, BANDING, AND MOUNTING PAPER TICKETS
Filed July 20, 1942   24 Sheets-Sheet 24
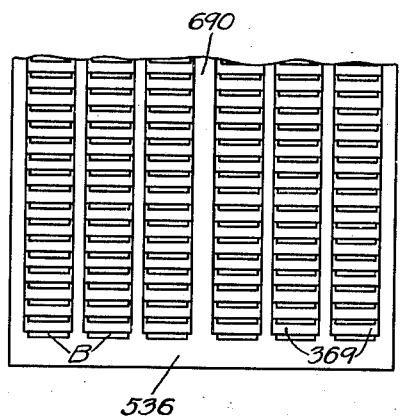
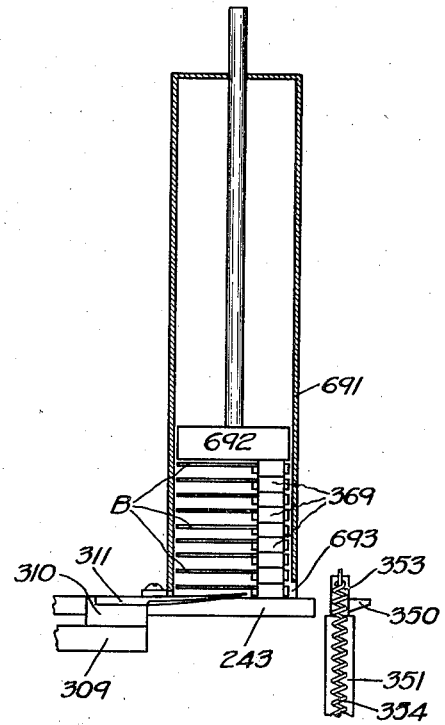
INVENTOR
Robert F. Palmer
BY Martin D. Marion
ATTORNEY Patented Nov. 6, 1945

2,388,433

UNITED STATES PATENT OFFICE 2,388,433

APPARATUS FOR FOLDING, BANDING, AND MOUNTING PAPER TICKETS

Robert F. Palmer, Wheeling, W. Va.

Application July 20, 1942, Serial No. 451,627

24 Claims. (Cl. 93—1)

This invention relates to a machine for forming and folding paper, including mechanism for automatically placing a retaining band about the fold for maintaining the paper in its folded relation and including associated mechanism for automatically mounting the folded and banded paper articles upon an appropriate backboard.

In certain indoor recreational games a plurality of printed rectangularly shaped strips of comparatively heavy gauge paper are individually and removably mounted in spaced, parallel rows by one end upon a backing board, said strips, or tickets, as they are known in the trade, having the opposite, or free, end, thereof folded about itself and secured in folded relation by a transverse paper retaining band. Printed on the inner surface of the folded portion of the ticket and concealed from view by reason of the fold is information of interest pertaining to the game. Upon participating in the game, a player pulls one of the strips from the board, ruptures the paper banding seal, and unfolds the end of the strip to reveal the previously hidden information which informs the player of matter having to do with the further progress of the game.

It is the purpose of the present invention to provide an automatic machine whereby such printed strips of paper or tickets are properly formed and folded to render the printed indicia invisible to the eye; to provide in said machine mechanism for sealing the individual tickets in folded condition preparatory to mounting the same upon an appropriate backing board, and, additionally, to provide mechanism in said machine whereby the tickets may be automatically and neatly applied to the backboard in spaced parallel rows.

The full nature of the invention and other features thereof will be understood from the accompanying drawings and the following description. In said drawings—

Figure 4 is an enlarged side elevational view of the magazine, and the ticket feeding, folding and cutting mechanism;

Figure 5 is a vertical sectional view illustrating a substantial portion of the mechanism depicted in Fig. 4;

Figure 6 is a sectional view taken on line 6—6, Fig. 4;

Figure 7 is a vertical sectional view of the mechanism for folding the twin tickets and of the mechanism for slitting the twin tickets into single units for further processing;

Figure 8 is a sectional view of the magazine taken on line 8—8, Fig. 4;

Figure 9 is a front elevational view of the ticket folding head showing the associated aligning and pushing fingers;

Figure 10 is a sectional view taken on line 10—10, Fig. 9;

Figure 11 is a schematic view illustrating the travel of the twin tickets from the magazine to the locale where it is in position for the initial folding operation;

Figure 12 is a side elevational view, partially in section, of the ticket folding drum showing tickets in each of the four stages of folding;

Figure 13 is a perspective view of one of the folded twin tickets illustrating where it is severed to form two separate unit tickets;

Figure 14 is a detail view, partially in top plan elevation and partially in section, of the mechanism for transporting the separated, individual tickets from the slitting station to the ticket holding wheels;

Figure 15 is a detail view of one of the ticket carrying wheels and the associated mechanism in the vicinity thereof;

Figure 16 is a detail view, partially in side elevation and partially in section, illustrating the mechanism for operating the ticket carrier slides;

Figure 17 is a detail view in top plan of the guides for the ticket carrier slides;

Figure 18 is a detail view of the cam and associated mechanism whereby the jaws of the ticket clamping wheel may be opened and closed;

Figure 19 is a sectional view taken on line 19—19, Fig. 15;

Figure 20 is a detail view, partially in section, of the mechanism for positioning a gummed retaining band on the folded end of the ticket preparatory to completion of the banding operation;

Figure 21 is a diagrammatic view intending to illustrate the path of travel of one of the individual folded tickets from the twin ticket severing station to the retaining band deposition station;

Figure 22 is a fragmentary detail view of one of the friction fingers of the ticket carrier wheel showing a folded ticket retained therein;

Figure 23 is a detail view of the mechanism for registering the ticket clamping wheel so as to render it immovable while receiving and discharging tickets from diametrically opposite clamping jaws, said view also illustrating associated mechanism for operating the glue roll for applying a quantity of adhesive to the tail of the ticket;

Figure 24 is a sectional view taken on line 24—24 of Fig. 20;

Figure 25 is a top plan view of the shear for severing a retaining band from the paper tape and associated mechanism for receiving the severed band and for transporting it, after receiving a quantity of adhesive, to the band deposition station;

Figure 26 is a partial vertical sectional view taken on line 26—26 of Fig. 25;

Figure 27 is a sectional view taken on line 27—27 of Fig. 26;

Figure 28 is a detail face view of the manually operable adjusting disc whereby the bite of the feed rolls for the band shears may be varied, when desired, to increase or decrease the width of the band to be severed from the paper tape;

Figure 29 is a top plan view of the mechanism for actuating the elevator for causing vertical reciprocation of the band transporting tees;

Figure 30 is a top plan view of the mechanism for operating the banding means, said figure also including the means for applying adhesive to the tail of the ticket;

Figure 31 is a front elevational view of the banding mechanism;

Figure 32 is a sectional view taken on line 32—32 of Fig. 30;

Figure 33 is a sectional view taken on line 33—33 of Fig. 30;

Figure 34 is an enlarged front view, portions being broken away and shown in section, illustrating the adjusting means for regulating the amount of pressure applied to the band during the ticket banding operation;

Figure 35 is a fragmentary detail view illustrating a retaining band being deposited beneath the folded end of a ticket;

Figure 36 is a diagrammatic view of two successive clamps of the ticket clamping wheel illustrating the position and condition of the thereby carried tickets during the banding operation;

Figure 37 is an enlarged front elevational view of the banding mechanism depicting the rolling of the previously deposited bands about the folded ends of two successive tickets borne by the ticket clamping wheel, as pictured in Fig. 36;

Figure 42 is a detail view of the vertically reciprocable hammer for applying the tickets to the backing board and the operating means therefor;

Figure 43 is a fragmentary view of the means for guiding the hammer in its vertical reciprocable travel;

Figure 44 is a fragmentary view of the guide and roller associated with the hammer;

Figure 45 is a bottom plan view of the hammer;

Figure 46 is a fragmentary end view of the actuating mechanism for operating associated mechanism which intermittently moves the backboard to various locales beneath the hammer during the ticket applying operation;

Figure 47 is a face view of the cam and associated pawls associated with the mechanism for transversely spacing the tickets on the backboard;

Figure 48 is a sectional view taken on line 48—48 of Fig. 46;

Figure 52 is a side elevational view of the table for supporting the backboard and associated mechanism;

Figure 53 is a front elevational view of substantially the same mechanism as that illustrated in Fig. 52;

Figure 54 is a fragmentary top plan view of substantially the same mechanism as that illustrated in Figs. 52 and 53 but with the backboard supporting table removed;

Figure 55 is a detail view of the mechanism for intermittently moving the backboard table transversely of the apparatus;

Figure 56 is a detail front view of means for actuating the mechanism depicted in Fig. 55 for intermittently moving the backboard table transversely of the apparatus;

Figure 57 is an end view of the mechanism shown in Fig. 56;

Figure 58 is a sectional view taken on line 58—58 of Fig. 46;

Figure 59 is a sectional view taken on line 59—59 of Fig. 46;

Figure 60 is a diagrammatic view pictorially portraying the removal of a ticket from the ticket clamping wheel and its application to a backboard;

Figure 61 is a top plan view of the finished product of the apparatus, showing a plurality of the folded and banded tickets mounted on the backboard in uniformly spaced, parallel rows;

Figure 62 is a front elevational view of substantially the same mechanism depicted in Fig. 51 except for the addition of a stationary cam mounted on the shaft whose function results in the increase of the longitudinally extending space between the two center parallel rows of tickets on the backboard, as shown in Fig. 66;

Figure 63 is a fragmentary side view of substantially the same mechanism shown in Fig. 62;

Figure 64 is a fragmentary front view of the roller associated with the mechanism shown in Figs. 62 and 63 for varying the space between the two center rows of tickets, said roller being depicted at the extreme limit of one of its positions;

Figure 65 is a view similar to Fig. 64 but showing the roller in the extreme limit of its opposite position;

Figure 66 is a partial top plan view of a modified finished product of the apparatus;

Figure 67 is a vertical sectional view of a hopper and feed mechanism for previously folded and banded tickets applied to the apparatus in the event the ticket folding and banding operation are to be eliminated and the apparatus used solely for mounting already folded and banded tickets to a backboard.

Figure 1:
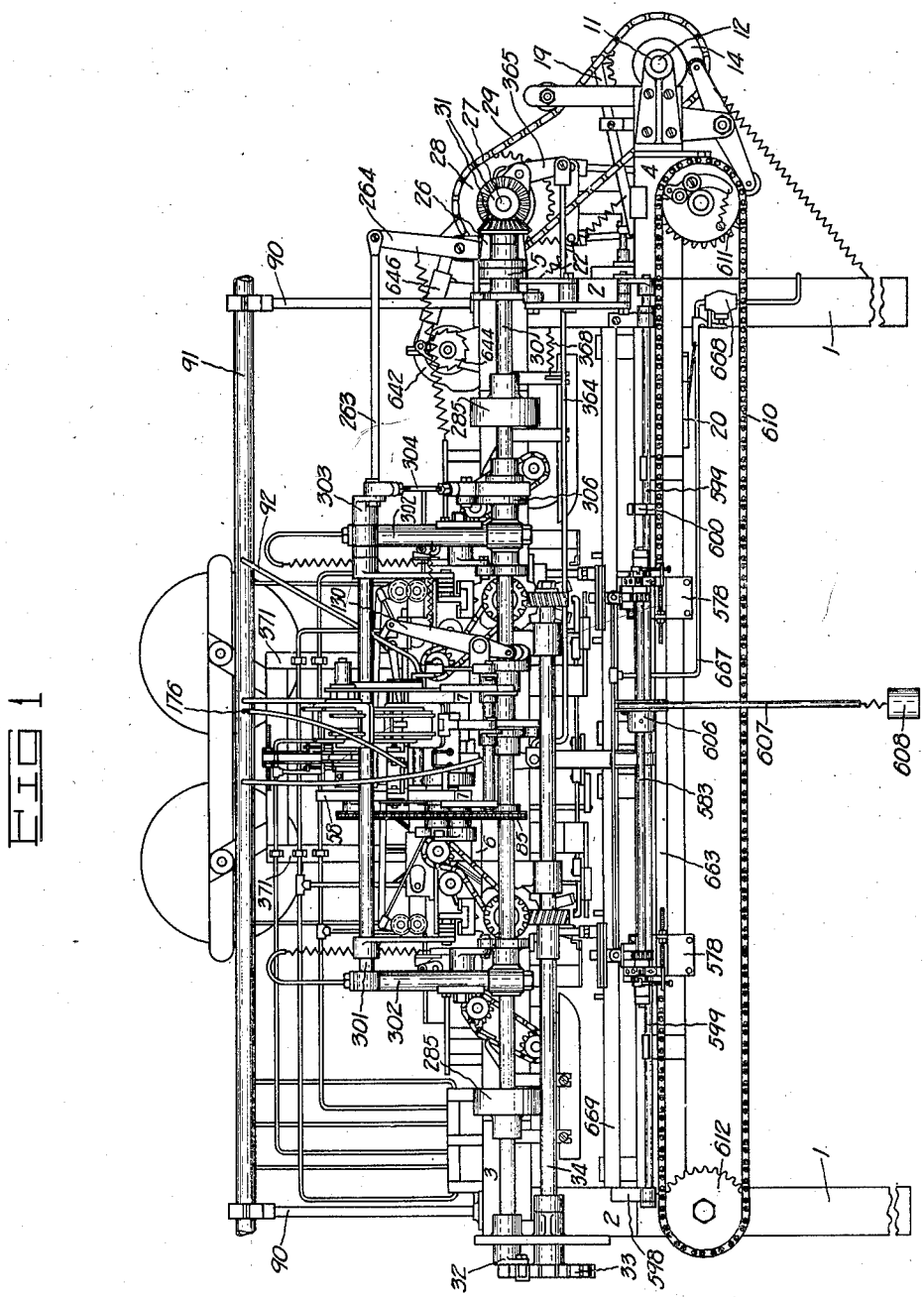
Figure 1 is a front elevational view of the machine.

Referring to said drawings, the reference numerals 1 designate corner legs supporting a rigid, rectangularly shaped frame or chassis, which latter comprises end plates 2, longitudinally extending top side bars 3 and longitudinally extending bottom bars 4, the latter at one end extending beyond the end plate 2. Extending transversely of the frame at the end thereof from which the bottom bars 4 project is a transversely disposed bar 5, said bar projecting rearwardly and forwardly beyond the rectangular frame. Supported by the upper bars 3 at approximately the center of the longitudinal extent of the frame is a plate 6 which projects beyond the top bars 3. Fastened to the upper surface of the plate 6 toward the front thereof are two spaced bearing plates 7 upon which is supported a second plate 8. The rear ends of the plates 7 are provided with a shoulder 9 to which is attached, by means of screws, the front end of a ticket carrying table 10.

Fastened to the projecting ends of the bottom bars 4 of the frame are bearings 11 in which are journaled a drive shaft 12 carrying a pulley wheel 13 on its rear end and which may be driven by any suitable source of power.

Freely rotatable on the shaft 12 is a sprocket wheel 14 and connecting said sprocket wheel 14 with the drive shaft 12 is a clutch. This clutch mechanism, for purposes of illustration only, may consists of a dog 15 fixed to the shaft and adapted to engage a shoulder 16 formed in a ring 17 borne by the sprocket wheel 14. The shoulder 16 of the ring 17 is maintained in engagement with the dog 15 of the shaft by means of retractile coil spring 18 connecting the ring and the sprocket wheel. Obviously, when the dog 15 of the shaft and the shoulder 16 of the ring 17 are in engagement, the sprocket wheel will rotate with the shaft.

A clutch-disengaging lever 19, having a hooked free end, is pivotally mounted on the frame intermediate its opposite ends. The end of the lever 19 opposite the hooked end is connected to a manually operable hand lever 20 (extending forwardly from the front of the apparatus and fulcrumed on the rear bottom frame bar 4) by means of a flexible cable 21. A retractile coil spring 22 is interposed between the frame and the rear end of the hooked clutch-releasing lever 19 to exert a force tending to elevate the rear end of said lever 19 and lower the hooked end of said lever. When the clutch is engaged, the cable 21 is taut to maintain the hooked end of the lever 19 elevated against the tension exerted by the spring 22.

When it is desired to disengage the clutch, the hand lever 20 is operated about its pivot to release the tautness of the flexible cable 20 thereby permitting the retractile coil spring 22 to exert a force lowering the hooked end of the clutch-disengaging lever 19. This action lowers said hooked end of the lever 19 so that it will engage a shoulder 23 formed in the periphery of the ring 17 to move said ring 17 about its fulcrum pivot 24 for disengaging the shoulder 16 from the dog 15 of the shaft. A fixed stop 25 is carried by the sprocket wheel 14 to limit the outward movement of the ring 17 during clutch-disengaging action.

While I have herein shown and described one form of clutch mechanism, it will be understood that other appropriate clutch mechanisms may be used so long as such clutch mechanisms are adapted to engage and disengage the shaft and sprocket wheel at a single predetermined point in the rotation of the shaft so as not to disturb the timing of the apparatus.

Journaled in appropriate bearings 26 carried by the transverse bar 5 is a cross shaft 27 carrying a sprocket wheel 28 which is connected to the sprocket wheel 14 by a sprocket chain 29.

Extending longitudinally of the apparatus is a front drive shaft 30, suitably journaled in appropriate bearings provided on the frame, said shaft 30 being adapted to be driven by a pair of meshed miter gears 31 borne by the meeting ends of the front drive shaft 30 and the cross shaft 27. Mounted on the opposite end of the front drive shaft 30 is a Geneva gear arm 32 which intermittently meshes with a Geneva gear 33 borne by the end of a lower front jack shaft 34 suitably journaled in appropriate bearings provided on the frame. The speed ratio between the front main drive shaft 30 and the front jack shaft 34 is preferably ten to one.

Extending longitudinally of the apparatus is a rear drive shaft 35, suitably journaled in appropriate bearings provided on the frame, said shaft 35 being adapted to be driven by a pair of meshed miter gears 36 borne by the meeting ends of the rear drive shaft 35 and the cross shaft 27. Mounted on the opposite end of the rear main drive shaft 35 is a Geneva gear arm 37 which intermittently meshes with a Geneva gear 38 borne by the end of a lower rear jack shaft 39 suitably journaled in appropriate bearings provided on the frame. The speed ratio between the rear main drive shaft 35 and the rear jack shaft 39 is preferably four to one.

The magazine for housing a supply of unfolded twin tickets to be individually fed to the apparatus is best shown in Figs. 4, 5 and 8 and comprises two spaced frames 40 having one side partially open, as shown in Fig. 8. Longitudinally extending spaced rods 41 pierce the frames and are retained in place by set screws 42 to provide an open top basket which may be filled or partially filled with unfolded tickets disposed as shown by broken lines in Fig. 5. The magazine is disposed at an angle, having its outer end elevated above the plane of the inner end so that the tickets will gravitate downwardly in the magazine toward the feed rolls of the apparatus. The upper or free end of the magazine is supported by an angularly disposed bracket 43 which has its inner end bolted to one of the plates 7. The magazine is pivotally supported on the bracket by a trunnion 44 received in a bearing 45 provided in said bracket. A ticket stop 46 connects the inner ends of the two lower rods 41 and supports the lowermost tickets in the magazine.

Downwardly and outwardly extending brackets 47 are bolted to the plate 7 and receive a shaft 48. Fixed to the shaft 48 is an arm 49 to the outer end of which is pivoted a link 50. A hinge 51 connects the upper end of the link and the lower frame 40 of the magazine and the lower end of the magazine is supported thereby.

In the process of feeding the tickets to the apparatus the lower end of the magazine is vertically oscillated. The mechanism for producing such oscillation comprises an arm 52 fixed to the shaft 48. Pivotally connected to the free end of the arm 52 is a connecting rod 53 whose upper end is pivotally connected to a bellcrank 54 mounted on the end of a rocking shaft 55 journaled in bearings provided in the plates 7. Another connecting rod 56 has one end pivotally connected to the bellcrank 54 and has its opposite end pivotally connected to a second bellcrank 57 which is pivotally carried by one of two bearing pedestals 58 bolted to the plate 8. The opposite arm of the bellcrank 57 is provided with a cam follower 59 which is adapted to ride the peripheral face of a cam 60 fixed to the end of a rotating cam shaft 61 journaled in bearings in the bearing pedestals 58. Obviously, the rotation of the cam 60, through the bellcrank 57 and connecting rod 56, causes rocking of the bellcrank 54 which, in turn, imparts reciprocal motion to the connecting rod 53. Such action results in oscillation of the arm 52 and its shaft 48. Since the lower end of the magazine is supported by the arm 49 fixed to the oscillating shaft 48, it would follow that such oscillation would be transmitted to the thereby supported magazine. In other words, the lower end of the magazine is alternately raised and lowered about its trunnion fulcrum 44 during the ticket feeding operation.

The cam follower 59 is maintained in constant contact with its cam 60 by a retractile coil spring 62, one end of which is attached to the bracket 43 and the opposite end of which is attached to the free end of an arm 63 fixed to the shaft 48. Manifestly, the force of the retractile spring 62 on the arm 63, its shaft 48; the arm 52; the connecting rods 53 and 56, and bellcranks 54 and 57 will at all times maintain the follower 59 in contact with the cam 60.

A ticket tamper is provided at the mouth of the magazine to keep the upper ends of the tickets in alignment prior to being individually introduced to the feed rolls. The tamping device comprises a longitudinal arm 64 pivotally mounted on the bracket 43 at 65 and supported by a pin 66 provided on the side of the bracket 43 intermediate the ends of the arm 64. Fastened to the inner free end of the arm 64 is a vertical member 67 and projecting from the top thereof and overlying the mouth of the magazine is a transverse member 68. A ticket tamping block 69 is fastened to the under surface of the transverse member 68. Everytime the magazine is repeatedly elevated during its oscillating movement, the upper ends of the tickets located at the mouth of the magazine will bump the block 69 and this repeated action keeps the upper ends of the tickets in alignment. Movement of the tamper is, of course, afforded about its pivot 65.

Adjacent tickets frequently adhere to each other and it is, therefore, desirable to provide some means whereby any bond between adjacent tickets may be broken so that individual tickets only will be introduced into the feed rolls from the magazine. The means provided in the instant apparatus for performing this function comprises an angular bracket 70 bolted to the plate 8. Extending from the vertical leg of the bracket 70 is a transverse leg 71 from which is suspended a rigid tongue 72 whose lower end is inwardly curved toward the bite of the feed rolls. The upper end of said guide tongue 72 is provided with a small boss 73. As the magazine is repeatedly elevated during its oscillating movement, the first several tickets in the mouth of the hopper are guided by the tongue 72 so that their upper ends engage the boss 73 just prior to the limit of the elevating movement of the magazine. This restricts further elevation of these specific tickets, but the magazine continues to move upwardly. Thus, the tickets engaged by the boss are bent or bellied forwardly so that any bond between adjacent tickets is broken.

Formed integral with and turned on the shaft 55 is a feed drum 74. Also formed integral with and turned on the shaft 55 on opposite sides of the feed drum 74 are rings 75 over which are forced ball or roller bearings 76. Counter bored discs 77 are pressed on the bearings 76 at opposite sides of the feed drum 74 to provide the lower feed roll. Frictionally contacting the lower feed roll is an upper feed roll 78 which is fixed to a shaft 79 journaled in a bearing 80. Said bearing 80 is provided with a plurality of hinge elements 81 which are pivotally attached, as by pintle pins 82, to complemental hinge elements 83 formed integral with the plate 8 so as to permit rocking movement of the bearing 80 and its shaft 79 for a purpose to be hereafter described. The outer end of the shaft 79 has fixed thereto a sprocket wheel 84 adapted to receive a sprocket chain 85 which is driven by a sprocket wheel 86 fixed to the front main drive shaft 30. Pressure between the upper and lower feed rolls is maintained by means of an adjusting screw 87 whose lower end is threaded into a tapped bore provided in a lug 88 formed integral with the bearing 80 and a compression spring 89 is interposed between said lug and the head of the screw to exert a downward pressure on the upper feed roll against the periphery of the lower feed roll.

Attached to the end plates 2 are opposite posts 90 which support a vacuum pipe line 91 to one end of which is connected a vacuum tank (not shown) and to the opposite end of which is connected a vacuum pump (not shown). A suction line 92 has one end connected to the vacuum line 91 and has its opposite end connected to an axial bore 93 provided in the shaft 55, which bore 93 connects with a pair of suction ports 94 which extend radially of the feed drum 74 to the periphery of said drum.

Referring, now, particularly to Figs. 4, 5, 9 and 11 of the drawings, the reference numeral 95 designates a spreader pin intermediate and supported by the pedestals 58 to which spreader pin 95 is fixed a short stationary arm 96 to which is pivoted the upper end of a depending swinging arm 97 whose lower end is bifurcated to receive a trunnion roller 98 attached to the side of a sliding block 99 whose lower surface bears against the plate 8. Said sliding block 99 is adapted to be reciprocated transversely of the apparatus toward and away from the ticket feed rolls between angular guides 100 attached to the plate 8 at opposite sides of the block. Reciprocation of the block is accomplished by means of a cam 101 fixed to the shaft 61 and adapted to contact a cam follower 102 carried by the swinging arm 97. A retractile coil spring 103 connects the swinging arm 97 to the frame of the apparatus and exerts a rearwardly tension so that the cam follower 102 is constantly maintained in contacting relation with its cam 101.

Slidably received in an axial bore provided in the block 99 is a suction rod consisting of a horizontal member 104 disposed within the bore of the block; a vertical depending member 105 located forwardly of the block, and a horizontally disposed suction finger 106 extending forwardly of the vertical member 105 and disposed in a slotted opening 107 provided in the plate 8, the upper surface of the suction finger 106 occupying substantially the same horizontal plane as the upper surface of the plate 8. An air passage 108, best shown in Fig. 5, is provided through a portion of the suction rod, one end of the air passage terminating at ports in the upper surface of the finger 106 and the opposite end of said air passage terminating at a port in the rod, which port is adapted to cooperate with a short air passage 109 provided in the block 99 and which is connected to the vacuum pipe line 91 by a vacuum line 110.

As above stated, the suction rod is slidable in an axial bore provided in the block 99, but such sliding movement is accomplished only by overcoming the friction exerted by a compression spring 111 disposed in a transverse bore of the block and retained therein by a removable plate 112. Obviously the force exerted by the spring 111 on the suction rod will result in the block and rod being moved as a unit until such time as the spring friction is overcome, as will hereinafter be described.

The ticket feed drum 74 is oscillated back and forth between the two continuously rotated discs of the lower feed roll 77, the feed drum being oscillated because it is integral with the rocking shaft 55 actuated by the bellcrank 54. The mechanism is so timed that the suction parts 94 are disposed adjacent the upper end of the lowermost ticket in the mouth of the magazine as the mouth end of the magazine is being elevated during its continuous oscillation. The suction of the air passing inward through the ports 94 removes the innermost ticket from the magazine and becomes adhered to the feed drum 74 and the feed drum immediately thereafter reverses its travel inwardly to introduce the upper end of the ticket into the bite of the feed rolls 77 and 78. The pressure between the two feed rolls is sufficient to strip the twin ticket from the feed drum and the latter reverses its travel outwardly to secure the next ticket from the magazine.

It might here be mentioned that the two bottom rods 41 and the thereby carried stop 46 may be adjusted rearwardly or forwardly to alter the angular disposition of the tickets with respect to the apparatus. If moved rearwardly, for instance, the upper ends of the tickets will be moved closer to the feed drum 74 and its ports 94. Such is desirable if comparatively thick or heavy gauge paper has been used to make the tickets because the attraction of the suction may not otherwise be sufficient to adequately attract and cause adherence of the heavy paper to the feed drum.

After the twin ticket passes through the feed rolls 77 and 78 it is deposited on the plate 8 beneath a depressing guide 113 in a position wherein its forward portion overlies the slotted opening 107. From this position it is moved rearwardly against an aligning straight edge 114 by the suction finger 106 so as to cause adherence of the ticket thereto. Simultaneously therewith the suction rod (of which the finger 106 is an element) and the block 99 are moved rearwardly as a unit by the back swing of the arm 97. Such rearward movement continues until such time as the protruding rear end of the suction rod engages the stationary stop 114. Further rearward movement of the suction rod is thus prohibited, but the friction exerted by the spring 111 is overcome and the block 99 itself continues its rearward movement slightly beyond this point to the limit of the rear stroke of the arm 97. Thus, the air passages 108 and 109 will be moved from registering relation and the suction force on the finger 106 will be cut off after the leading edge of the twin ticket has been aligned by contact with the straight edge 114. The block 99 and the suction rod move forwardly as a unit during the forward stroke of the arm 97 with their passages 108 and 109 out of register until such time as the leading edge of the finger 106 contacts the front wall of the slot 107. Further forward movement of the suction rod is thus prohibited, but the friction exerted by the spring 111 is overcome and the block 99 alone continues its forward movement slightly beyond this point to the limit of the forward stroke of the arm 97. Thus, the air passages 108 and 109 will again be moved into register and the suction force restored to the finger 106 for securing the next succeeding ticket—the ticket previously acted upon having been removed as will hereinafter be explained.

The next operation is to move the twin ticket across the plate 8 and longitudinally of the machine to a position in vertical alignment with and intermediate the male and female folding dies. The mechanism for accomplishing this function is best illustrated in Figs. 4, 9 and 11 and includes a cantilever slide bar 116 having an outer free end and an inner end permanently attached to one of the plates 7. A slide block 117, substantially of inverted U-shape in cross section, is longitudinally slideable on said bar 116, the block being retained on the slide bar by a fixed bottom plate 118.

The upper surface of the slide block 117 is provided with a pair of spaced bearing bosses 119 designed to receive a short rockable shaft 120. Fixed to the opposite ends of the shaft and extending therefrom is a pair of pusher fingers 121. The lower edges of the pusher fingers adjacent their free extremities are provided with downwardly extending thumbs 122 slidable in spaced, parallel furrows 123 provided in the upper surface of the plate 8.

Fixed to the rockable shaft 120 intermediate the bosses 119 is a sleeve 124 from which integrally formed rocking arms 125 vertically extend. Said sleeve also carries an integral tail 126 whose movement, as shown in Fig. 9, is confined to the distance between the top of the block 117 and a stationary limit stop 127 fixed to the top of the block. A connecting arm 128 has one end pivotally attached between the two rocking arms by a pin 129 and has its opposite end pivotally connected to the upper end of a lever 130. Said lever is pivotally connected to the frame of the apparatus, as shown at 131, and adjacent its lower end carries a cam follower 132 designed to contact a face cam 133 fixed to the shaft 30. A retractile coil spring 134 interposed between the lever 130 and the frame of the apparatus keeps the cam follower in constant contact with its cam, as shown in Fig. 14.

When the upper end of the lever 130 commences its forward stroke the energy is initially transmitted through the connecting arm 128 to the rocking arms 125 and thus to the sleeve 124; shaft 120 and the ticket pushers. Consequently, the initial energy is expended to slightly rotate the shaft 120 counterclockwise to lower the ticket pushers and place the thumbs 122 thereof in their furrows. Further rotation of the shaft 120 and lowering of the ticket pushers is prohibited by the tail 126 of the sleeve 124 contacting the limit stop 127. Thereafter, the force of the lever 130 during its forward working stroke is expended to slide the block 117 forwardly on its bar 116 with the ticket pushers lowered in operative position to engage the ticket and push it across the plate 8 until the opposite side edge of the ticket encounters a fixed stop 135 fastened to the plate 8 at which location the twin ticket is properly aligned and positioned between the male and female dies. At this point the direction of travel of the upper end of the lever 130 is reversed. The retracting force of the upper end of the lever is initially transmitted through the connecting arm 128 to the rocking arms 125 and thus to the sleeve 124 and the shaft 120 to which it and the pusher fingers are fixed. Consequently, the initial energy is expended to slightly rotate the shaft 120 clockwise to elevate the free ends of the fingers 121 and remove the thumbs 122 from their furrows to a point above the plane of the plate 8. Further rotation of the shaft 120 and elevation of the ticket pushers is prohibited by the tail 126 of the sleeve 124 contacting the top of the block 117. Thereafter, the force of the lever 130 on its retracting stroke is expended to slide the block 117 on its bar 116 with the ticket pushers elevated to clear the next succeeding twin ticket which has then been deposited over the opening 107 of the plate 8.

An appropriate friction brake, as the spring pressed stud 136 shown in Fig. 9, is preferably provided between the block and bar to eliminate objectionable backlash.

The mechanism for folding the twin ticket is best shown in Figs. 4, 7, 9, 11 and 12. It comprises a frame 137 mounted to the top of plate 8. Provided in the front face of the frame is a vertically extending way 138 adapted to receive a vertically reciprocable die block 139 whose opposite vertical edges are retained in place by guides 140 fastened to the front face of the frame. A lug 141 extends forwardly from the front face of the die block 139 and has pinned thereto a pair of connecting links 142 whose upper ends are pivotally connected to a bellcrank 143 freely rotatable upon the spreader pin 95. The opposite end of the bellcrank 143 is provided with a cam follower 144 designed to contact a plate cam 145 fixed to the shaft 61. Permanently attached to the opposite sides of the front portion of the bellcrank 143 are the lower ends of a pair of vertically extending plates 146. A rod 147 connects the upper ends of the plates 146 and protrude outwardly a distance from each of the plates, the opposite ends of said rod 147 each receiving the upper end of a retractile coil spring 148, the opposite, lower end of each of said springs being fastened to the frame. Obviously, the tension of the springs 148 will, through the intermediate means, maintain the cam follower 144 in constant contact with its cam 145. When the cam follower of the bellcrank rides the high portion of the cam, the die block will be elevated. Upon reaching the low portion of the cam, the tension of the retractile coil springs will exert a downward pressure on the plates 146 and the bellcrank 143 thereby swinging the bellcrank and through the link means 142 lowering the die block 139.

Located intermediate the guides 140 and extending forwardly from the die block 139 is a die holder 149 to which the male forming die 150 is appropriately and removably attached.

Attached to the guides 140 are vertically extending slideways 151 adapted to receive slide bars 152. The thickness of the slide bars 152 exceeds the depth of the slideways 151 so that said bars protrude slightly from the slideways throughout their entire longitudinal extent, as illustrated in detail in Fig. 10. Fastened to the front face of the slideway members and protruding therefrom are small pins 153. Plates 154 provided with apertures designed to accommodate the pins 153 contact the front faces of the slide bars 152 and are retained in assembled and frictional relation by L-shaped leaf springs 155 fastened to the front of the slideway elements and whose vertically depending tongues exert an inward pressure on the assembled parts.

Fixed to the upper ends of the slide bars 152 are inwardly extending plates 156, the opposite free ends of said plates having an aperture through which stud bolts 157 borne by the die block 139 extend. Limit nuts 158 are threaded on the ends of said stud bolts and sleeve-like spreaders 159 are interposed between the upper end of the die block and the plates 156. The apertures provided in the free ends of the plates 156 have diameters greater than the diameter of the stud bolts 157 but smaller than the limit nuts 158.

Fastened to the lower ends of the slide bars 152 are leaf springs 160 whose lower extremities have fixed thereto brackets 161 designed to receive the reduced opposite ends of a ticket stripper 162. Said stripper is circular in cross section except for that portion adapted to contact the rear surface of the male die, which latter portion is provided with a flat face 163.

Beneath the male die is the female die and its associated twin ticket folding mechanism, best illustrated in Figs. 5, 7, 12 and 14. It comprises a disc 164 formed integral with a shaft 165 journaled in a suitable bearing provided therefor in one of the plates 7. The outer end of said shaft 165 has fixed thereto a four station Geneva gear 166 designed to be intermittently rotated by a Geneva arm 167 borne by a hub 168 rotatably mounted on a spindle 169 fixed to the plate 7. A sprocket wheel 170 is fixed to the periphery of the hub 168 and is designed to be driven by the sprocket chain 85.

Permanently attached in recesses provided in the face of the disc 164 and projecting from said face are equally bifurcated bars 171 forming a plurality of female die members. As shown in the drawings (Figs. 5, 7 and 12) four such bars are provided equally spaced about the face of the disc 164. Each of said bars has a longitudinally extending slot 172, and one side is beveled, as shown at 173. As shown in Figs. 7 and 12, the under surface of the plate 8 is arcuately recessed to accommodate the periphery of the disc 164 and to dispose the tops of the bars 171 in substantially the same horizontal plane as the upper surface of the plate 8 when said bars are disposed beneath the male die. As shown in Figs. 7 and 9, a suction passage 174 is provided in the plate 8 and leads to a port 175 in the upper surface of the plate 8 in the vicinity of the die, the purpose being to attract and cause adherence of the tail of the twin ticket to the surface of plate 8 and hold said ticket in aligned position while the opposite end of the ticket is entering between the male and female dies. A suction line 176 leads from the passage 174 to the vacuum pipe line 91.

With the twin ticket positioned beneath the male die and overlying the female die the end portion of the ticket in vertical alignment therewith will be forced downward into the slot 172 of the female die during downward movement of the male die 150 to form the end of the ticket about the bottom edge of the male die forming a bight and folding a comparatively short length of the ticket upon itself, as shown in Fig. 12. The ticket stripper 162 and its associated mechanism remain stationary during initial downward travel of the die block 139 or until such time as the nuts 158 of the stud bolts 157 carried by the die block 139 engage the plates 156 attached to the slide bars 152. At this point the slide bars 152 and the thereby carried ticket stripper 162 also move downwardly with the down stroke of the die block, said movement taking place against the friction of the plate 154 exerted by the tension of the spring 155. Downward movement of the ticket stripper initially takes place at approximately the same time that the male die is entering the female die to give the twin ticket its initial fold and downward movement of the stripper continues until at the limit of its down stroke it rests on the top of the female die. A time lag is provided between commencement of the upstroke of the die block and the commencement of the elevation of the ticket stripper so that the folded ticket may be removed from adherence to the male die by the stripper and said folded end of the ticket may remain in the confines of the slot of the female die. To accomplish this function, the slide bars 152 and the attached plates 156 remain stationary until such time as the spreaders 159 engage the under sides of the plates 156 during the upstroke of the die block, as shown in Fig. 9, at which time the stripper and its associated mechanism are elevated along with the die block, this elevation of the stripper, however, not being initiated until the male die has been completely withdrawn from the slot of the female die and has been stripped from contact with the folded end of the ticket.

As shown in Figs. 5, 7, 12 and 14, a bottom slide plate 177 is attached to the inner side of one of the plates 7 and has two spaced guides 178 attached to the upper longitudinal edges thereof to receive a reciprocable slide bar 179. Reciprocable movement, transversely of the apparatus, is afforded by means of a roller 180 located in a slot 181 provided in the bar, said roller receiving the bifurcated upper end of a lever 182 pivoted intermediate its ends to the frame and designed to be actuated by a plate cam 183 fixed to the shaft 30 and contacting a cam follower carried by the lever 182. A retractile coil spring (not shown) intermediate the lever and the frame of the machine keeps the cam 183 in constant contact with the cam follower of the lever.

An L-shaped bracket 184 is bolted to the outer end of the slide bar 179 and has placed thereon a crimper blade 185. The crimper blade is retained in place by screws passing through slots 186 in the blade. Said blade 185 is capable of sliding movement on the bracket 184 by reason of the provision of the slots 186 and the fact that the retaining screws are not screwed in entirely home. A spring 187 carried by the end of the bar 179 bears against the outer end of the blade 185 to press the latter forwardly.

Also bolted to the bar 179 is a block 188 having bores designed to removably and adjustably receive a pair of knock-out pins 189.

After the end of the ticket has been folded by the die and the male die and ticket stripper have been elevated, the disc 164 and thereby carried female dies are rotated 90° counterclockwise by the Geneva gear 166 and Geneva arm 167, an arcuately curved guide 190 preventing the tail of the ticket from flapping outwardly. When the female die carrying the previously folded ticket reaches its new position, the slide bar 179 and its crimper blade 185 advances and the forward end of said blade, as shown in Fig. 12, forcibly contacts the ticket in the vicinity of the previous fold so as to rupture the fibres of the paper of the ticket and prepare it to be again folded transversely along the line contacted by the forward edge of the blade 185. If desired, the forward edge of the blade 185 may be provided with a V-shaped groove (not shown) to register with the apex of the bevel 173 of the female die to better rupture the fibres of the ticket.

The slide bar 179 and blade 185 are then retracted and the disc 164 and the thereby carried female dies are rotated another 90° counterclockwise by the Geneva gear 166 and Geneva arm 167 to position the female die in its bottom position and after a very short intermission is again rotated 90° counterclockwise to position the folded end of the ticket in alignment with a pair of ticket severing rolls 193. During the last 180 degrees of rotation the ticket is confined within the confines of a semi-circular guide 191 fastened to one of the plates 7. A suction line 192 connects with a port in the guide 191 and the suction attracts the unfolded tail of the ticket and prevents it from flapping around freely at this location.

Upon reaching a position in alignment with the ticket severing rolls 193, the slide bar 179 and block 188 advance and the knock-out pins 189 pass through registering bores 194 in the female die and the pins engage the folded end of the ticket and forces it between guide rods 195 into the bite of the severing rolls 193. As illustrated in Fig. 12, the twin ticket is automatically given another fold during this operation so that the end of the ticket is folded upon itself to complete the folding operation. The inner surface of the folded end of the twin ticket bears the printed matter to be rendered invisible and, manifestly, it is concealed from view by reason of that portion being folded upon itself.

It will, of course, be understood that each of the female dies carries a ticket during intermittent rotation of the disc 164 and that each of said tickets are in successive stages of the operation. It will also be understood that when the slide bar 179 is advanced, one of the tickets is crimped by the blade 185 while the ticket disposed diametrically opposite thereto is simultaneously being removed from the female die by the knock-out pins 189.

The function of the ticket severing rolls 193 is to longitudinally sever the twin ticket along the broken line indicated in Fig. 13 so that said twin ticket will be divided into two separate individual tickets of identical form. Said rollers, shown in Figs. 4, 5, 7, 12 and 14, are journaled in bearings provided in the plates 7, the bearings 196 for the upper roll being provided in blocks vertically slidable on the plate 7 and having a compression spring 197 (Fig. 4) interposed between the plate 8 and the bearing slide blocks 196 so as to press the upper roll down on the lower roll to provide pressure between said rolls.

The lower roll is driven by the sprocket chain 85 which meshes with the top of a sprocket wheel 202 fixed to the shaft of the lower roll, the sprocket chain being maintained substantially taut and in contact with the sprocket wheel by a roller weight 198 carried by an arm 199 pivoted to an appropriate part of the frame. The rolls 193 are rotated in opposite directions by meshing gears 200 fixed to the opposite ends of the shafts of the rolls. Cooperating annular knives 201 are formed on the rolls and sever successively presented twin tickets longitudinally to form two individual tickets, as hereinbefore referred to.

Extending inwardly from the plate 10 at a spaced distance from the bite of the rolls 193 is a projecting apron 203 over which is provided a spaced guide 204.

Located in the plate 10 are divergently and angularly disposed slots 205 designed to permit reciprocable movement of ticket carrying clips 206 provided on the top of posts 207 whose upper ends occupy the same horizontal plane as the upper surface of plate 10. Said posts 207 are carried by slide blocks 208 provided with grooves on the under side thereof and adapted to straddle and be slideable on divergently and angularly disposed slide bars 209, occupying parallel relation to the slots 205, and which are suspended from the under face of the plate 10 and spaced therefrom by spreaders 210. Suction ports 211 are connected by passages to suction ports 212 provided in the upper ends of the posts 207, and said suction ports 211 are intermittently supplied with suction through suction lines 213 controlled through an automatic valve 214 (Fig. 2) whose operation will hereinafter be described. A substantially triangular opening is provided in the plate 10 so as not to interfere with suction lines 213. The slide blocks 208 are maintained on the slide bars 209 by fixed bottom plates 215.

Figure 2:
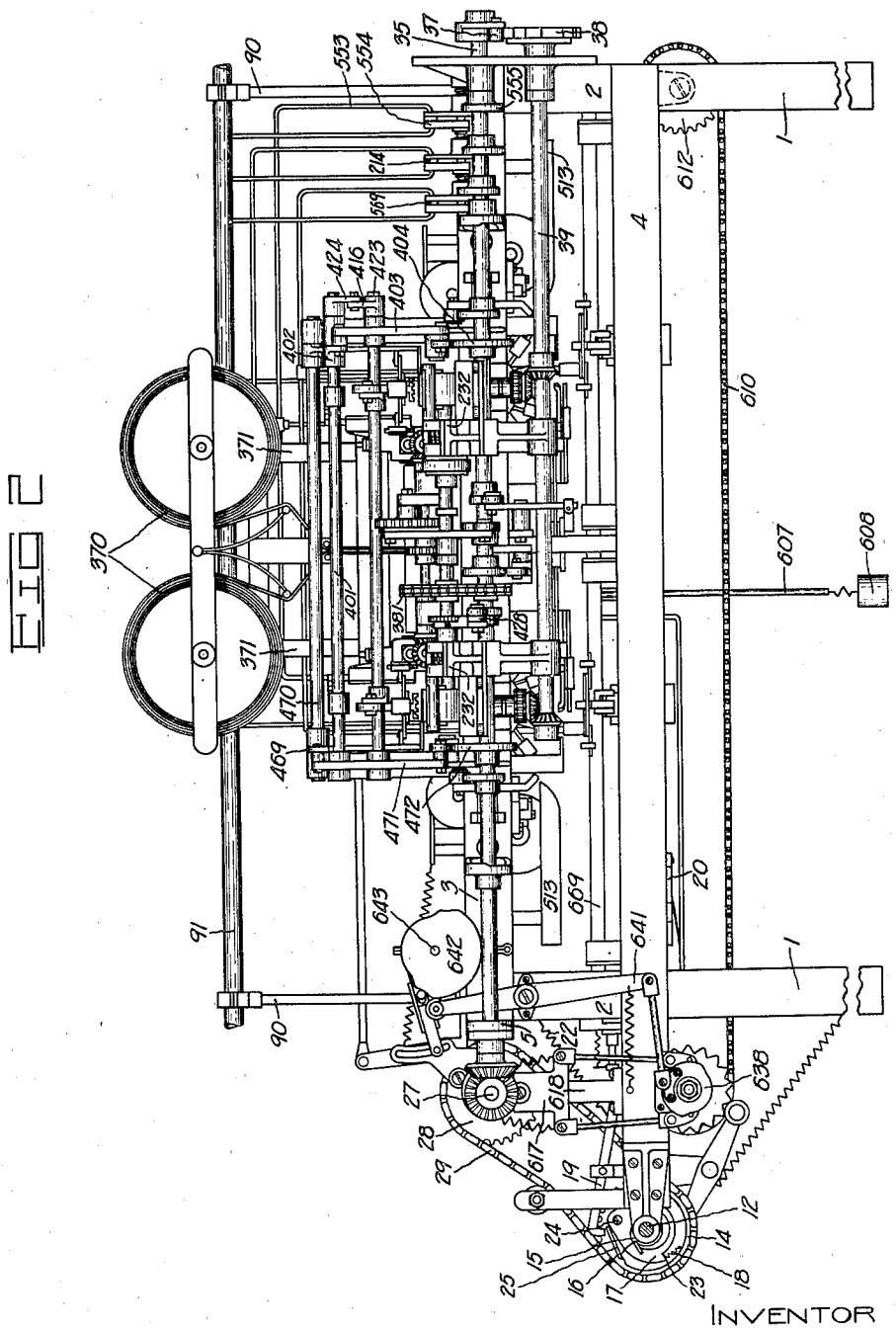
Figure 2 is a rear elevational view of the machine.

Downwardly projecting pins 216 extend from the under side of the slide blocks 208 and have their lower ends received in bushings 217. Said bushings 217 are received in oppositely disposed elongated slots 218 provided in a double arm slide plate 219, the latter having its central portion screwed on to one end of a dovetail slide 220 disposed for sliding movement between complemental guide plates 221 mounted to the top of plate 6. Said dovetail slide 220 is riveted to the free end of an arm 222 whose opposite end is provided with a rack 223 designed to mesh with a gear 224 freely rotatable upon a shaft 225 suitably journaled in bearings provided therefor on the plate 6 adjacent its rear edge. Fixed to the hub of the gear 224 is a pinion 226 meshing with a gear 227 carried by a bracket 228 whose lower end is supported from one of the bearing blocks for the shaft 225. A roller 229 is provided on the face of the gear 227 and is received by the bifurcated end of a rocking lever 230 which is freely rockable about a shaft 231. Said shaft 231 has its opposite ends journaled in bearings in a bracket 232 mounted to the rear top side bar 3, as shown in Fig. 2. The lower end of the rocking lever 230 has a cam follower 233 contacting a face cam 234 fixed to the rear main drive shaft 35. A retractile coil spring 235 interposed between the lever and the frame of the machine keeps the cam and its follower in constant contact.

Fastened to the plate 10 are plates 236 having recesses 237 of a shape similar to the rear termination of the slots 205 disposed beneath and with which they register. Spanning the recesses 237 and screwed to the plates 236 are smaller plates 238 from the forward edges of which a pair of spaced spring grippers 239 extend. The grippers 239 of each plate are spaced apart a distance equal to or exceeding the width of the ticket carrying clips 206.

After passing through the severing rolls, the severed individual tickets B pass between the apron 203 and the guide 204 and their forward or leading ends pass between the clips 206 and the top of the posts 207 with which each of the respective two tickets are aligned. At this point the two tickets travel different paths, one going to the left of the apparatus while the other goes to the right of the apparatus. Thereafter, each ticket is treated independently of the other, but both simultaneously receive the same operations of manufacture. In other words, one of the tickets separated from the twin ticket is further processed by mechanism mounted on the left of the apparatus while its companion severed ticket is further processed by mechanism mounted on the right of the apparatus. Since said mechanisms for further processing said tickets preliminary to mounting on the backboard are duplicates, only the mechanism borne by the right side of the apparatus is herein specifically shown and described.

After the leading end of the ticket B is disposed between the clip 206 and the top of the post 207 suction is applied to the port 212 by operation of the control valve 214. Immediately thereafter the rack 223 is pulled rearwardly by proper and timed operation of its actuating gear 224, pinion 226, gear 227 and rocking lever 230. This retracts the dovetail slide 220 and its double arm slide plate 219 as well as the attached slide block 208, posts 207 and clips 206. The parts attached to the double arm slide plate 219 above the latter travel angularly because the said parts are carried by the angularly disposed slide bars 209 and such angular movement is permitted by provision of the elongated slots 218 in the slide plate 219. Thus, the bushings 217 and the pins 216 of the slide blocks 208 move outwardly in the slots 218 of the plate 219 while they are at the same time being moved rearwardly. As a consequence, the post 207 and the clip 206 carrying the ticket B to the right of the apparatus travel in the right angularly disposed slot 205 of the plate 10, and such travel continues rearwardly until the clip 206 passes beneath the small plate 238 into the recesses 237 at which time the spring grippers 239 engage the upper surface of the ticket and disposes it over two spaced, parallel furrows 240 in the plate. At this time suction to the port 212 is discontinued by automatic actuation of the control valve and the ticket is immediately stripped from the grasp of the grippers 239 and moved longitudinally of the apparatus into one of the spokes 269 of a ticket carrying wheel 268 by means of pusher rods 252 which will hereinafter be fully explained.

Immediately after the ticket B is stripped from the grasp of the grippers 239 the travel of the rack 223 is reversed to a forward direction by means of its actuating mechanism. Thus, the clip 206 moves forwardly to secure the next succeeding ticket.

Referring, now, to Figs. 14, 15 and 19, the reference numeral 241 designates a pedestal bearing mounted on the plate 6. An L-shaped bracket 242 is fixed to the side of the pedestal bearing 241 and supports a plate 243. Said plate 243 is provided with two spaced, parallel furrows 244 which are in alignment with the furrows 240 of the plate 10. A rectangularly shaped bearing 245 is supported by the plate 243 and is adapted to receive a reciprocable slide bar 246. Pivotally attached to the opposite sides of a reduced end of the slide bar 246 are bellcranks 247 whose fulcrum is located at 248. A pin 249 extends from the opposite sides of the slide bar and is encircled by an aperture 250 in each of the bellcranks, the diameter of the apertures 250 exceeding the diameter of the proturding pin 249. Pinned to the free ends of the bellcranks 247 is an arm 251 which extends transversely of the apparatus and which is designed to receive depending ticket pusher rods 252 whose lower ends are receivable in the furrows 240.

Fixed to the opposite end of the slide bar 246 is a vertically extending bearing plate 253. Extending through said slide bar 246 and bearing plate 253 is a shaft 254 to one end of which is fixed a gear 255 and to the opposite end of which is appropriately fixed the upper ends of depending ticket puller arms 256 whose lower ends are vertically aligned with the furrows 244. A second gear 257 freely rotatable on a stationary pin 258 carried by the plate 253 meshes with the lower gear 255 and is fixed to a vertically extending arm 259 whose lower end is freely pivoted to the stationary pin 258. A connecting rod 260 connects the upper end of the arm 259 with the bellcrank 247, while a connecting bar 261 also connects the upper end of the arm 259 with an oscillator disc 262 fixed to a short shaft 271 journaled in a bearing 272 supported on plate 8 (Fig. 7). The oscillator disc 262 has one end of a longitudinally extending connecting bar 263 pivotally attached thereto, the opposite end of which is pivotally connected to a cam lever 264 supported from one of the end plates 2 and which cam lever 264 is rocked by a cam 265 (Figs. 3 and 1) fixed to the cross shaft 27.

Journaled in the bearing 241 is a short transverse shaft 265 to which a sprocket wheel 266 is fixed, a collar spacer 267 being interposed between the sprocket wheel 266 and the bearing 241. Fixed to the opposite end of the shaft 265 is a ticket carrying wheel 268 from the periphery of which extend rigid, radially disposed spokes 269. One end of a leaf spring 270 is fastened to the inner end of each spoke 269 to provide friction ticket-gripping fingers.

Said sprocket wheel 266 is intermittently rotated by a sprocket chain 273 which is driven by a sprocket wheel 274 fixed to the reduced portion of a shaft 275 journaled in a bearing 276 supported by the front upper frame bar 3. A spiral gear 277 is fixed to the end of the shaft 275 and meshes with a second spiral gear 278 fixed to the lower front jack shaft 34 which is intermittently rotated by its Geneva gear and arm. Thus, the ticket carrying wheel 268 is intermittently rotated on its shaft 265 so that at short periodic intervals one of the ticket-gripping fingers comes to rest momentarily to dispose its mouth or bite on a horizontal plane parallel to the upper surface of the plate 10 while the diametrically opposite finger simultaneously comes to rest to dispose its mouth or bite on a horizontal plane parallel to the upper surface of the plate 243, the latter being disposed at a lower level than plate 10 so as to compensate for the difference in thicknesses between the spokes 269 and leaf springs 270. So positioned, the finger parallel with the plate 10 is adapted to receive a ticket B in its grasp while the diametrically opposite finger is adapted to have a thereby carried ticket removed.

As the parts are depicted in Figs. 14 and 15, the ticket pusher rods 252 have completed forcing a ticket into the frictional grasp of its cooperating finger; the ticket pulling arms 256 have completed pulling a ticket from the grasp of the diametrically opposite finger, and the ticket carrying wheel has already commenced its intermittent rotation, the arm 251 having a recess in its side to permit clearance of the free end of the finger when rotation of the wheel commences.

At this point the mechanism has completed its working stroke and the upper end of the cam lever 264 is moved by its cam to the left of Fig. 1 so as to transmit motion in a similar direction to the connecting bar 263 which, in turn, is transmitted to the connecting bar 261 through the oscillator disc 262. This energy initially rotates the arm 259 and the gear 257 attached thereto counterclockwise of Fig. 15 causing the gear in mesh therewith to be rotated clockwise thereby swinging or elevating the puller arms 256 out of the furrows 244 and at a comparatively short spaced distance above the plate 243. The counterclockwise movement of the arm 259 pushes the connecting rod 260 downwardly, thereby swinging the bellcranks 247 clockwise about their fulcrum 248 to a point limited by engagement of the pin 249 with the lower side walls of the apertures 250 to thus elevate the arm 251 and elevate the lower ends of the pusher rods 252 from the furrows 240 and dispose them at a comparatively short distance above the plate 10. Thereafter, the force of the continued stroke of the cam lever 264 is expended to slide the bar 246 in its bearing 245 and carry the elevated pusher rods 252 and puller arms 256 to the left of Fig. 15 preparatory to commencing another ticket moving stroke. After reaching the limit of this stroke, the direction of travel of the cam lever 264 is reversed and the initial energy of this working stroke is expended in lowering the pusher rods 252 and puller arm 256 in a manner made apparent above. This places the lower ends of the pusher rods 252 in their furrows 240 and also places a toe part of the lower extremities of the puller arms 256 in the furrows 244, but the sole and heel part thereof is so disposed above the plate 243 that it will be disposed above a ticket on the plate 243 and prevent unfolding of the ticket. At this stage, diametrically opposite ticket carrying fingers are disposed in parallel relation with the plates 10 and 243. The energy of the continued working stroke of the cam lever 264 is expended to slide the bar 246 in its bearing 245 and carry the lowered rods 252 and arms 256 to the right of Fig. 15. Thus, the rods 252 engage one of the longitudinal sides of the ticket B held by the grippers 239 and force the folded end of said ticket into the bite and frictional grasp of the finger aligned with the plate, as shown in Fig. 22. Simultaneously therewith the toes of the puller arms 256 engage one of the longitudinal sides of the ticket borne by the diametrically opposite finger and strips it from its frictional grasp and moves it longitudinally of the apparatus across the plate 243 against an aligning stop 279 to dispose the ticket over a transversely disposed slot 320 provided in the plate 243.

An appropriate friction brake, as the spring pressed stud 280 shown in Fig. 15, is preferably provided between the slide 246 and its bearing 245 to eliminate objectionable backlash.

Reciprocating mechanism similar to that above described is provided at the left of the apparatus and is actuated by the connecting rod 281 pivoted to the oscillator disc 262.

It is imperative that the ticket carrying wheel 268 be rendered immovable during its periodic rest periods and that, at the same time, the ticket fingers be accurately aligned with respect to the plates 10 and 243. A registering device is provided for this purpose. It is best shown in Figs. 14, 20, 23 and 3, and comprises a plunger 282 having a squared end to prevent rotation journaled in a bearing 283 fixed to the frame member 3 and a circular portion journaled in a bearing provided in a bracket 284 carried by the frame member 3. Reciprocal movement is accorded the plunger by a face cam 285 carried by the front drive shaft 30 and contacting a cam follower 286 borne by the plunger 282. A retractile coil spring 287 connected to the plunger and the frame of the apparatus maintains the cam and its follower in constant contact. A beveled head 288 has a reduced shank 289 received in an axial bore provided in the end of the plunger. A spiral compression spring 290 is interposed between the inner end of the shank 289 and the bottom of the bore and the shank is maintained in the bore with restricted movement by means of an inwardly directed pin 291 carried by the plunger and whose inner end is received in a slot 292 in the shank 289. The beveled head is designed to cooperate with and periodically engage equally spaced, triangular notches 293 disposed about the periphery of a disc 294 fixed to the shaft 275.

When diametrically opposite ticket carrying fingers of the wheel are positioned with respect to the plates 10 and 243, the cam 285 moves the plunger 282 forwardly and its cushioned beveled head enters the aligned notch 293 of the disc 294 to accurately position and lock the disc 294 and its shaft 275 so that the diametrically opposite active fingers are precisely and positively positioned with respect to the plates 10 and 243 for receiving and discharging their ticket. An adjustable idler roller 472 is provided in a bearing borne by the plate 243 and exerts a pressure on the sprocket chain 273 to maintain said chain taut and devoid of any slack so as to prevent any backlash when the head 288 is in register with a notch 293 of the disc 294.

Referring now to Figs. 1, 3, 14, 20 and 24, the reference numeral 295 designates a stationary slide plate supported from the front top side member 3 of the frame and having an auxiliary support 296. Said plate is recessed throughout its longitudinal extent to provide a way to receive a slide bar 297. Oppositely disposed keeper plates 298 retain the bar in its way. Reciprocal movement of the bar 297 in the way of the slide plate 295 is affected by means of a link 299 having one end connected to a boss 307 formed on the bar 297 and having its opposite end connected to a swinging arm 300 whose upper end is fixed to a longitudinal shaft 301 journaled in bearings provided therefor in posts 302 supported by the bracket 284. A crank arm 303 fastened to one end of the shaft 301 is connected to the forked connecting rod 304, the lower forked end being freely received about an enlarged portion turned on the front drive shaft 30. Said lower forked end also carries a cam follower on its side adapted to constantly contact a plate cam 306 fixed to the shaft 30.

A boss 308 projects upwardly from the fore part of the slide bar 297. An arm 309 has an aperture intermediate its ends in which the boss 308 is received and said arm is pivotally connected to said boss by means of a pivot pin so that said arm may be rocked about the pivot pin as a fulcrum. A block 310 is fastened to the front end of the pivoted arm and has the rear end of a forwardly projecting, tapered, ticket transferring tongue 311 attached thereto. A spiral compression spring 321 is interposed between the under side of the front end of the arm 309 and the upper face of the slide bar 297. A limit screw 312 is threaded through the rear end of the arm and its lower end is adapted to contact the upper surface of the slide bar 297 to restrict the movement of the arm about its pivot exerted by the force of the compression spring.

Stationarily mounted on the outer keeper plate 298 and outwardly over-hanging therefrom is a small bearing block 313 adapted to receive a small, short shaft 314 (Fig. 24) whose inner end is cut away so that the portion underlying and contacting the arm 309 is semi-circular in cross section. A locking disc 315 is fixed to the outer reduced end of the shaft 314 and has a plurality of notches in the upper peripheral portion thereof. A spring keeper 316 has one end attached to a block fastened to the bearing block 313 and has its free end bent to conform with the contour of the notches of the locking disc. A trigger pin 317 has its inner end fixed to the shaft 314 and extends outwardly therefrom intermediate the arm 309 and the bearing block 313. A trigger actuating finger 318 is fixed to the boss 307 and a second trigger actuating finger 319 is fixed to the upper surface of the arm 309.

As will be understood, the ticket B when inserted in the ticket carrying wheel 268 is disposed with its folded end toward the rear of the apparatus and with the folded side uppermost. After the wheel revolves 180° and the ticket is stripped therefrom by the arms 256, the folded side of the ticket is underneath and is so disposed over the slot 320 of the plate 243, as diagrammatically depicted in Fig. 21.

Immediately after the ticket has been deposited over the slot, the slide bar 297 is moved forwardly by its actuating mechanism, and the pointed end of the tongue 311 which protrudes through the slot 320 slightly above the upper surface of the plate 243 recesses within the folded end of the ticket and engages the bight of the fold and slides the folded end of the ticket through a guide into the grasp of a clamping jaw, which mechanism will hereinafter be specifically described.

Shortly before reaching the limit of its forward working stroke, the finger 318 on the boss 307 contacts the trigger pin 317 and moves it arcuately to correspondingly move the shaft 314 against the resistance offered by the spring keeper 316 on its locking disc 315. Thus, the rounded cam surface rather than the flat plane surface of the inner extremity of the shaft 314 engages the under side of the rear portion of the arm 309 elevating it and lowering the opposite or forward end of the arm against the pressure of the spring 321 to lower the forward end of the tongue 311 below the plane of the upper surface of the plate 243 so that said tongue may be withdrawn during the retracting stroke without contacting or interfering with the next succeeding ticket which has, in the meantime, been deposited over the slot 320. Before the end of the retracting stroke is reached, the finger 319 contacts the trigger pin 317 and resets the tongue for its working stroke.

The guide for properly steering the tickets into the grasp of the clamping jaw, hereinafter to be described, will be understood after a study of Figs. 7, 14, 20 and 26. It comprises a plate 322 having a pair of beveled side guides 323 depending therefrom and a top guide 324. A rear limit stop and aligner 325 depending from the plate assists in assuring proper positioning of the ticket at the limit of the working stroke of the tongue 311. Said plate 322 is fixed to the lower end of a reciprocable plunger 326 which is received in a stationary bearing block 327 supported by a frame member 328 carried by a shear housing 329. A guide arm 330 having an aperture for the reception of a stationary guide post 331 prevents rotation of the plunger 326. A retractile coil spring 332 connects the plate 322 and the bearing block 327.

A rocking crank arm 333 having a roller 334 contacting the upper end of the plunger is fixed to a rockable shaft 335 journaled in bearings 336 borne by vertically extending frame members 371 attached to the frame member 328. A crank arm 337 (Fig. 7) is fixed to the rockable shaft 335 and has its opposite end pivotally connected to a link 338 which, in turn, is pivotally connected to the lower end of a lever 339 freely suspended from a stationary horizontal arm 340 fixed to the spreader pin 95. Said lever 339 has a cam follower 341 designed to contact a two station plate cam 342 fixed to the shaft 61. A retractile coil spring 343 connects the lower end of the lever 339 and a stationary bracket 344 to keep the follower in contact with the cam. As shown in Fig. 20, a similar spring 345 maintains the crank arm roller 334 in contact with the upper end of the plunger 326.

Manifestly, engagement of the cam follower 341 by a low point on the periphery of the cam 342 will, through the intermediate mechanism, depress the plunger 326 and its plate 322 to a point where the guides associated therewith are properly positioned at the end of the slot 320 to steer the folded end of the ticket into the awaiting opened jaws associated with a ticket clamping wheel now to be described.

Details of the ticket clamping wheel which receives the folded ticket pushed therein by the tongue 311 will best be understood by referring to Figs. 14, 15, 20 and 36. It comprises a wheel 346 whose hub 347 is fixed to the inner end of the intermittently rotated shaft 275. Disposed about the periphery of the wheel are the inner ends of equally spaced, radially disposed spokes 348 whose outer ends serve as stationary jaws for the reception of a ticket B. The outer ends of the spokes are provided with a dovetail opening 349 to accommodate the ticket conveying tongue 311 during its reciprocating movement. The outer ends of the spokes forming the stationary jaws are extended to provide beveled projections 350 at each side of the openings 349.

A bearing plate 351 is fastened to one side of each spoke 348 and houses therein in sliding relation the shank 352 of a movable jaw 353 cooperable with its complemental stationary jaw 348. The movable jaw 353 is normally maintained in clamping contact with its stationary jaw 348 by a retractile coil spring 354 having one end attached to the movable jaw and its opposite end attached to the spoke of the next preceding stationary jaw.

A stud 355 is fixed to the lower end of each shank 352 and extends horizontally therefrom to cooperate with the turned ends of a pair of actuating levers 356 independently fulcrumed intermediate their ends to a bracket 357 depending from the plate 6. The opposite ends of the levers 356 are provided with rollers 473 designed to ride an inner cam race 358 provided on the inner surface of a flange of a cam wheel 359. Said cam wheel, as shown in Fig. 18, is fixed to a rockable cam shaft 360 journaled in bearings 361 and 362. A rockable crank arm 363 is fixed to the end of the cam shaft 360 and is attached to an actuating connecting rod 364 (Fig. 1) which extends longitudinally of the apparatus and is attached to a cam lever 365 reciprocated by a cam 366 (Fig. 3) fixed to the cross shaft 27. An appropriate coil spring 368 (Fig. 1) maintains the lever in contact with its cam.

The operation of the above described mechanism will best be understood by reference to Fig. 15. The race 358 of the cam wheel 359 is designed so that at the limit of one direction of its oscillation the roller inner ends of the levers 356 will be moved toward each other thereby moving the opposite ends away from each other against the resistance of a retractile coil spring 367. This movement takes place at a time when, during intermittent rotation of the clamping wheel 346, one of the clamping jaw assemblies comes to rest in alignment with the slot 320 and ticket conveying tongue 311. Thus, the turned ends of the actuating levers 356 engage the studs 355 of diametrically opposite movable jaws and forces the movable jaws from the stationary jaws. The upper jaw, aligned with the slot 320, receives a ticket conveyed thereinto by the tongue 311, the folded end of the ticket being disposed so that its folded end projects from the jaw and is free of its grasp, as shown in Fig. 35. The diametrically opposite jaw is discharging a banded ticket, as will hereinafter be explained. The ticket clamping wheel is maintained immovable and in proper alignment during this operation by the registering device 288 previously described. After receiving and discharging tickets at opposite points, the cam wheel 359 is rotated in the opposite direction to retract the turned ends of the actuating levers, permitting the springs 354 to again close the jaws. At this point, the folded end of the ticket within the grasp of the upper jaw is in position to receive the paper band by means of which the folded end is retained folded.

The paper band by means of which the folded end of the ticket is bound comprises a rectangular strip of paper 369 severed from a spool of paper tape 370 supported by the vertical frame members 371. From the spool the paper tape is fed downwardly into a shearing mechanism which will best be understood by reference to Figs. 25, 26 and 27.

The shearing mechanism comprises a lower housing 372 bolted to the plate 6. The upper surface of the lower housing has spaced, transversely adjustable, longitudinally disposed guide plates 373 between which the paper tape 370 is fed to the shear. A bottom guide plate 374 is screwed into a longitudinal furrow in the upper face of the housing 372 and its forward end extends between the tape feeding rolls. A manually removable weight 375 is disposed on the housing between the side guides 373 to serve as a brake and prevent excess tape being unreeled from the spool.

The lower tape feeding roll 376 consists of a semi-cylindrical portion, preferably formed integral with its reduced shaft 377, which latter is suitably journaled in bearings provided therefor in the housing 372. One end of the shaft 377 has a bevel drive gear 378 fixed thereto which meshes with another bevel gear 379 borne by one end of the shaft 225. Said shaft 225 has a sprocket wheel 380 receiving a sprocket chain 381 continuously driven by a sprocket wheel borne by the rear drive shaft 35. The opposite end of the lower feed roll shaft 377 has a spur gear 381 pinned thereto, and the body of the semi-cylindrical feed roll 376 has an annular groove 382 so as to clear the bottom guide plate 374.

The upper housing is designated by the reference numeral 329. Its opposite sides are provided with square apertures to receive floating bearings 384 in which is journaled the reduced shaft 385 of a larger semi-cylindrical upper feed roll 386. Said roll 386 also has an annular groove 387 to accommodate and clear an upper tape guide plate 388 fixed to the rear wall of the upper housing and bent forwardly so as to extend between the feed rolls.

Pressure is exerted between the two feed rolls by means of connected spring pressed pins 389, the amount of tension exerted being capable of adjustment by manual manipulation of the screw 390 whose lower end is threaded into the housing. The upper roll is driven by means of a spur gear 391 which meshes with the spur gear 381 of the lower shaft, as will now be described.

Obviously, the paper 370 will be grasped between the bite or meeting surfaces of the continuously rotated rolls and fed to the reciprocating shear for severing. The length of tape to be fed with each revolution of the feed rolls is capable of adjustment by means provided on the upper shaft 385. As shown in Figs. 27 and 28, the upper shaft projects beyond the corresponding end of the lower shaft. The hub of the upper spur gear 391 is extended and has a disc 392 pinned thereto. The outer face of said disc 392 is designed to contact the inner face of a second or outer disc 393 pinned to the shaft. The outer disc 393 has a circular slot 394 through which extends a cap screw 395, the inner end being received in a threaded bore (not shown) in the face of the inner disc 392. Thus, power transmitted from the lower spur gear 381 to the spur gear 391 will be transmitted to the inner disc 392, then to the outer disc 393 and then to the shaft 385 to which the outer disc 393 is pinned. If the upper and lower feed rolls are set so that their entire respective semi-cylindrical peripheries meet during rotation, a strip of paper tape in length equal to the semi-circumferential measurement of the rolls will pass through and be fed to the shear with each revolution. However, the cap screw 395 may be retracted so as to disengage the two discs 392 and 393 and the outer disc 393; the shaft 385 and the upper feed roll 386 may be manually and independently rotated to adjust the relative position of the semi-circular face of the upper roll with respect to the semi-circular face of the lower roll. For instance, the upper roll may be rotated 90° and the cap screw 395 again tightened. Thus, when the feed mechanism is again operated the semi-circular portions of the two feed rolls will contact each other only during 90° of their rotation and a strip of paper tape in length equal to this measurement will pass through and be fed to the shear with each revolution.

The shear knife 396 is fastened to the lower end of a reciprocable shear block 397 designed to slide in a way provided therefor in the front face of the upper housing and retained in said way by opposite keeper plates 398. The upper end of the shear block 397 has a roller 399 adapted to receive the forked end of a rocking arm 400 fixed to a rocking shaft 401. The rocking shaft 401, as shown in Fig. 2, extends longitudinally of the apparatus and is actuated by a crank arm 402 pivotally connected to a depending link 403 actuated by a face cam 404 fixed to the rear jack shaft 39.

Obviously, a predetermined length of paper tape is fed by the feed rolls for each vertical reciprocation of the shear.

Mechanism is provided for receiving the severed length of paper tape, hereinafter to be referred to as the retaining band, applying a quantity of adhesive to one surface thereof, and then transporting it to a position underlying a folded end of a ticket held within the grasp of one of the clamping jaws of the clamping wheel 346. This mechanism is best illustrated in detail in Figs. 20, 25 and 26. It comprises a bearing 405 bolted to the frame member 3 in which is journaled a vertical shaft 406. A miter gear 407 is fixed to the lower end of the shaft and meshes with a miter gear 408 fixed to the intermittently rotated back jack shaft 39.

Received about the upper end of the intermittently rotated shaft 406 and splined thereto by a feather key is an elongated hub 409 or sleeve from the upper circular plate 417 of which radiate four equally spaced arms 410. Borne by the outer end of each of the arms is a slide bearing 411 having a vertical slideway to slidably receive therein the vertical shank 412 of an inverted T-shaped adhesive applicator 413 whose lower surface is uniformly notched or recessed so that adhesive may be applied to the ticket in small, spaced areas. A keeper plate 414 retains the shank 412 in its slideway. A pin protrudes from the keeper plate 414 and is connected by a retractile coil spring 415 to a similar pin protruding from the shank 412 above the keeper plate to normally maintain the adhesive applicator 413 depressed.

A spiral compression spring 418 is interposed between the under side of the circular plate 417 and the inner end of a counter bore provided in the upper end of the vertical shaft 406. A stud 419 formed on the lower end of a pin 420 is removably received in a centrally disposed aperture provided in the plate 417.

Said plate 417 and its associated elements are adapted to be vertically reciprocated on the splined shaft 406 by means of a rocking arm 421 carrying a roller 422 adapted to engage the upper extremity of the pin 420. The arm 421 is fixed to a rocking shaft 423 which, as shown in Fig. 2, has a forked arm 416 fixed to one end thereof which receives a roller (not shown) carried by an oscillating link 424 fixed to the end of the oscillating shaft 401 operating the shear blade. Obviously, oscillating movement of the shaft 401 will thereby be transmitted to the oscillating shaft 423 for rocking the arm 421 for depressing the plate 417 and the thereby carried adhesive applicators 413 against the tension of the compression spring 418.

At the downward limit of the depression of the plate 417, one of the adhesive applicators 413 (that one shown at the right of Fig. 20) contacts an intermittently rotated glue roll 425 which carries a coating of adhesive on its periphery because the lower portion thereof is immersed in a quantity of adhesive contained in a reservoir 474 supported from the bracket 232.

Figure 3:
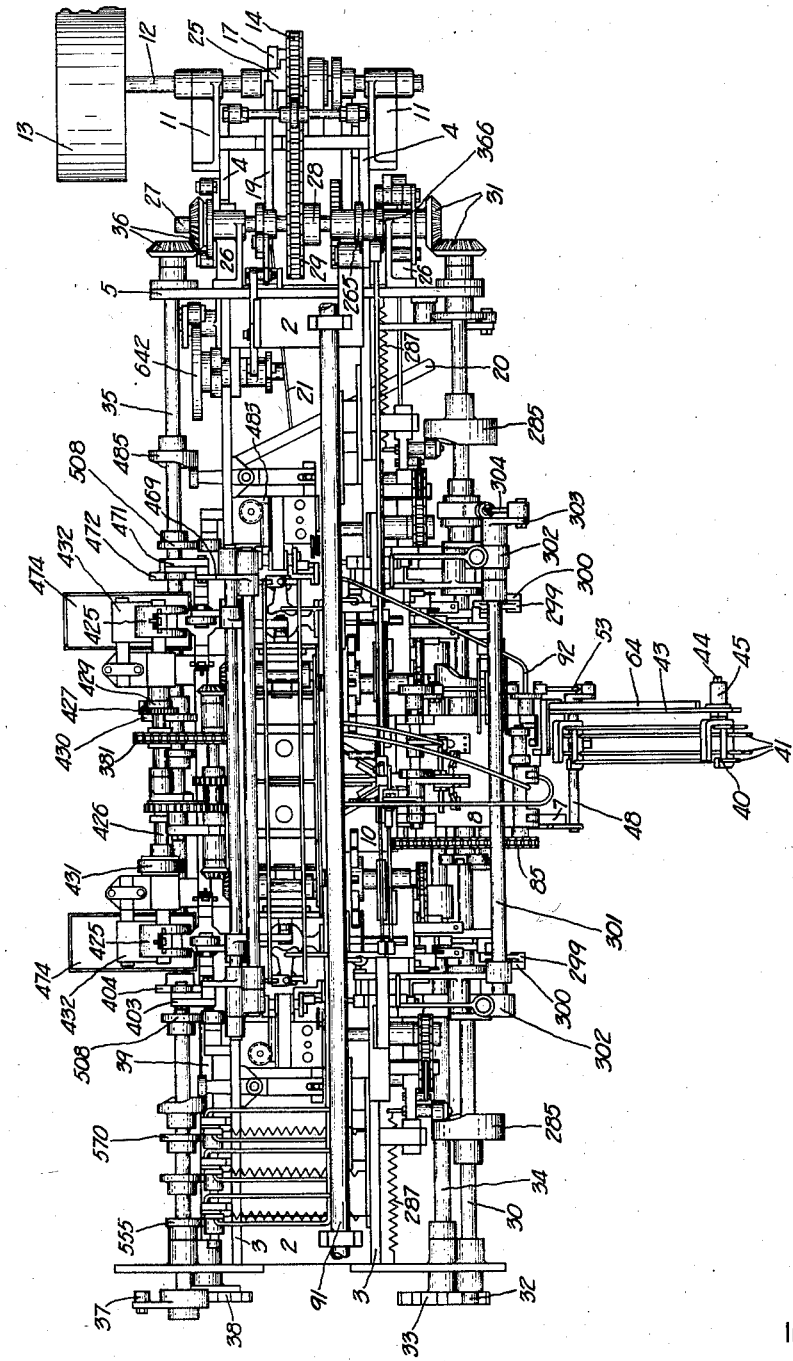
Figure 3 is a top plan view of the same.
Figure 38:
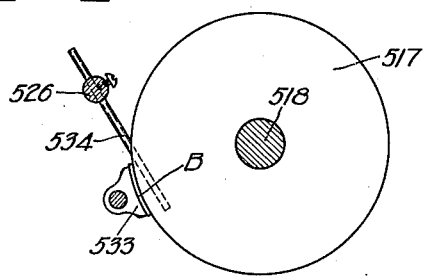
Figure 38 is a detail view in front elevation of the glue roll and associated mechanism for applying adhesive to the tail of the ticket during the banding operation.

The glue roll 425 is fixed to a longitudinally extending shaft 426 located at the rear of the apparatus, as shown in Figs. 2 and 3, and is journaled in bearings borne by the bracket 232. A ratchet wheel 427 is also fixed to the shaft 426 and cooperates with a spring pressed pawl 428 carried by an arm projecting from a sleeve 429 which is free to be rocked about the shaft 426. The outer end of the arm carries a roller which contacts a plate cam 430 on the rear drive shaft 35. The cam is designed to rock the arm carrying the pawl 428. When so elevated, the pawl engages the ratchet wheel 427 and thus intermittently rotates the shaft 426 and the thereby carried glue roll 425 to assure a coating of adhesive on its periphery. Such intermittent rotation of the shaft 426 is effected against the resistance of an appropriate brake 431 which eliminates any free rotation of the shaft 426.

A stationary scraper blade 432 (Fig. 20) is designed to assure a uniform coating of adhesive on the periphery of the glue roll.

A bracket 433 is bolted to the frame member 3. The outer free end of the bracket has an aperture for receiving the lower reduced end of a sleeve bearing 434 in which is journaled a vertical shaft 435. The shaft 435 is intermittently rotated by means of a sprocket chain 436 connecting a sprocket wheel 437 fixed to the lower end of the shaft 435 and a sprocket wheel 438 fixed to the lower end of the shaft 406.

Keyed to the shaft 435 adjacent its upper end is a hub 439 having four equally spaced arms 440 radiating therefrom. The outer ends of said arms are appropriately formed to provide guides 441 designed to receive the vertical shanks 442 of T-shaped retaining band carriers 443. Said carriers are normally maintained depressed in their slides by retractile springs 444 which connect the carriers with their stationary slide members.

The upper surfaces of the carriers 443 have a plurality of suction ports 445 which connect with suction passages 446 in the carriers and their shanks. The passages 446 are designed to register with suction passages 447 provided in the arms 440 and hub 439. Each of the passages 447 comprises a horizontal passage; a passage extending upwardly from the inner end of the latter, and a downwardly extending passage located at the outer extremity of the horizontal passage. The downward passage is actually a vertical slot or elongated recess in the inner wall of the guides 441 so that the passage 446 will always be in register regardless whether the band carrier 443 is raised or lowered in its slide.

An oscillating valve 448, the operation of which will hereinafter be described, is rotatable about the upper end of the shaft 435 and is retained thereon by a nut 449. A spring washer 450 is interposed between the nut and the top of the valve so that the latter will be tightly pressed against the hub 439 to prevent leakage of air. The under face of the valve 448 has a circularly disposed recess 451 of approximately 270° in extent.

As shown in Figs. 20, 25, 26 and 29, when the hub 439 is at rest between periods of intermittent rotation, one of the band carriers 443 is disposed below the paper tape shear; another is disposed below one of the adhesive applicators 413, while the one diametrically opposite the latter is disposed below the folded end of the ticket heed in one of the jaws of the ticket clamping wheel 346. Encircling the bearing 434 and vertically slidable thereon is a flanged sleeve 452 to which is fixed a plate 453. Disposed about the upper surface of said plate are three spring cushioned bumper blocks 454 so arranged that one of them will be in vertical alignment with the lower ends of the shanks 442 of the band carrier specifically mentioned above.

As specifically shown in Fig. 29, the sleeve 452 and the elements carried thereby are designed to be vertically reciprocated by rockable arms 455 whose rollers 456 underlie the sleeve 452. Said arms 455 are fixed to a rockable shaft 457 journaled in bearings 458. Said shaft is rocked by a crank 459 fixed to the shaft and having a depending link 460 pivotally attached to a cam lever arm 461. The lever arm 461 is fulcrumed in bearings 462 and its outer free end has a cam follower 463 which contacts a plate cam 464 fixed to the rear drive shaft 35. Depression of the cam end of the lever 461 will through the intermediate mechanism elevate the roller ends of the arms 455 to elevate the sleeve 452 and all the elements thereby supported, and the sleeve and said elements will drop by gravity when the cam 464 is not functioning to cause elevation.

When the sleeve 452 is elevated, the bumper blocks 454 engage the lower ends of the band carrier shanks 442 with which they are vertically aligned thereby elevating said carriers 443. The carrier beneath the paper tape shear receives a severed retaining band. Another receives an application of adhesive by one of the applicators 413 to the upper surface of a band carried thereby which band was received from the shear during the next preceding rotation of the hub 439; the plate 417 and its adhesive applicator 413 being depressed synchronously with the elevation of the band carriers. The band carrier diametrically opposite the one receiving the adhesive is elevated so that the glued surface of its retaining band contacts the under side of the folded end of the ticket last received by the clamping wheel and said band is disposed transversely of the ticket with its opposite end portions projecting from the opposite sides of the ticket, as shown diagrammatically in Fig. 21. When the last mentioned ticket carrier is elevated to position the retaining band on the folded end of the ticket, the plate 322 borne by the reciprocable plunger 326 is depressed to a point below the plane which it occupied when functioning to guide a ticket into the grasp of the clamping wheel, such additional depression being coincidentally caused by the cam follower 341 contacting the lowest station of the actuating two-station cam 342. An anvil plate 465 is fastened to the rear limit stop 325 depending from the plate 322 so that, when the plunger 326 is further depressed, as aforesaid, the anvil plate 465 will strike the upper surface of the folded end of the ticket, as shown in Fig. 35, to press the ticket and band together to cause adherence of the band to the under side of the ticket.

The retaining bands are retained on the upper faces of the carriers by suction applied to the ports 445 through the passages 446, 447 and the circular recess 451 of the valve 448, the latter, as shown in Fig. 25, having a circular extent sufficient to service the four radially disposed carriers. Suction force is supplied to the valve's recess 451 through a vacuum line 466 connected to the main vacuum pipe line 91. Suction to the ports 445 of the carrier whose band is to immediately be affixed to a ticket must be discontinued in order to affect transfer of the thereby carried band to the ticket. Thus, the valve is actuated at this point to interrupt the supply of suction to this single specific carrier.

The construction and operation of said valve is as follows: An arm 467 has its yoke-like inner end fixed to the top of the valve 448. The outer end is connected to a link 468 which in turn is connected to a bellcrank 469 fixed to a rockable shaft 470 (Figs. 2 and 3) extending longitudinally of the apparatus. The shaft 470 is rocked by a cam lever 471 fixed to the opposite end of the bellcrank 469 and the lower end of the lever has a cam follower contacting a plate cam 472 fixed to the rear drive shaft 35 and so maintained by an appropriate retractile spring.

When the carrier transporting the band to be immediately applied to a ticket is elevated and the glue bearing surface of the band becomes adhered to the underside of said ticket, the cam lever 471 is actuated by its cam 472 to move the outer end of the yoke-like arm 467 to rotate the valve 448 counterclockwise approximately 90°. Thus, the segmental portion of the valve which is devoid of the recess 451 registers with this particular carrier, thereby discontinuing suction to its passages 446 and parts 445.

At this point, the cam 464 ceases to function and the sleeve 452 and all the elements thereby supported, including the three aforementioned carriers 443, drop by gravity. Thus, one of said carriers drops with a band just severed from the paper tape; another drops with adhesive applied to the upper surface of the band carried thereby, and the carrier opposite the latter drops empty devoid of the band immediately applied to the ticket.

Immediately thereafter, through their respective actuating means, the hub 439 and its band carriers 443, as well as the circular plate 417 and its adhesive applicators 413, are rotated 90°. The ticket clamping wheel is simultaneously rotated a distance to position the next succeeding jaw in a position to receive a ticket from the tongue 311, after which the operation is repeated.

As shown in Figs. 20 and 25, a pair of fingers 475 are provided on a block 476 slideably supported on a stationary post 477. The fingers are adapted to contact the opposite ends of the elevated retaining band receiving the adhesive and prevent the band from adhering to the adhesive applicator when it is separated from the latter.

As shown in Fig. 25, a pair of stabilizing bars 478 are fastened to the plate 453. Their free ends contact the rear frame member 3 and prevent chance rotation of the plate 453 and the bumper blocks 454.

The band wrapping station, where the previously applied retaining band is wrapped around the folded end of each succeeding ticket, is located at a spaced distance from the band receiving station. As illustrated in the drawings, it is preferably located about 90° from the band receiving station.

The mechanism for wrapping the band about the ticket is shown in Figs. 15, 30, 31, 32, 33, 34, 36 and 37. The mechanism comprises two oppositely disposed clamping jaws between which a portion of the folded end of the ticket is grasped during the wrapping operation. One clamping element 479 has an upper jaw 479a and a lower clamping jaw 479b while the opposite clamping element 480 has a corresponding upper jaw 480a and a lower jaw 480b.

The faces of the jaws 480a and 480b are larger in area than the corresponding confronting faces of the jaws 479a and 479b. As will be observed in the drawings, the jaws 480a and 480b have inclined, exposed faces which are not covered by the jaws 479a and 479b when the opposed jaws are brought together to clamp a ticket therebetween. These exposed areas function as backing areas against which pressure is applied when the retaining band is finally wrapped and affixed in place.

The clamping element 479, as shown in Figs. 30 and 32 is fastened to a rack 481 slidably received in a casting 482 carried by a plate 483 attached to the frame member 3. One end of the rack 481 is pivotally connected to the forked end of a cam lever 484 actuated by a face cam 485 fixed to the rear drive shaft 35. Said rack 481 meshes with a pinion 486 rotatable in a recess provided therefor in the casting 482 and said pinion also meshes with a second rack 487 slideably received in the casting 482. One end of the rack 487 has a curved arm 488 attached thereto and supports the clamping element 480. So arranged, the jaws 479a and 480a oppose each other and, likewise, the jaws 479b and 480b are oppositely disposed. When the cam end of the lever 484 is moved to the right of Fig. 30, the oppositely disposed jaws will be moved together for clamping a ticket therebetween and vice versa.

The mechanism for actually wrapping the band around the ticket comprises upper and lower rollers 489. Each roller is free to rotate on a small pin 490 carried by the free end of an arm 491 which, in turn, is free to rotate on a stationary pin 492 carried by a disc 493. Arcuate movement of the arms 491 in one direction is restricted by the provision of an adjustable limit stop 494 fixed to the face of each disc 493. The pins 490 have inward extensions which are designed to rest against one end of the limit stops 494 and are normally retained in this position by a retractile coil spring 495 which is connected to the pin extension and the face of the disc.

The discs 493 are fixed to shafts 496 which extend through the casting 482 and the shafts carry pinions 497 which mesh with the teeth provided on the opposite upper and lower sides of a rack 498 disposed therebetween and slideable in a way provided therefor in the side of the casting. A rack 509 is attached to or formed integral with the rack 498 and has teeth formed in its exposed side wall.

Journaled in a bearing 499 on the plate 483 is a vertical shaft 500. A pinion 501 is fixed to the upper end of the shaft and meshes with the rack 509 attached to the rack 498 disposed between the two pinions 497. Another pinion 502 is fixed to the lower end of the shaft and meshes with a rack 503 appropriately supported for sliding movement on the under side of the plate 483. Said rack 503 extends transversely of the apparatus and at a right angle to the racks 498 and 509. Said rack 503 carries a roller 504 designed to receive the forked lower end of a cam lever 505 fulcrumed intermediate its ends in a bearing 506 bolted to the rear frame member 3. The upper end of the lever 505 has a cam follower 507 contacting a plate cam 508 fixed to the rear drive shaft 35. Referring to Figs. 30 and 31, when the lower end of the cam lever 505 moves the rack 503 forwardly, the pinions 501 and 502 are rotated counterclockwise. This causes the racks 498 and 509 to move to the right. The pinion 497 in mesh with the upper teeth of the rack 498, as well as its shaft 496 and disc 493, are consequently rotated counterclockwise while the pinion 497 in mesh with the lower teeth of the rack 498, as well as its shaft 496 and disc 493, are rotated clockwise. This is the action when wrapping a band around a ticket.

Assuming that the ticket clamping wheel 268 during its intermittent rotation presents a ticket between the opened upper clamping jaws 479ª and 480ª. When so presented the retaining band has its opposite ends protruding from the opposite edges of the ticket, as illustrated in Fig. 21. Through the actuating mechanism hereinbefore described, said jaws are moved together to grip the upper one half of the area of the folded end of the ticket, the remaining lower one half of the ticket being exposed and backed by the area 480ª exteriorly of the cooperating ticket gripping jaws. Promptly following closing of the jaws, the lower end of the cam lever 505 is moved inwardly to rotate the discs 493 as above described. When so rotated, the upper roller 489 will contact the lower suspended end of the retaining band and fold it upwardly and around the lower edge of the ticket, the limit stop 494 being so set that the roller turns the corner of the jaw 480ª without excess pressure on the retaining band or the ticket to give a neat and satisfactory wrap at this point. Continued rotation of the upper disc 493 will cause the upper roller 489 to follow the inclined inner exposed face of the jaw 480ª to press the end of the retaining band in place, the pin extension 490 being pulled away from and leaving the limit stop 494, as shown in Fig. 37, during continued rotation of the disc 493 after the roller 489 contacts the inner, exposed and inclined backing face of the jaw 480ª. Consequently, the retractile spring 495 is elongated and exerts a pressure on the roller bearing arm 491 so that the end of the retaining band is firmly pressed and affixed to the ticket by the roller, thereby covering and banding the lower one-half of the width of the ticket. It will be noted that the jaw 479ª, as well as the jaw 479ᵇ, are suitably recessed to accommodate the rollers 489 during their travel.

When this particular banding operation is completed, the rotation of the disc 493 is reversed and the ticket clamping jaws are opened by their respective actuating mechanisms. A roller disengaging element 510 is carried by the clamping element 479 at a spaced distance from one side of the latter. When the clamping jaws are separated, said roller disengaging element contacts a reduced portion 511 of the rollers 489 to pull the rollers away from the affixed retaining band so that the latter will not be mutilated or torn from the ticket when the rollers are being returned to their non-operative positions. After the lower half of the ticket has been wrapped by the lower extending portion of the retaining band, as above described, the ticket clamping wheel 268 is again intermittently rotated and when coming to rest the ticket referred to is disposed between the clamping jaws 479ᵇ and 480ᵇ so that the lower half of the folded area of the ticket is grasped and the upper half is exposed to be banded by the upper free end of the retaining band. This operation is substantially the same as that just previously described and it is thought that a detailed description thereof need not be repeated.

Figure 39:
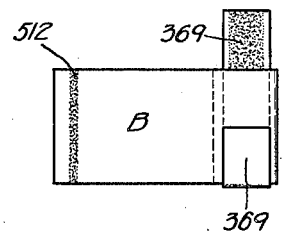
Figure 39 is a rear view of one of the tickets showing its condition and appearance when the banding operation is one-half completed, as, for instance, in the position occupied in the upper portions of Figs. 36 and 37.

During the period that the first or lower half of the folded end of the ticket is having the retaining band wrapped, an elongated rectangular area of the tail of the ticket is receiving an application of adhesive 512 (Fig. 39) thereto, which is used later to affix the ticket to the backboard. The mechanism for applying the adhesive is illustrated in Figs. 15, 23, 30, 38, and 42. It comprises a glue reservoir 513 supported by the upper frame member 3. A glue disc 514 operates in the reservoir and has its shaft 515 suitably journaled in a bearing plate 516 fixed to the frame member 3. The periphery of a beveled second glue disc 517 contacts a grove in the glue disc 514 whereby glue is transmitted from the reservoir to the disc 517, the latter being carried by a shaft 518 journaled in the bearing plate 516. Sprocket wheels 519 and 520 are borne by the ends of the shafts 515 and 518, respectively, and are connected by a sprocket chain 521. A spring pressed pawl 522 is pivotally connected to the register plunger 282 and the pawl is adapted to engage a link of the sprocket chain 521 with each forward working stroke of the plunger to afford intermittent rotation of the discs 514 and 517 for carrying adhesive on their peripheries. The free end of the pawl 522 is supported between the links of the chain by a plate 523 fixed to the frame member 3.

Journaled in a bearing 524 on the under side of a stationary plate 525 supported by the frame member 3 is a small shaft 526, as shown in Fig. 42. The outer end of the shaft has a crank 527 and a roller 528, the latter, by means of a retractile spring 529 connected to the crank and a stationary part of the frame, being maintained in contacting relation with an inclined cam member 530 fixed to the side of a rocking ticket applicator arm 531 which will hereinafter be described in detail. Rocking movements of the hammer arm 531 will result in oscillation of the shaft 526. An arm 532 is fixed to the inner end of the shaft 526 and carries a ticket engaging shoe 533 on its lower end. A ticket striker rod 534 is rigidly fixed to and depends from the inner end of the shaft 526.

When the folded end of a ticket is engaged by the clamping jaws 479ª and 480ª, the tail of the ticket will be freely disposed between the shoe 533 and the lower end of the striker rod 534, as will be readily understood after reference to Fig. 15. At this point the hammer arm 531 is being actuated so that, through the intermediate actuating mechanism, the shoe 533 engages the free tail of the ticket and presses it against the revolving periphery of the disc 517 which bears a coating of adhesive. The face of the shoe has a radius corresponding to the radius of the disc 517 and thus a strip of adhesive 512 (Fig. 39) is placed transversely across the entire width of the tail of the ticket. After the adhesive is so applied, the actuation of the hammer arm 531 is reversed and the shoe is withdrawn and the striker rod 534 engages the ticket and discourages its adherence to the periphery of the glue disc 517.

During the period of intermittent travel of the ticket clamping wheel 346 between the station where it first receives a ticket and the station where the ticket is first banded, the folded end of the ticket is supported and prevented from chance unfolding by a stationary wire support 535 which underlies the folded end of the ticket and is bent to follow the circular course of travel of the ticket heed by the clamping wheel.

The descriptive portion of the specification to this point has been confined to the mechanism for forming, folding and banding a ticket preparatory to mounting on a backboard. It will be understood that the mechanism hereinbefore described operates at high speed and that tickets are continuously and in rapid succession being formed.

folded and banded throughout the entire apparatus without interruption.

After being so prepared, the folded and banded tickets are individually pasted by the adhesive bearing tail in uniformly spaced, parallel rows upon a backboard 536, usually of cardboard, as shown in Fig. 61.

Two backboards 536 receive tickets simultaneously in the apparatus. One backboard is disposed to the right of the apparatus to have mounted thereon the tickets B processed on the preparatory mechanism located to the right of the apparatus. The other backboard is disposed to the left of the apparatus to have mounted thereon the tickets B processed on the mechanism located on the left side of the apparatus. The two mounting operations are carried on simultaneously by independent mounting mechanisms, although each mounting mechanism has common actuating means, as will hereinafter be explained. Since the two mounting mechanisms are substantial duplicates, only the mounting mechanism borne by the right side of the apparatus is herein specifically shown and described.

In mounting the tickets on the backboard 536 (Fig. 61), one of the lower tickets of either of the two outer rows is first affixed to the board. Tickets comprising the lower transverse row are then individually affixed, the board being automatically and intermittently moved longitudinally of the apparatus to arrange for the uniform spacing beneath a vertically reciprocated ticket applicator. After the first or bottom row of tickets has been affixed, automatic mechanism shifts the board transversely of the apparatus so that it is in position to have the next above row of tickets affixed by the applicator. After being so shifted transversely of the apparatus, the board is again automatically and intermittently moved longitudinally of the apparatus to have the second transverse row of tickets applied, the direction of travel of the board this time being opposite to the direction of travel when the first row was applied. This operation is repeated until such time as the desired number of tickets have been affixed to the board.

Figure 40:
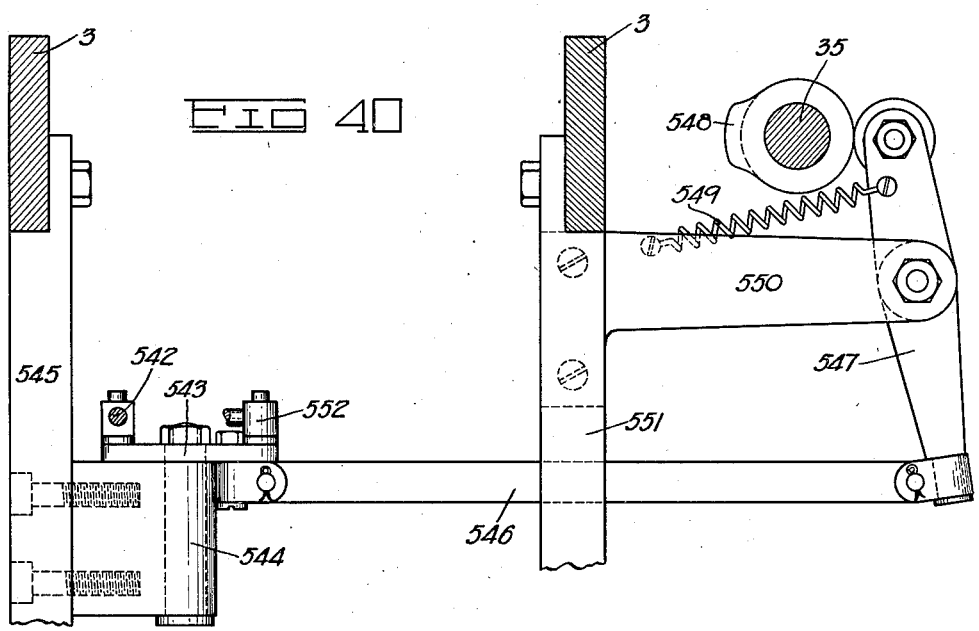
Figure 40 is a detail view of the mechanism for operating the means which receives the ticket as it is released from the ticket clamping wheel in its folded and banded condition and for transporting the ticket to its ultimate position above the backboard.
Figure 41:
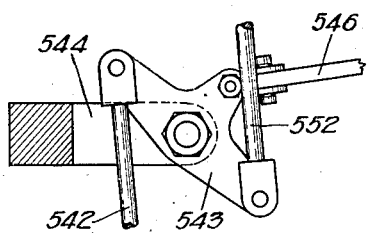
Figure 41 is a detail top plan view of the bellcrank and connecting rods shown in Fig. 40.

When a jaw of the clamping wheel 268 carrying a folded and banded ticket reaches a depending vertical position (best illustrated in Figs. 15, 20 and 60) the levers 356 are being actuated to open the two vertically opposed jaws. Thus, the lower folded and banded ticket is released from the grip of the jaws. At this point, the folded end of the ticket is up and the surface of the tail of the ticket bearing the adhesive is downwardly disposed and said tail of the ticket is disposed above the open ends of two spaced transporting tubes 537. During rotation of the clamping wheel the leading side of the ticket has been engaged and properly aligned by stops 538 carried by the tubes 537. Said tubes are stationarily mounted upon a slide block 539 which is adapted to be reciprocated on a slide bar 540 bolted to an angle 541 which is fastened to the frame of the apparatus. The slide block 539 is connected by a connecting rod 542 to a bellcrank 543 which is pivotally supported by a bearing block 544 bolted to a front center post 545 attached to the front frame members 3 and 4, as shown in Figs. 40 and 41. The bellcrank 543 is adapted to be oscillated by a link 546 fastened to the lower end of a cam lever 547 actuated by a plate cam 548 carried by the rear drive shaft 35. A retractile coil spring 549 which is attached to the upper end of the cam lever 547 and a stationary bracket 550 bolted to a rear center post 551 keeps the cam lever in constant contact with its cam.

A second connecting rod 552 connects another arm of the bellcrank 543 to the slide block of the ticket transporting tubes of the similar mounting mechanism located at the left of the apparatus.

After the ticket has been released from the grasp of the clamping jaws of the clamping wheel and has been properly aligned by the stop gauges 538, suction is automatically applied to the open ends of the ticket whereby the ticket is attracted by and becomes adhered thereto. Suction force is supplied to the tubes 537 through a suction line 553 automatically controlled through a valve 554 (Fig. 2) operated by a cam 555 fixed to the rear shaft 35.

Immediately after the ticket becomes adhered to the ends of the tubes, their slide block 539 is moved forwardly by its actuating mechanism to transport the ticket from the clamping wheel to a position beneath the lower end of an elevated ticket applicator, as diagrammatically illustrated in Fig. 60.

The construction and operation of the ticket applicator is best illustrated in Figs. 42 to 45, inclusive. The applicator 556 is carried by the lower end of a reciprocable plunger 557. The lower portion of the plunger is slideable in a bearing 558 fastened to the front upper frame member 3 and the upper portion is slideable in a bearing provided in the stationary plate 295.

A rockable ticket applicator arm 531 is fulcrumed in a bearing bracket 559 carried by the post 302. The outer end of the arm carries a cam follower 560 designed to contact a plate cam 561 fixed to the front shaft 30. The inner end of the arm 531 carries a pivotally depending link 562 which connects with an arm 563, one end of which is rigidly attached to the plunger 557. Obviously, rocking of the arm 531 imparts reciprocation to the plunger and thereby carried ticket applicator 556. The opposite end of the arm 563 carries a roller 564 designed to travel in a vertical guide 565 fixed to the frame member 3. Such a construction prohibits rotary movement of the plunger in its bearing.

The lower surface of the applicator has a plurality of ports 566 which connect with passages 567 in the applicator and plunger. Suction force is supplied to the passages 567 through a suction line 568 automatically controlled through a valve 569 (Fig. 2) operated by a cam 570 fixed to the rear shaft 35.

As the transporting tubes 537 bearing the ticket pass beneath the lower face of the applicator (Fig. 60) the leading side of the ticket contacts stationary aligning gauges 571 and the ticket is properly aligned preparatory to being affixed to the card. When at the limit of their transporting stroke beneath the applicator, suction to the tubes is discontinued through automatic actuation of the valve 554 and suction force is introduced through the ports 566 of the applicator by automatic actuation of the valve 570. Thus, the ticket leaves the tubes, becomes attracted by and adhered to the lower face of the applicator, following which the tubes and their slide block 539 are withdrawn by the latter's actuating mechanism to receive and transport the next succeeding ticket.

After the ticket is so conveyed and becomes adhered to the applicator, the latter is lowered to deposit and affix the ticket by means of the adhesive borne by the tail in the proper locale on the board, the suction force being discontinued after the ticket is affixed and prior to elevation of the applicator.

As shown in Figs. 52 to 55, inclusive, the board is supported on a rigid, rectangularly-shaped table plate 572 on which is placed a rubber covering 573 to cushion the shock and afford a degree of resilience when the applicator affixes a ticket to the board. The table 572 is rigidly supported on and above a rack 574 by a substantially tubular front support 575 and a rear support 576. Said rack 574 is slideable in a way provided therefor in a bearing plate 577 which is stationarily supported in recesses provided in the upper ends of two confronting, complemental slide plates 578 longitudinally slideable on the front frame member 4. Angles 579 attached to said plates 578 and the lower surface of the bearing plate 577 lend support to the latter. An upper keeper plate 580 maintains the rack 574 in its way.

A downwardly and outwardly inclined bearing bracket 582 is fastened to the bearing plate 577. Journaled in a bearing in said bracket 582 is a shaft 583 which extends longitudinally of the apparatus and has its opposite end supported by a similar bracket borne by the corresponding and similar table and card supporting mechanism at the left of the apparatus thereby joining the two units together.

A pinion 584 is fixed to the shaft 583 and meshes with the teeth of the rack 574. Also fixed to the shaft is a ratchet wheel 585. Rotatable on the shaft 583 is a rocking arm 586 which has a spring pressed pawl 587 pivotally attached thereto and adapted to cooperate with the ratchet wheel 585. Attached to the end of the bracket 582 is a stationary cam plate 588 having an inclined upper surface adapted to contact a pin 589 protruding from the side of the pawl 587 and designed to normally maintain the pawl out of contact with its ratchet wheel 585.

A downwardly and outwardly extension 590 is also borne by the end of the bracket 582 between said bracket and cam plate 588 and said extension has suspended therefrom a small rigid plate 591. A hand lever 592 has its inner end pivotally attached to the bracket 582 and has an integrally formed tooth 593 designed to be maintained in contact with the ratchet wheel 585 by a retractile coil spring 594. An adjustable limit stop 595 is carried by the extension 590 and the under side of the outer portion of the rocking arm 586 is maintained thereagainst by a retractile coil spring 596. A stud 597 protrudes from the side of the opposite end of the rocking arm 586.

Journaled in bearings 598 fixed to the two opposite end members 2 at the front of the apparatus and extending longitudinally thereof is a rocking shaft 599. Fixed to said shaft at the right and left sides of the apparatus are trippers 600.

At the right of the machine, as shown in Figs. 56 to 59, inclusive, the end of the shaft 599 carries a crank arm 601 whose opposite, or upper, end is pivotally attached by a pin 647 to a connecting rod 602 supported by a bellcrank 603 having its fulcrum point in a support 604 fastened to the transverse frame bar 5. The upper end of the bellcrank has a cam follower adapted to cooperate with a plate cam 605 fixed to the front shaft 30. Obviously, actuation of the bellcrank by the cam will impart an oscillating movement to the shaft 599.

Fixed to the shaft 583 is a pulley wheel 606. One end of a flexible rope or cable 607 is fixed to the pulley and a weight 608 is suspended from the opposite end of the rope.

Fixed to the front of the front slide plate 578 at the right of the apparatus is an adjustable hook 609 to which an end of a sprocket chain 610 is attached. Said chain, as shown in Fig. 1, passes over a driven sprocket wheel 611 at the right of the apparatus and continues around an idler sprocket wheel 612 at the left of the machine and has its opposite end fastened to the corresponding slide plate of the table mechanism at the left of the apparatus.

Figure 51:
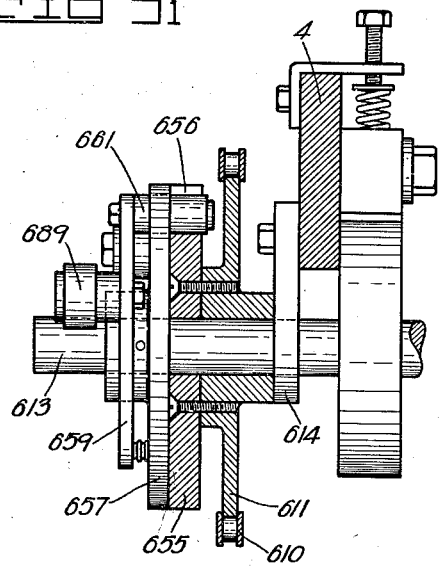
Figure 51 is a side elevational view, partially in section, of the sprocket and chain, with associated mechanism, for intermittently moving the backboard longitudinally of the apparatus.

The right sprocket wheel 611 is freely rotatable on a transverse shaft 613 which is journaled in bearings provided therefor in brackets 614 bolted to the front and rear frame members 4, as shown in Fig. 51.

Keyed to the shaft 613 adjacent its rear end, as shown in Figs. 46 to 48, are ratchet wheels 615 and 616, the teeth of said wheels being oppositely pitched. Suspended from a crosshead 617 vertically reciprocable on a slide bar 618 supported by the rear frame member 4 are connecting rods 619 and 620.

The lower end of the connecting rod 620 is connected by a pin 621 to an arm 622 whose hub 623 is received about a bushing 624 which encircles the shaft 613 and is retained in place in the bracket 614 by a threaded collar 625. The pin 621 on its outer end carries a pawl 626 which is inwardly depressed by a small leaf spring 627 carried by a spacer located intermediate the arm 622 and pawl 626. A pin 628 projects from the exposed face of the pawl, which latter is adapted to cooperate with the inner ratchet wheel 616.

The lower end of the connecting rod 619 is connected by a pin 629 to an arm 630 whose hub 631 is received about the hub 623 of the arm 622. The pin 629 on its outer end carries a pawl 632 which is inwardly depressed by a small leaf spring 633 carried by a spacer located intermediate the arm 630 and pawl 632. A pin 634 projects from the exposed face of the pawl, which latter is adapted to cooperate with the outer ratchet wheel 615.

The crosshead is reciprocated by means of an attached cam follower 635 which is designed to contact a plate cam 636 fixed to the rear face of the miter gear 36. The cam follower 635 is maintained in constant contact with its cam by a pair of retractile coil springs 637 which connect the crosshead with the frame of the apparatus.

It is the object of the pawls through their respective ratchet wheels to intermittently rotate the shaft 613 in opposite directions. In other words, the shaft 613 is intermittently rotated in one direction by one pawl for a predetermined period after which it is intermittently rotated in the reverse direction by the other pawl. Manifestly, therefore, both pawls cannot be actively operated simultaneously and provision has, consequently, been made to periodically render each pawl inactively operative.

The mechanism for accomplishing this function comprises a plate cam 638 freely rotatable on the shaft 613 and disposed between the two pawl pins 628 and 634. An arm 639 is attached to the face of the cam and has one end of a connecting rod 640 attached thereto. The opposite end of the connecting rod 640 is pivotally attached to a cam lever 641 which is fulcrumed intermediate its ends in a bearing provided on the frame member 2. The upper end of the cam lever has a follower adapted to constantly contact a plate cam 642 fixed to an intermittently rotated shaft 643 journaled in a bearing 652 fastened to the upper rear frame member 3.

Figure 50:
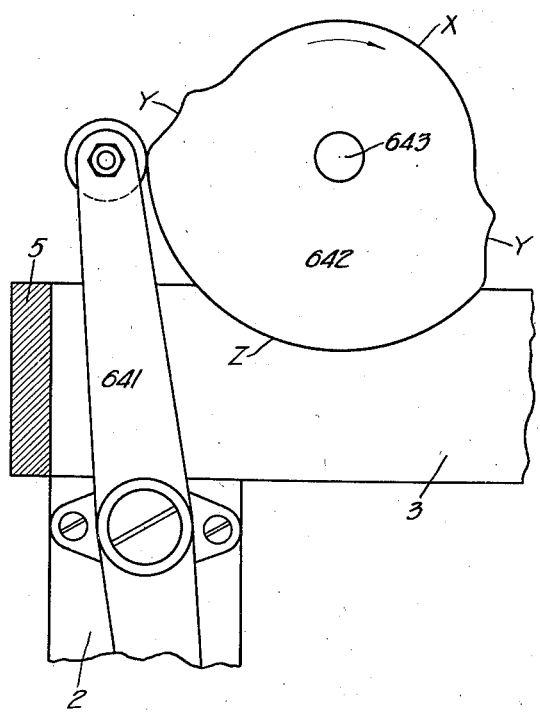
Figure 50 is a detail face view of the cam and associated mechanism intermittently operated by the mechanism depicted in Fig. 49.

Said cam 642, as shown in Fig. 50, is laid out so as to provide three stations X, Y and Z so as to move the cam lever 641 to three different positions. When the station Z contacts the follower, as shown in Figs. 2 and 50, the high point of the cam 638, through the intermediate mechanism, is rotated to the right to contact the pin 628 of the pawl 626 so as to disengage said pawl from its ratchet wheel 616. Thus, when the crosshead 617 is vertically reciprocated, the pawl 632 will engage its ratchet wheel 615 to intermittently rotate the shaft 613 in one direction. When the cam 642 has been rotated a sufficient distance, one of the neutral cam stations Y contacts the follower of the cam lever 641 and the high point of the cam 638, through the intermediate mechanism, is moved to the left so as to contact both of the pins 628 and 634 so as to disengage both pawls 626 and 632 from the ratchet wheel 616 and 615. Consequently, when the crosshead 617 is reciprocated, the shaft 613 will remain stationary. When the cam 642 has thereafter been rotated a sufficient distance, the station X contacts the follower of the cam lever 641 and the high point of the cam 638 is thereby moved still further to the left to contact only the pin 634 of the pawl 632 thereby keeping only the pawl 632 out of engagement with its ratchet 615. Thus, when the crosshead 617 is vertically reciprocated, the pawl 626 will engage its ratchet wheel 616 to intermittently rotate the shaft 613 in an opposite direction.

The cam 642 and its shaft 643 are intermittently rotated a predetermined distance by means of a ratchet wheel 644 fixed to the shaft. Said ratchet wheel is adapted to be periodically engaged by a spring pressed pawl 645 carried by an arm 653 whose hub is freely rotatable on shaft 643. Also connected to said arm 653 is an adjustable link 646 whose opposite end is bolted in an arcuate slot 647 in a cam actuated reciprocable arm 648. Said cam arm is fulcrumed in a bearing 649 attached to the frame member 5 and said arm has a cam follower 650 contacting a plate cam 651 fixed to the cross shaft 27.

When producing a board having four lines of tickets spaced transversely, the ratchet wheel 644 is provided with twenty-four teeth and said ratchet wheel is advanced a distance equal to three teeth with each reciprocation of the cam arm 648, a suitable brake 654 being provided to prevent any free rotation of the shaft 643.

The object of the intermittent rotation of the shaft 613 is to impart intermittent movement of the two card supporting tables longitudinally of the apparatus beneath the ticket applicators to space the transverse rows of tickets across the backboards. Such intermittent rotation of the shaft 613 is transmitted to the chain 610 by a mechanism illustrated in Figs. 1 and 51. It comprises the sprocket wheel 611 which is fixed to an inner disc 655, these two elements being rotatable freely as a unit on the shaft 613. The periphery of the discs 655 is provided with a recess 656, as shown in detail in Figs. 64 and 65. A second or outer disc 657 is pinned to the shaft 613 and its periphery is provided with a recess 658 similar to the recess 656 of disc 655 but slightly larger than the latter. A curved arm 659 is fulcrumed at 660 and its upper end carries a roller 661 accommodated in the recesses 656 and 658. The opposite or lower end of the curved arm 659 has one end of a retractile spring 662 attached thereto the opposite end of the spring being connected to the face of the outer disc 657. Consequently, the mid-portion of the arm 659 rests against the hub of the outer disc and the roller 661 is at all times held rigidly against the right vertical side walls of the recesses 656 and 658. Thus, intermittent rotation of the shaft 613 in either direction will be transmitted to the outer disc 657 and through the arm 659 and its roller 661 will be transmitted to the inner disc 655 for rotating the sprocket wheel 611 to which it is attached. Obviously, rotation of the sprocket wheel will impart corresponding movement to the chain 610 for moving the two card supporting tables, which latter are connected together by a tie bar 663. It will be understood that, while the diameter of the roller 661 is less than the width of the recess 658 of the outer disc, the roller will remain immovable therein against the right side wall because of the force exerted by the retractile spring 662 on the roller's arm 659.

The operation of mounting the tickets on the two backboards may be explained as follows: A board 536 is manually placed on the rubber covering of each of the two table plates 573 being properly positioned against stationary aligning guides 664 and 665. The backboards are so placed on the tables 573 so that the bottom of the board (Fig. 61) is disposed inwardly of the apparatus and the top edge of the board rests against the outer guide 664. A suction passage 666 is provided through each of the front table supports 575 and open in the upper surface of the board supporting tables. These passages are provided with suction through an appropriate supply line 667 controlled through a valve 668 (Fig. 1). The operating lever of the valve 668 is connected to the clutch-operating lever 19. Thus, when this lever is actuated to start operation of the entire apparatus, the valve 668 is simultaneously opened to furnish suction force to the passages 666 for attracting the backboards and cause their adherence to their respective tables.

As hereinbefore described, the continuously reciprocating ticket applicators 556 are being supplied with a ticket from the ticket clamping wheels by the ticket transporting tubes 537. As the applicators reach the limit of their downward stroke, the tickets borne thereby are transferred and affixed to the underlying board, a longitudinally extending anvil 669 (Fig. 60) in the shape of a heavy bar supported by the frame underlying the tables beneath the applicators to provide rigid bracing for the tables when the applicators strike the board with a ticket to be affixed.

Assuming that the first ticket to be applied to the two boards is the lowermost ticket in the last row to the left of the board illustrated in Fig. 61. When the boards are initially placed and properly positioned on their supporting tables, they are so located that the locale to be occupied by this ticket is vertically aligned beneath the applicators. When the applicators reach the limit of their downward stroke, the tickets borne thereby are transferred to and affixed to the boards in this locale.

Before the applicators make another complete reciprocation, the pawl 632 has engaged the ratchet wheel 615 to slightly rotate the shaft 613. Through the intermediate mechanism hereinbefore described this causes the board supporting tables to be moved to the right a predetermined distance so that the next ticket which is applied to each board will be the lowermost ticket in the second row from the left of the board illustrated in Fig. 61. This operation is continued transversely across the board until the lowermost ticket in the last vertical row to the right of the board is affixed. At this point the board supporting tables have moved longitudinally to the right of the apparatus to a station where the stud 597 of the rocking arm 586 is aligned with the right tripper 600 of the rockable shaft 599. Immediately after the last ticket in the lower row is affixed, the shaft 599 is rocked by its actuating mechanism, hereinbefore described, so that the tripper 600 engages the stud 597 thereby rocking the arms 586. The pawl 587 engage the ratchet wheels 585 rotating the shaft 583 and its pinion 584, thereby inwardly advancing the racks 574 and the tables supporting the backboards. The backboards by this action are now in a position to have the tickets in the second row from the bottom applied.

Simultaneously with this action, the cam 642 has reached a neutral position Y so that the cam 638 engages both pins 628 and 634 to disengage the pawls 626 and 632 from their respective ratchet wheels. Thus, when the crosshead 617 is lowered, the shaft 613 remains stationary and the board supporting tables are, therefore, not moved longitudinally of the apparatus and the first ticket to be applied in the second row from the bottom is in the last vertical row to the right of Fig. 61. In other words, the first ticket to be affixed in the second transverse row from the bottom edge of the backboard is vertically aligned with the last ticket affixed in the first transverse row of tickets.

After the first ticket is affixed to the second transverse row, the cam 642 is rotated to reach the cam position X so that the cam 638 engages pin 634 to render the pawl 632 inactively operative. Pawl 626 will engage its ratchet wheel 616 during reciprocation of the crosshead 617 to intermittently rotate the shaft 613. Through the intermittent mechanism hereinbefore described, this causes the board supporting tables to be moved to the left a predetermined distance so that the next ticket which is applied to each board will be the next to the lowermost ticket in the second vertical row from the right of the board illustrated in Fig. 61.

The above operation is continued transversely across the board until the ticket in the last vertical row to the left of the board in the second transverse row is affixed. At this point the board supporting tables have moved longitudinally to the left of the apparatus to a station where the stud 597 of the rocking arm 586 of the left board supporting table is aligned with the left tripper 600 of the rockable shaft 599. Immediately after the last ticket in the second transverse row is affixed, the shaft 599 is again rocked by its actuating mechanism so that the tripper 600 engages the stud 597 to again advance the tables inwardly preparatory to affixing the third transverse row inwardly. Simultaneously with this action, the cam 642 has reached a neutral position Y so that the cam 638 engages both pins 628 and 634 to disengage the pawls 626 and 632 from their respective ratchet wheels. Thus, when the crosshead 617 is lowered, the shaft 613 remains stationary and the board supporting tables are, therefore, not moved longitudinally of the apparatus and the first ticket to be applied in the third row from the bottom is in the last vertical row to the left of Fig. 61. Otherwise expressed, the first ticket to be affixed in the third transverse row from the bottom edge of the backboard is vertically aligned with the last ticket affixed in the second transverse row of tickets.

The above recited operation is repeated until such time as the desired number of tickets have been affixed to the boards.

After all of the tickets have been affixed to the boards, the operation of the apparatus is stopped by manually shifting of the clutch-operating lever 19 which also discontinues the supply of suction force to the board tables. As each of the boards is intermittently advanced into the apparatus to affix transverse rows of tickets thereon, the rotation of the shaft 583 has caused a portion of the length of the rope or cable 607 to become wound around the pulley wheel 606 which is fixed to said shaft. After the operation of the apparatus is stopped upon completion of filling the boards with tickets, the lever 592 is elevated to disengage its tooth 593 from engagement with the ratchet wheel 585. Consequently, the weight 608 suspended from the rope 607 will gravitate causing the rope to unwind from its pulley and rotating the shaft 583. The pinion 584 fixed to said shaft will act on its rack 574 to retract the card supporting tables whereupon the completed boards may be removed from their tables.

It is desired that the shaft 599 to which the trippers 600 are fixed be rocked only when the stud 597 of the rocking arm 586 of either the left or right card supporting table is aligned with its respective tripper 600 by means of which its stud 597 and arm 586 is actuated. The mechanism for accomplishing this function is illustrated in Figs. 46 and 56 to 59, inclusive.

The outer end of the pin 647 connecting the crank arm 601 to the connecting rod 602 is reduced and provided with a roller 694 which is received in a vertical slot 670 provided in the forward end of a slide bar 671 which is slideable in guides 672 fixed to the frame member 2. A retractile spring 673 has its forward end connected to the front guide 672 and has its rear end connected to the slide bar 671. Thus, the force exerted by the spring tends to maintain the follower of the bellcrank 603 in contact with the face cam 605. However, the cam follower is prevented from following the low part of the cam 605 which functions to actuate the shaft 599 and its trippers 600 except when it is desired to rock the latter elements. The slide bar 671 adjacent its rear end has an aperture 674 designed to receive the tapered inner end of a pin 675. Said pin is journaled in a bearing 676 fastened to the rear guide 672 and is inwardly pressed by a retractile coil spring 677. Thus, the slide bar 671 is locked in place, thereby prohibiting the follower of the bellcrank 603 from following the low part of the cam 605. An appropriate adjustable cam 678 is fixed to the intermittently rotated shaft 613 and at predetermined timed intervals one of its two high stations (depending upon the direction of rotation of the shaft 613) contacts the follower 679 of a lever 680 which is fulcrumed at 681 to the rear frame member 4. The upper end of the lever 680 is thus actuated to engage and exert an outward pressure on a collar 682 fixed to the outer end of the pin 675 to withdraw the inner end of the pin from the aperture in the slide to permit the follower of the bellcrank 603 to follow the low part of the cam 605 for rocking the shaft 599 and trippers 600. Manifestly, this operation is timed and synchronized with the remaining mechanism so that it occurs only when one of the trippers 600 is aligned with one of the studs 597 of the two board supporting tables.

The apparatus is capable of producing types of boards other than that hereinbefore described and illustrated in Fig. 61. For instance, a board similar to that depicted in Fig. 66 may readily be produced. This board has six vertically aligned rows of tickets with an increased space between the third and fourth vertical rows.

Figure 49:
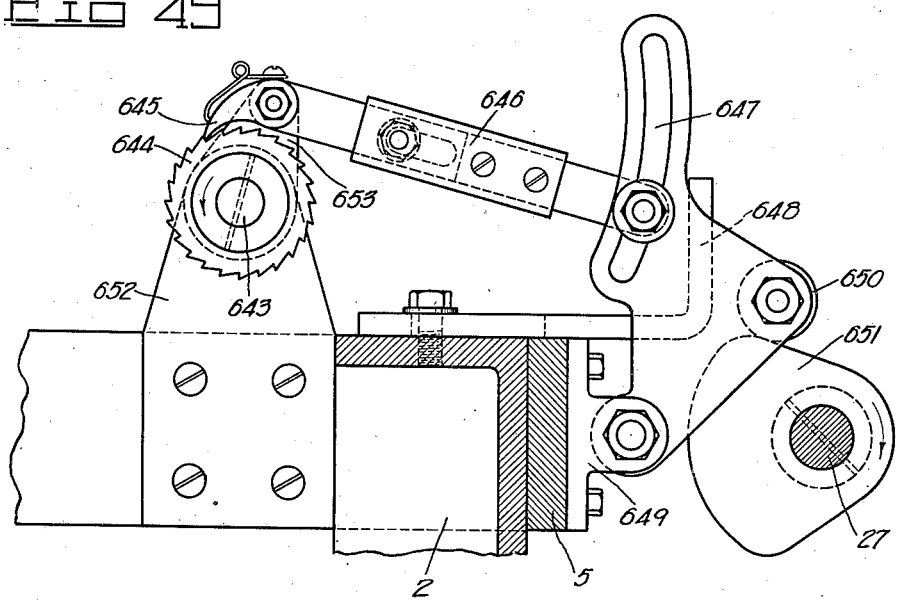
Figure 49 is a detail view of ratchet and pawl means associated with the mechanism for determining the direction of longitudinal movement of the backboard in the apparatus during the ticket applying operation.

To arrange for six tickets to be transversely disposed across a backboard, an L-shaped limit stop 684 (Fig. 49) is fastened to the top of the frame member 2 so that its vertical element will engage the end of the link 646 and prevent it from being retracted as far rearward as is the case with the board having four vertical rows of tickets. The limit stop is positioned so that with each reciprocation of the link 646 and its pawl 645, the ratchet wheel 644 will be advanced a distance equal to two teeth instead of three teeth as is the case when a four row board is being produced. Thus, the intermittent rotation of the cam 642 throughout a complete revolution is affected more slowly than is the case where a four row board is produced and the cam areas X and Z are effective for correspondingly longer periods of time. In other words, the pawl 626 will intermittently rotate the shaft 613 five times in one direction before the pawl 632 will intermittently rotate said shaft five times in the opposite direction after the intervening neutral period has elapsed, it being borne in mind that the reciprocation of the crosshead 617 is the same in any case. Consequently, six tickets will be disposed transversely across the boards before the direction of travel of the backboard supporting tables will be reversed for affixing the next transverse row of tickets. Obviously, an appropriate adjustment must be made in the adjustable cam 678 fixed to the shaft 613 for altering the timing of the actuation of the rockable shaft 599 and trippers 600.

The mechanism for providing the wider than uniform space 690 between the third and fourth vertical rows of tickets is illustrated in Figs. 62 to 65, inclusive. A stationary plate cam 685 is placed on the outer end of the shaft 613 so as to underlie the arm 659. The cam is rendered stationary by means of a pin 686 which extends from the cam and is received in a recess of a bracket 688 depending from the front frame member 4. The arm 659 has a cam follower 689 designed to cooperate with the cam 685.

During the process of affixing the tickets in transverse rows upon the boards, and as the boards are about to pass over their longitudinal centers during travel of the board supporting tables, the follower 689 of the arm 659 fulcrumed to the intermittently rotated disc 657 contacts the high part of the cam 685 and the arm 659 is slightly forced arcuately about its fulcrum point 660 causing the roller 661 to move from one side of the recess 658 to the other side, as illustrated in Figs. 64 and 65. Since the roller 661 is neatly nested in the smaller recess 656 of the inner disc 655 to which the sprocket wheel 610 is attached, said inner disc 655 and sprocket wheel 610 is at this point thereby given an additional impetus so that the sprocket wheel 610 is advanced an additional distance sufficient to advance its sprocket chain and the board supporting tables an additional distance to provide the wider space 690 between the third and fourth vertical rows of tickets on the board. This action takes place whether the tables move to the left or right.

Another modification of the apparatus is illustrated in Fig. 67. This modification provides for the mounting of previously folded and banded tickets on a backboard. Said previously prepared tickets B are placed in a hopper 691 and firmly retained therein by a weight 692. The hopper has an opening 693 at one side of its lower end. The reciprocating ticket transferring tongue 311 engages the folded end of the lowermost ticket in the bight thereof and conveys it between the movable jaw 353 and its complemental stationary jaw of the ticket clamping wheel from whence said ticket is conducted through the various hereinbefore described stages of being prepared and affixed to a backboard.

The operation of the apparatus is continuous, and it is operated at high speed. The various cams, shafts and other mechanical elements are manufactured and assembled with precision. All movements are accurately synchronized to avoid any interruption of operation or improper functioning of the apparatus.

What is claimed is:

1. An apparatus of the character described, including means for folding an end portion of a ticket about itself, intermittently operating rotating means for grasping the folded end of the ticket and conveying the same away from the folding means, an intermittently rotatable ticket clamping wheel cooperating with said rotating means having a plurality of radially disposed ticket clamping jaws for grasping the tails of previously folded tickets, means for intermittently rotating the ticket clamping wheel to successively position a clamping jaw to receive the tail of a folded ticket, means for conveying a folded ticket from the first rotating means to one of said jaws of the clamping wheel, means for applying a transversely disposed retaining band to the folded end of the ticket at one station of the rotation of the clamping wheel while the same is supported by said clamping jaw, means whereby said retaining band is finally disposed in encircling relation to the folded end of the ticket, and means for operating all of said means in timed sequential relation.

2. An apparatus of the character described, including means for folding an end portion of a ticket about itself, an intermittently rotatable ticket clamping wheel having a plurality of radially disposed ticket clamping jaws for grasping the tails of previously folded tickets, means for intermittently rotating the ticket clamping wheel to successively position a clamping jaw to receive the tail of a folded ticket, means for conveying a folded ticket from the folding means to one of said jaws, means located at one station of the rotation of the clamping wheel for disposing a retaining band transversely across the folded end of the ticket so that the opposite ends of said band projects beyond the opposite sides of said ticket, means located at another station of the rotation of the clamping wheel for forming one of the projecting ends of the band about the folded end of the ticket, means located at another station of the rotation of the clamping wheel for forming the other projecting end of the band about the folded end of the ticket, and means for operating all of said means in timed sequential relation.

3. An apparatus of the character described, including means for folding an end portion of a ticket about itself, and intermittently rotatable ticket clamping wheel having a plurality of radially disposed ticket clamping jaws for grasping the unfolded end portions of previously folded tickets, means for intermittently rotating the ticket clamping wheel to successively position a clamping jaw to receive the unfolded end portion of a folded ticket, means for conveying a folded ticket from the folding means to one of said jaws, shearing means for severing a rectangular strip of paper from a length of paper tape to provide a retaining band, means for applying adhesive to one surface of said band, means for conveying said band to a position aligned with the folded end of the ticket, means for applying the adhesive bearing surface of the band to the folded end of the ticket, means for forming said band transversely about the folded end of the ticket, and means for operating all of said means in timed sequential relation.

4. An apparatus as called for in claim 3 including adjusting means associated with the shearing means whereby the width of the strip of paper severed from the paper tape may be varied.

5. An apparatus as called for in claim 1 including registering means associated with the ticket clamping wheel for immovably locking said wheel between periods of intermittent rotation.

6. An apparatus of the character described including means for folding one end of a rectangularly shaped ticket about itself, shear means for longitudinally severing said folded ticket, independent means for simultaneously disposing a retaining band transversely across the folded end of each of said severed tickets, and means for operating all of said means in timed sequential relation.

7. An apparatus of the character described, including means for folding an end portion of a ticket about itself with the folded portion of the ticket disposed upwardly, means for reversing the position of the ticket after folding to dispose the folded portion of the ticket downwardly, an intermittently rotatable clamping wheel having a plurality of radially disposed ticket clamping jaws for grasping the unfolded end portions of previously folded tickets, means for intermittently rotating the ticket clamping wheel to successively position a clamping jaw to receive the unfolded end portion of a folded ticket, means for conveying a folded ticket from the folding means to the ticket reversing means, means for transferring the ticket from the ticket reversing means to one of said ticket clamping jaws, means located at one station of the rotation of the clamping wheel for disposing a retaining band transversely across the under surface of the folded end of the ticket so that the opposite ends of said band projects beyond the opposite sides of said ticket, means located at another station of the rotation of the clamping wheel for forming one of the projecting ends of the band about the folded end of the ticket, and means located at another station of the rotation of the clamping wheel for forming the other projecting end of the band about the folded end of the ticket, and means for operating all of said means in timed sequential relation.

8. An apparatus as called for in claim 7 including vertically reciprocable means for striking the upper surface of the folded end of the ticket when the retaining band is disposed across the under surface of the ticket whereby the band becomes adhered to the ticket.

9. An apparatus of the character described, including a magazine for housing a supply of tickets to be folded, means for individually feeding tickets from said magazine, means for folding one end portion of the ticket upon itself, means for conveying successive tickets to the folding means, shearing means for longitudinally severing said ticket transversely of the folded portion thereof, means for conveying said severed tickets by divergent paths to independent banding means, said banding means each comprising mechanism for simultaneously disposing a retaining band transversely across the folded end of each of said severed tickets, and means for operating all of said means in timed sequential relation.

10. An apparatus of the character described, including means for folding an end portion of a ticket about itself, an intermittently rotatable ticket clamping wheel having a plurality of radially disposed ticket clamping jaws for grasping the unfolded end portions of previously folded tickets, means for intermittently rotating the ticket clamping wheel to successively position a clamping jaw to receive the unfolded end portion of a folded ticket, means for conveying a folded ticket from the folding means to one of said jaws, shearing means for severing a rectangular strip of paper from a length of paper tape to provide a retaining band, an intermittently rotatable carrier, reciprocable means carried by said carrier for applying adhesive to one surface of said band, intermittently rotatable means for conveying said band to a position vertically aligned with the folded end of the ticket, reciprocable means for applying the adhesive bearing surface of the band to the folded end of the ticket, and means for forming said band transversely about the folded end of the ticket, and means for operating all of said means in timed sequential relation.

11. An apparatus of the character described, including means for folding an end portion of a ticket about itself, an intermittently rotatable ticket clamping wheel having a plurality of radially disposed ticket clamping jaws for grasping the unfolded end portions of previously folded tickets, actuating means for opening and closing said jaws for retaining and discharging tickets, means for intermittently rotating the ticket clamping wheel to successively position a clamping jaw to receive the unfolded end portion of a folded ticket, means for conveying a folded ticket from the folding means to one of said jaws, means for applying a retaining band to the folded end of the ticket at one station of the rotation of the clamping wheel, means for disposing said retaining band in encircling contacting relation to the folded end of the ticket during intermittent rotation of the clamping wheel so as to retain the ticket in folded condition, a backboard, and means for receiving the banded ticket from the clamping wheel and applying the same to said backboard, and means for operating all of said means in timed sequential relation.

12. An apparatus of the character described, including means for folding an end portion of a ticket about itself, an intermittently rotatable ticket clamping wheel having a plurality of radially disposed ticket clamping jaws for grasping the unfolded end portions of previously folded tickets, actuating means for opening and closing said jaws for retaining and discharging said tickets, means for intermittently rotating the ticket clamping wheel to successively position a clamping jaw to receive the unfolded end portion of a folded ticket, means for conveying a folded ticket from the folding means to one of said jaws, means for applying a retaining band to the folded end of the ticket at one station of the rotation of the clamping wheel, means for disposing said retaining band in encircling and contacting relation to the folded end of the ticket during intermittent rotation of the clamping wheel while the ticket is supported by the latter, means for applying adhesive to a predetermined area of the unfolded end portion of the ticket, a backboard, means for receiving the banded ticket from the clamping wheel and applying the same to the backboard, and means for operating all of said means in timed sequential relation.

13. An apparatus of the character described, including means for folding an end portion of a ticket about itself, means for disposing a retaining band about the folded end of the ticket, a backboard, means for supporting said backboard, means for individually applying a plurality of folded and banded tickets upon said backboard in spaced parallel rows including an applicator adapted to receive the folded and banded ticket, actuating means to intermittently move the supporting means and thereby the backboard in a direction transversely of the ticket applying means, other actuating means to intermittently move the backboard in a direction perpendicular to the first named direction of movement, and means for operating all of said means in timed sequential relation.

14. An apparatus of the character described, including means for folding an end portion of a ticket about itself, means for disposing a retaining band about the folded end of the ticket, means for individually applying a plurality of such tickets upon a backboard in spaced transverse and parallel rows including a vertically reciprocable applicator adapted to receive the folded and banded ticket and to affix the same to said backboard, a table for supporting a backboard, actuating means to move the table in a direction transversely of the ticket applying means, other actuating means to move the table at predetermined timed intervals in a direction longitudinally of the applying means, and means for operating all of said means in timed sequential relation.

15. An apparatus of the character described, including means for folding an end portion of a ticket about itself, means for disposing a retaining band about the folded end of the ticket, means for individually applying a plurality of such tickets upon a backboard in spaced parallel rows including an applicator adapted to receive the folded and banded ticket, a table for supporting said backboard, actuating means to intermittently move the table and thereby the backboard in a direction transversely of the applying means, other actuating means to intermittently move the table in a direction longitudinally of the applying means, and means, including a cam, for varying the spacing between adjacent rows of tickets, and means for operating all of said means in timed sequential relation.

16. An apparatus of the character described, including folding, banding and mounting mechanism, an oscillating magazine for holding a supply of tickets of predetermined size and shape to be operated upon in advance of the folding mechanism, means cooperating with said magazine for separating a single ticket from said supply magazine and for feeding the same to the folding mechanism, and means for operating all of said mechanism in timed sequential relation.

17. An apparatus of the character described, including folding, banding and mounting mechanism, an oscillating magazine for holding a supply of tickets of predetermined size and shape to be operated upon in advance of the folding mechanism, means cooperating with the oscillating magazine for buckling a plurality of tickets adjacent the discharge end of the magazine for separating said tickets one from the other, means for feeding an individual ticket to the folding mechanism, and means for operating all of said mechanism in timed sequential relation.

18. An apparatus of the character described, including folding, banding and mounting mechanism, an oscillating magazine for holding a supply of tickets of predetermined size and shape to be operated upon in advance of the folding mechanism, means cooperating with said magazine and engaging the innermost ticket housed therein so as to rupture any adhering bond existing between said innermost ticket and the ticket next adjacent thereto, means for feeding individual tickets so separated to the folding mechanism, and means for operating all of said mechanism in timed sequential relation.

19. An apparatus of the character described, including folding, banding and mounting mechanism, an oscillating magazine for holding a supply of tickets of predetermined size and shape to be operated upon in advance of the folding mechanism, means cooperating with the oscillating magazine for tamping and aligning the innermost tickets contained therein, means for feeding said tickets from the magazine to the folding mechanism, and means for operating all of said mechanism in timed sequential relation.

20. An apparatus of the character described, including folding, banding and mounting mechanism, means for holding a supply of tickets to be operated upon, a pair of continuously rotating feed rolls for individually feeding said tickets from said holding means, oscillating suction means cooperating with said feed rolls for conveying a ticket from the holding means to said feed rolls, and means for operating all of said mechanism in timed sequential relation.

21. An apparatus of the character described, including folding, banding, and mounting mechanism, a table, a vertically reciprocting male die member above said table, rotating means disposed beneath said table, a plurality of female dies carried by said rotating means for individual cooperation with said male die member so as to fold one end of a ticket upon itself, a ticket holding magazine, means to feed and convey a ticket from the magazine across said table to a point between said cooperating male and female die members to be operated upon thereby, means carried by said male die member for stripping a folded ticket therefrom when the same is withdrawn from cooperating position with the female die member, means carried by the female die member to retain the ticket therein upon completion of the folding operation and withdrawal of the male die member, and means for operating all of said mechanism in timed sequential relation.

22. An apparatus of the character described, including folding, banding, and mounting mechanism, a table, a vertically reciprocating male die member above said table, rotating means disposed beneath said table, a plurality of female dies carried by said rotating means for individual cooperation with said male die member so as to fold one end of a ticket upon itself, a ticket holding magazine, means to feed and convey a ticket from the magazine across said table to a point between said cooperating male and female die members to be operated upon thereby, means carried by said male die member for stripping a folded ticket therefrom when the same is withdrawn from cooperating position with the female die member, means carried by the female die member to retain the ticket therein upon completion of the folding operation and withdrawal of the male die member, means for intermittently actuating the female die carrying means, means located at a predetermined point in the movement of the last named means for transversely crimping the said folded end of the ticket, a pair of cooperating rolls for further folding said one end of the ticket upon itself, means located at a point diametrically opposite to said predetermined point for removing the ticket from said female die member and for conveying the same between said pair of cooperating rolls, and means for operating all of said mechanism in timed sequential relation.

23. An apparatus of the character described, including means for folding one end portion of a ticket upon itself, intermittently movable clamping means for supporting said folded ticket, means for disposing a retaining band about said folded end of the ticket while the latter is supported by the clamping means, and means for operating all of said means in timed sequential relation.

24. An apparatus of the character described, including means for folding one end portion of a ticket upon itself, a plurality of radially disposed ticket clamping jaws for grasping and holding the opposite free end of said folded tickets, means for intermittently rotating said jaws as a unit to successively position each of said jaws to receive and retain said opposite free end of the ticket, means for conveying a folded ticket from the folding means to one of said clamping jaws, means cooperating with each of said clamping jaws whereby a retaining band may be disposed about the folded end of said ticket while the latter is held by said jaw, and means for operating all of said means in timed sequential relation.

ROBERT F. PALMER.